US008463035B2

(12) United States Patent
Bechtel et al.

(10) Patent No.: US 8,463,035 B2
(45) Date of Patent: Jun. 11, 2013

(54) DIGITAL IMAGE PROCESSING FOR CALCULATING A MISSING COLOR VALUE

(75) Inventors: Jon H. Bechtel, Holland, MI (US); Jeremy C. Andrus, Zeeland, MI (US); Tom B. Sherman, Ada, MI (US)

(73) Assignee: Gentex Corporation, Zeeland, MI (US)

(*) Notice: Subject to any disclaimer, the term of this patent is extended or adjusted under 35 U.S.C. 154(b) by 247 days.

(21) Appl. No.: 12/788,574

(22) Filed: May 27, 2010

(65) Prior Publication Data

US 2010/0303349 A1  Dec. 2, 2010

Related U.S. Application Data

(63) Continuation-in-part of application No. 12/697,600, filed on Feb. 1, 2010.

(60) Provisional application No. 61/181,770, filed on May 28, 2009, provisional application No. 61/222,532, filed on Jul. 2, 2009.

(51) Int. Cl.
  *G06K 9/00* (2006.01)
  *H04N 9/083* (2006.01)

(52) U.S. Cl.
  USPC .......................... 382/167; 348/273

(58) Field of Classification Search
  USPC ................... 382/162, 167; 348/273
  See application file for complete search history.

(56) References Cited

U.S. PATENT DOCUMENTS

| | | | | |
|---|---|---|---|---|
| 4,630,307 | A * | 12/1986 | Cok | 382/165 |
| 5,717,791 | A | 2/1998 | Labaere et al. | |
| 5,805,217 | A | 9/1998 | Lu et al. | |
| 6,091,862 | A * | 7/2000 | Okisu | 382/300 |
| 6,229,578 | B1 * | 5/2001 | Acharya et al. | 348/607 |
| 6,396,505 | B1 | 5/2002 | Lui et al. | |
| 6,466,333 | B1 | 10/2002 | Schoolcraft et al. | |
| 6,570,616 | B1 * | 5/2003 | Chen | 348/272 |
| 6,628,330 | B1 * | 9/2003 | Lin | 348/252 |
| 6,744,916 | B1 * | 6/2004 | Takahashi | 382/162 |
| 6,791,609 | B2 * | 9/2004 | Yamauchi et al. | 348/273 |
| 6,928,196 | B1 * | 8/2005 | Bradley et al. | 382/300 |
| 6,933,971 | B2 * | 8/2005 | Bezryadin | 348/280 |
| 7,103,260 | B1 | 9/2006 | Hinson | |
| 7,146,059 | B1 | 12/2006 | Durand et al. | |
| 7,149,369 | B2 * | 12/2006 | Atkins | 382/299 |
| 7,292,725 | B2 * | 11/2007 | Chen et al. | 382/167 |

(Continued)

FOREIGN PATENT DOCUMENTS

| | | |
|---|---|---|
| JP | 10-051693 | 2/1998 |
| JP | 2005-160044 | 6/2005 |
| JP | 2008-092052 | 4/2008 |
| WO | WO 2005025232 A1 * | 3/2005 |

OTHER PUBLICATIONS

New Edge-Directed Interpolation, Xin Li et al, IEEE Transactions on Image Processing. vol. 10. No. 10. Oct. 2001 1521-1527.*

(Continued)

*Primary Examiner* — Wenpeng Chen
(74) *Attorney, Agent, or Firm* — Price Heneveld LLP; Scott P. Ryan

(57) ABSTRACT

A spectrally mosaiced digital image is provided with missing color data imputed for each pixel. Circuitry is provided that is configured to perform at least a portion of the calculations related to demosaicing a high dynamic range image.

5 Claims, 24 Drawing Sheets

U.S. PATENT DOCUMENTS

| | | | |
|---|---|---|---|
| 7,305,144 B2 | 12/2007 | Fattal et al. | |
| 7,317,843 B2 | 1/2008 | Sun et al. | |
| 7,362,897 B2 * | 4/2008 | Ishiga | 382/167 |
| 7,376,288 B2 | 5/2008 | Huang et al. | |
| 7,483,486 B2 | 1/2009 | Mantiuk et al. | |
| 7,502,505 B2 | 3/2009 | Malvar et al. | |
| 7,653,240 B1 * | 1/2010 | Otobe et al. | 382/162 |
| 7,663,631 B1 * | 2/2010 | Friedman et al. | 345/501 |
| 7,714,900 B2 * | 5/2010 | Chiu | 348/222.1 |
| 7,948,543 B2 * | 5/2011 | Watanabe | 348/305 |
| 2002/0186309 A1 * | 12/2002 | Keshet et al. | 348/272 |
| 2003/0011708 A1 * | 1/2003 | Kawamura et al. | 348/448 |
| 2004/0161145 A1 * | 8/2004 | Embler | 382/165 |
| 2005/0141047 A1 * | 6/2005 | Watanabe | 358/471 |
| 2005/0200733 A1 | 9/2005 | Malvar | |
| 2005/0270391 A1 * | 12/2005 | Watanabe | 348/294 |
| 2006/0104505 A1 * | 5/2006 | Chen et al. | 382/162 |
| 2007/0002154 A1 * | 1/2007 | Kang et al. | 348/272 |
| 2007/0110300 A1 * | 5/2007 | Chang et al. | 382/162 |
| 2008/0192819 A1 | 8/2008 | Ward et al. | |
| 2009/0244333 A1 * | 10/2009 | Lukac | 348/280 |
| 2010/0061625 A1 * | 3/2010 | Lukac | 382/162 |

OTHER PUBLICATIONS

"Demosaicing: Image Reconstruction from Color CCD Samples," Ron Kimmel, IEEE Transactions on Image Processing. Vol. 8. No. 9. Sep. 1999, pp. 1221-1228.*

Patent Cooperation Treaty, International Searching Authority, International Search Report, Written Opinion of the International Searching Authority and Notification of Transmittal, Jan. 10, 2012, 10 Pages.

* cited by examiner

KEY: 01111001
DECODE: Non-dir

KEY: 00001100
DECODE: Hor

KEY: 10101010
DECODE: Vert

KEY: 01010101
DECODE: Vert

KEY: 00000101
DECODE: Diag Up Rt

KEY: 00101011
DECODE: Diag Dwn Rt

KEY: 00110011
DECODE: Hor or Vert

KEY: 11001100
DECODE: Hor or Vert

Fig. 7

\* NOT USED ALSO FOR SELECTED BORDER CONDITIONS

Fig. 7A

| 701B | 702B | 704B | | | 705B | | | 706B | | | 711B |
|---|---|---|---|---|---|---|---|---|---|---|---|
| | | 11 | 12 | 13 | 21 | 22 | 23 | 31 | 32 | 33 | |
| D | N, N1 | 4 | | 4 | | | | 4 | | 4 | $N_{22} = (N_{11} + N_{13} + N_{31} + N_{33})/4$ |
| D | V ~712B | 4 | 8 | 4 | -8 | | -8 | 4 | 8 | 4 | $N_{22} = (N_{11} + N_{13} + N_{31} + N_{33})/4$ ~722B $+ (G_{12} - G_{21} - G_{23} + G_{32})/2$ ~713B |
| D | H ~714B | 4 | -8 | 4 | 8 | | 8 | 4 | -8 | 4 | $N_{22} = (N_{11} + N_{13} + N_{31} + N_{33})/4$ ~723B $+ (-G_{12} + G_{21} + G_{23} - G_{32})/2$ ~715B |
| D | R, L0 | | | 8 | | | | | | 8 | $N_{22} = (N_{13} + N_{33})/2$ |
| D | B, T0 | | | | | | | 8 | | 8 | $N_{22} = (N_{31} + N_{33})/2$ |
| D | L, R0 | 8 | | | | | | 8 | | | $N_{22} = (N_{11} + N_{31})/2$ |
| D | T, B0 | 8 | | 8 | | | | | | | $N_{22} = (N_{11} + N_{13})/2$ |
| D | UR | | | 8 | | | | 8 | | | $N_{22} = (N_{13} + N_{31})/2$ |
| D | DR | 8 | | | | | | | | 8 | $N_{22} = (N_{11} + N_{33})/2$ |
| D | TL0 | | | | | | | | | 16 | $N_{22} = N_{33}$ |
| D | TR0 | | | | | | | 16 | | | $N_{22} = N_{31}$ |
| D | BR0 | 16 | | | | | | | | | $N_{22} = N_{11}$ |
| D | BL0 | | | 16 | | | | | | | $N_{22} = N_{13}$ |
| C | N, UR, DR, N1 | | 4 | | 4 | | 4 | | 4 | | $G_{22} = (G_{12} + G_{21} + G_{23} + G_{32})/4$ |
| C | V, R0, L0 | | 8 | | | | | | 8 | | $G_{22} = (G_{12} + G_{32})/2$ |
| C | H, B0, T0 | | | | 8 | | 8 | | | | $G_{22} = (G_{21} + G_{23})/2$ |
| C | R | | | | | | 16 | | | | $G_{22} = G_{23}$ |
| C | B, TL0, TR0 | | | | | | | | 16 | | $G_{22} = G_{32}$ |
| C | L | | | | 16 | | | | | | $G_{22} = G_{21}$ |
| C | T, BR0, BL0 | | 16 | | | | | | | | $G_{22} = G_{12}$ |
| H | N, V, N1 ~716B | -4 | | -4 | 8 | 16 | 8 | -4 | | -4 | $N_{22} = (N_{21} + N_{23})/2$ ~717B $+ (-G_{11} - G_{13} - G_{31} - G_{33} + 4G_{22})/4$ |
| H | H, B, T, T0, B0 | | | | 8 | | 8 | | | | $N_{22} = (N_{21} + N_{23})/2$ ~720B |
| H | R, L0 | | | -4 | 8 | 16 | | | | -4 | $N_{22} = N_{23} + (-G_{13} - G_{33} + 2G_{22})/4$ |
| H | L, R0 | -4 | | | | 16 | 8 | -4 | | | $N_{22} = N_{21} + (-G_{11} - G_{31} + 2G_{22})/4$ |
| H | TL0, BL0 | | | | | | 16 | | | | $N_{22} = N_{23}$ |
| H | TR0, BR0 | | | | 16 | | | | | | $N_{22} = N_{21}$ |
| V | N, H, N1 ~718B | -4 | 8 | -4 | | 16 | | -4 | 8 | -4 | $N_{22} = (N_{12} + N_{32})/2$ ~719B $+ (-G_{11} - G_{13} - G_{31} - G_{33} + 4G_{22})/4$ |
| V | V, R, L, R0, L0 | | 8 | | | | | | 8 | | $N_{22} = (N_{12} + N_{32})/2$ ~721B |
| V | B, T0 | | | | | | | -4 | 16 | -4 | $N_{22} = N_{32} + (-G_{31} - G_{33} + 2G_{22})/4$ |
| V | T, B0 | -4 | 16 | -4 | | 8 | | | | | $N_{22} = N_{21} + (-G_{11} - G_{13} + 2G_{22})/4$ |
| V | TL0, TR0 | | | | | | | | 16 | | $N_{22} = N_{32}$ |
| V | BL0, BR0 | | 16 | | | | | | | | $N_{22} = N_{12}$ |

Fig. 7B

| P | BD | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | S A | S B | S C | S D | S E | S F | S G | S H |
|---|---|---|---|---|---|---|---|---|---|---|---|---|---|---|---|---|---|---|---|---|---|---|---|---|---|---|---|---|---|---|---|---|---|---|
| D | TL | | | | | | | | | | | | | | | | | | | | | | | | | | | | | | | | | |
| D | TR | | | | | | | | | 16 | | | | | | | | | | | | | | | | | | | | | | | | |
| D | BL | | | | | | | 16 | | | | | | | | | | | | | | | | | | | | | | | | | | |
| D | BR | | | | | | | | | | | | | | | | | | | | | | | | | | | | | | | | | |
| C | TL | | | | | | | | 8 | | | | | 8 | 8 | | | | 8 | | | | | | | | | | | | | | | |
| C | TR | | | | | | | | 8 | | | | 8 | | 8 | | | | 8 | | | | | | | | | | | | | | | |
| C | BL | | | | | | | 8 | | | | | 8 | | | | | | | | | | | | | | | | | | | | | |
| C | BR | | | | | | | | | | | | | | | | | | | | | | | | | | | | | | | | | |
| H TL, BL, I0 | | | | | | | | | | | | | 16 | | 16 | | | | | | | | | | | | | | | | | | | |
| H BR, TR, R0 | | | | | | | | | | | | | | | | | | | | | 16 | | | | | | | | | | | | | |
| V TL, TR, I0 | | | | | | | | | | 16 | | | | | | | | | | | | | | | | | | | | | | | |
| V BL, BR, B0 | | | | | | | | | | | | | | | | | | | -2 | | | | | | | | | | | | | | | |
| D | L0 | | | | -4 | | | | 4 | 8 | -2 | -4 | -4 | 8 | -4 | -4 | | -2 | 4 | 8 | | -2 | | -4 | -2 | | | 0 | 2 | 2 | 0 | | | | 1 |
| D | R0 | | -2 | -4 | | | | 8 | 4 | | | -4 | 4 | 8 | 4 | -4 | | 8 | -4 | 8 | | | -2 | -4 | | | 0 | | 2 | 0 | 1 | 0 | | 0 |
| D | T0 | | | | | | | 8 | | | | | | 8 | | | | 8 | | | | | | | | | | 0 | | 1 | 3 | 0 | 1 | 0 | 1 |
| D | B0 | 0 | | | | | -2 | -8 | -4 | 8 | | -4 | | 8 | 4 | 4 | | | 4 | -4 | 8 | | | | | | 1 | 0 | 3 | 2 | | | | |
| SEL | | SC | SD | SA | SE | SD | SE | SE | | SA | SA | SD | SG | 22 | SH | SB | SC | SB | SF | SC | SB | SA | | | | | | | | | | | | |
| | | SD | | SE | | | | | | | SH | SH | | | SG | SC | | | | | | | | | | | | | | | | | | |
| INPT | | 0 | 0 | 0 | 1 | 1 | 2 | | | 1 | 1 | 3 | 0 | 22 | 1 | 0 | 1 | | 1 | 2 | 2 | 2 | | | | | | | | | | | | |
| | | | | | | 2 | | | | | | 0 | | | | | | | | | | | | | | | | | | | | | | |

KEY: 11001100
DECODE: Hor or Vert

KEY: 00110011
DECODE: Hor or Vert

KEY: 11001100
DECODE: Hor or Vert

KEY: 00110011
DECODE: Hor or Vert

| TL | TL | T0 | T0 | T0 | T0 | TR | TR |
|----|----|----|----|----|----|----|----|
| TL | TL | H1 | H1 | H1 | H1 | TR | TR |
| L0 | V1 |    |    |    |    | V1 | R0 |
| L0 | V1 |    |    |    |    | V1 | R0 |
| L0 | V1 |    |    |    |    | V1 | R0 |
| BL | BL | H1 | H1 | H1 | H1 | BR | BR |
| BL | BL | B0 | B0 | B0 | B0 | BR | BR |

Fig. 11

| TL0 | T0 | T0 | T0 | T0 | T0 | T0 | TR0 |
|---|---|---|---|---|---|---|---|
| L0 | N1 | N1 | N1 | N1 | N1 | N1 | R0 |
| L0 | N1 | | | | | N1 | R0 |
| L0 | N1 | | | | | N1 | R0 |
| L0 | N1 | | | | | N1 | R0 |
| L0 | N1 | N1 | N1 | N1 | N1 | N1 | R0 |
| BL0 | B0 | B0 | B0 | B0 | B0 | B0 | BR0 |

Fig. 11A

RGi = not((Bi4 xor Bi6) or (Bi6 xor Bi3) or (Bi8 xor Bi9)) and (Bi8 xor Bi3) ⟋ 1401B
RG = (RG3 or RG4 or RG6 or RG8 or RG9) ⟍ 1402B BGi = not((Bi3 xor Bi6) or (Bi6 xor Bi8) or (Bi9 xor Bi4)) and (Bi4 xor Bi3) ⟋ 1403B
BG = (bG3 or bG4 or bG6 or bG8 or bG9) ⟍ 1404B LGi = not((Bi8 xor Bi6) or (Bi6 xor Bi9) or (Bi4 xor Bi3)) and (Bi8 xor Bi3) ⟋ 1405B
LG = (LG3 or LG4 or LG6 or LG8 or LG9) ⟍ 1406B TGi = not((Bi9 xor Bi6) or (Bi6 xor Bi4) or (Bi3 xor Bi8)) and (Bi4 xor Bi3) ⟋ 1407B
TG = (TG3 or TG4 or TG6 or TG8 or TG9) ⟍ 1408B Priority green pixel location:
(ME or CME), H, V, RG, BG, LG, TG, N ⟋ 1409B URNGi = not((Bi6 xor Bi4) or (Bi1 xor Bi3)) and (Bi4 xor Bi3) ⟋ 1410B
URNG = (URNG1 or URNG3 or URNG4 or URNG6) ⟍ 1411B DRNGi = not((Bi4 xor Bi1) or (Bi3 xor Bi6)) and (Bi4 xor Bi3) ⟋ 1412B
DRNG = (DRNG1 or DRNG3 or DRNG4 or DRNG6) ⟍ 1413B RNGi = not((Bi4 xor Bi1) or (Bi1 xor Bi3)) and (Bi6 xor Bi4) ⟋ 1414B
RNG = (RNG1 or RNG3 or RNG4 or RNG6) ⟍ 1415B BNGi = not((Bi1 xor Bi3) or (Bi3 xor Bi6)) and (Bi4 xor Bi6) ⟋ 1416B
BNG = (BNG1 or BNG3 or BNG4 or BNG6) ⟍ 1417B LNGi = not((Bi3 xor Bi6) or (Bi6 xor Bi4)) and (Bi1 xor Bi3) ⟋ 1418B
LNG = (LNG1 or LNG3 or LNG4 or LNG6) ⟍ 1419B TNGi = not((Bi6 xor Bi4) or (Bi4 xor Bi1)) and (Bi3 xor Bi4) ⟋ 1420B
TNG = (TNG1 or TNG3 or TNG4 or TNG6) ⟍ 1421B Priority non-green pixel location:
(ME or CME), H, V, URNG, DRNG, RNG, BNG, LNG, TNG, N ⟋ 1422B

Fig. 14B

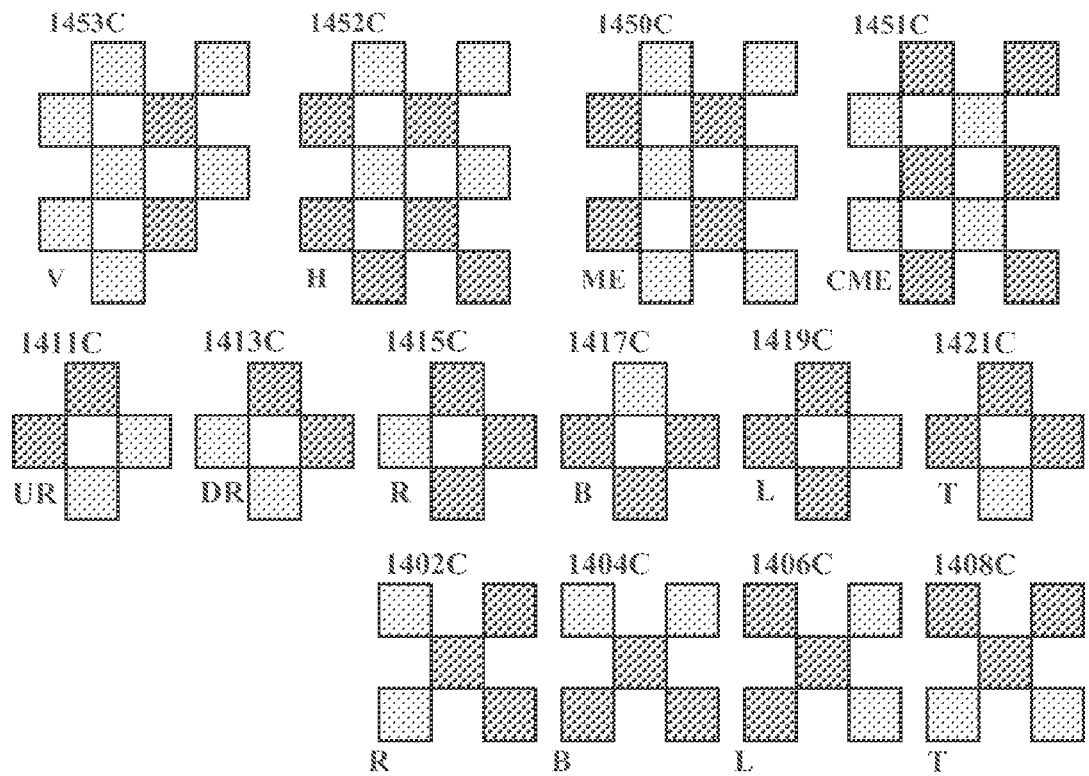
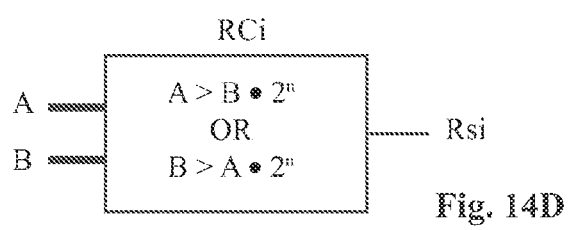
Fig. 14C
Fig. 14D

DIGITAL IMAGE PROCESSING FOR CALCULATING A MISSING COLOR VALUE

CROSS REFERENCE TO RELATED APPLICATIONS

This application claims priority of U.S. Provisional Patent Application No. 61/181,770, filed May 28, 2009 and 61/222,532, filed Jul. 2, 2009, under 35 U.S.C. 119(e); the entire content of each is incorporated herein by reference. This application is a continuation-in-part of U.S. patent application Ser. No. 12/697,600, filed Feb. 1, 2010, published Aug. 5, 2010, as Publication No. 2010/0195908A1. The content of each of these applications is incorporated in their entireties herein by reference.

INTRODUCTION

It has become desirable to obtain a first series of high dynamic range digital images from high dynamic range digital sources, demosaic the first series of high dynamic range digital images to obtain a second series of high dynamic range digital images having missing color data for each pixel of the first series imputed. It has become desirable to obtain a series of high dynamic range digital images from high dynamic range digital sources, convert said series of high dynamic range digital images to a second series of digital images having a lower dynamic range and display the series of digital images having a lower dynamic range on a display. It should be understood that a series of high dynamic range digital images having missing color data imputed may constitute the high dynamic range digital image source. Commonly assigned U.S. Provisional Patent Application Ser. No. 61/222,532, filed Jul. 2, 2009, discloses such a combination; the entire content of this provisional is incorporated herein by reference.

Commonly assigned U.S. Provisional Patent Applications Nos. 60/900,588, 60/902,728 and 61/008,762; U.S. patent application Ser. No. 11/999,623, issued Oct. 16, 2012, as U.S. Pat. No. 8,289,430; U.S. patent application Ser. No. 12/082,215, published Oct. 15, 2009, as Publication No. 2009/0256938A1, U.S. patent application Ser. No. 12/150,234, to issue Ser. No. 12/157,476, published Jul. 30, 2009, as Publication No. 2009/0190015A1; and Taiwanese Patent Application No. 97103404, filed Jan. 30, 2008, describe high dynamic range sources for use with the present invention. The disclosures of each of the above are incorporated in their entireties herein by reference.

Commonly assigned U.S. Provisional Application No. 60/780,655 filed on Mar. 9, 2006; U.S. Provisional Application No. 60/804,351 filed on Jun. 9, 2006; U.S. patent application Ser. No. 11/684,366, published Mar. 20, 2008, as Publication No. 2008/0068520; U.S. patent application Ser. No. 12/193,426, published Apr. 16, 2009, as Publication No. 2009/0096937A1; U.S. patent application Ser. No. 12/570,585, published Aug. 12, 2010, as Publication No. 2010/0201816A1; and U.S. Provisional Patent Application Ser. No. 61/286,452, filed Dec. 15, 2009, describe various displays for use with the present invention. The entire disclosures of each of these applications are incorporated herein by reference.

It should be understood that a source for high dynamic range digital images may be synthetic in nature; a high dynamic range digital image may be synthesized from a series of images of a give scene acquired with varying exposures. It also should be understood that any commercially available display may be incorporated. In at least one embodiment, a high dynamic range digital image having 5,000,000-to-1 dynamic range is received and a second digital image is produced having a dynamic range of 256-to-1.

BRIEF DESCRIPTION OF THE FIGURES

FIGS. 7 and 7A depict tables of product term multipliers used by selectable interpolation equations to calculate missing color data;

FIG. 7B depicts a table that indicates selection of product term multipliers that give improved performance, particularly in high contrast regions of the image;

FIGS. 9 and 9A depict extended tables of product term multipliers to supplement those of FIGS. 7 and 7A, respectively;

FIG. 11 depicts classification of pixels near the border of a digital image used to provide missing color data interpolation calculations;

FIG. 11A depicts classification of pixels near the border of a digital image for use in association with FIG. 7B;

FIGS. 14A and 14B depict a simplified schematic of a preferred embodiment of the present invention implementing a multi-pattern based algorithm for use in association with FIG. 7B;

FIG. 14C depicts pattern images that correspond to various edges and image features along with their orientation that are indicated by true indications for corresponding equations of FIGS. 14A and 14B;

FIG. 14D depicts detail for high contrast ratio detection circuits RC1 through RC9 used in FIG. 14A.

DETAIL DESCRIPTION

Figure 1:
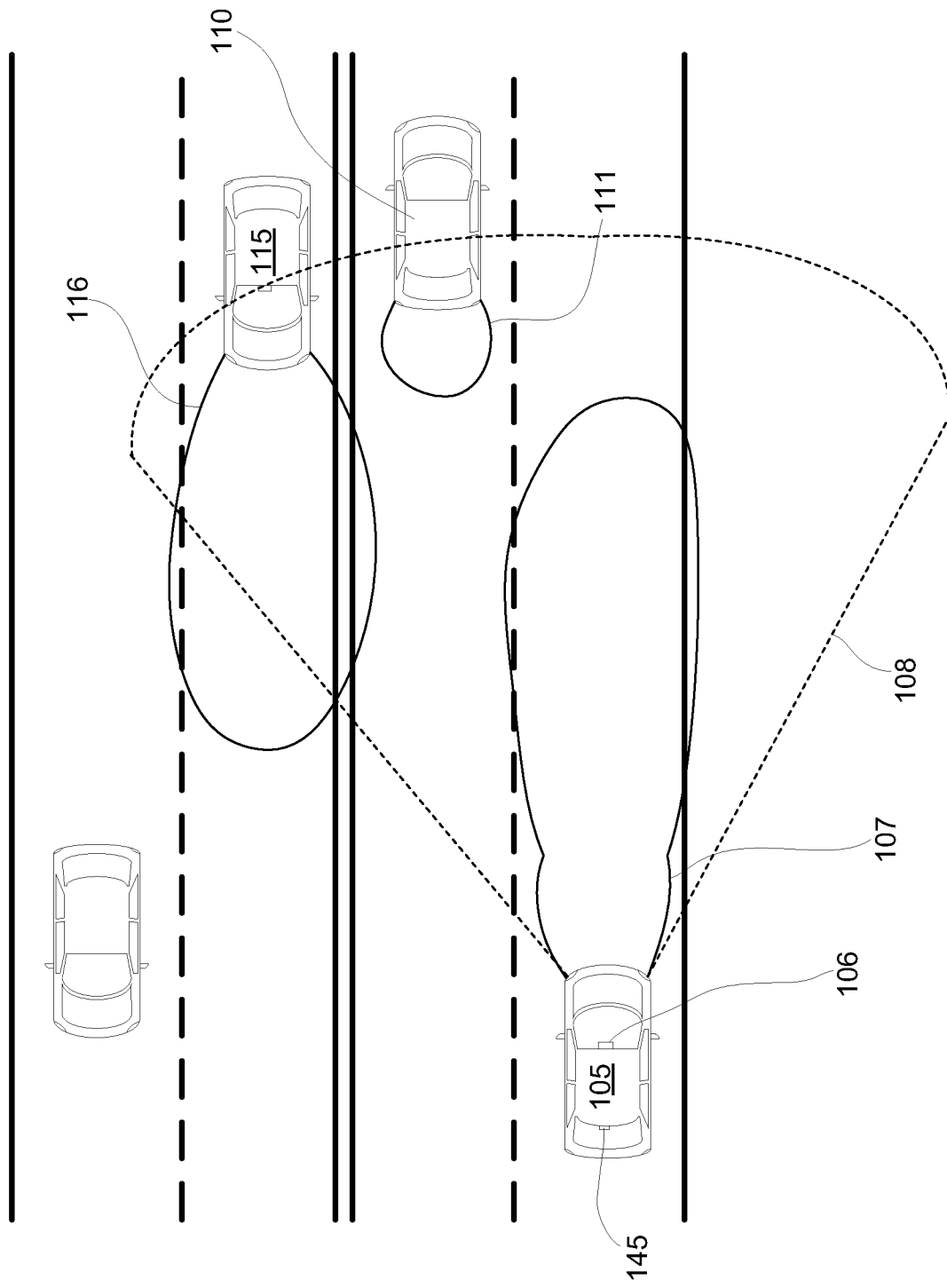
FIG. 1 depicts a plan view of a controlled vehicle proximate other vehicles on a roadway.

Referring initially to FIG. 1, for illustrative purposes, an automatic vehicle equipment control system 106 is shown to be installed within a controlled vehicle 105. Although the control system 106 is depicted to be integral with the interior rearview mirror assembly, it should be understood that the control system, or any of the individual components thereof, may be mounted in any suitable location within the interior, or on the exterior, of the controlled vehicle 105. The term "controlled vehicle" is used herein with reference to a vehicle comprising an automatic vehicle exterior light control system. Suitable locations for mounting the associated image sensor are those locations that provide an unobstructed view of the scene generally forward of the controlled vehicle 105 and allow for detection of headlights 116 of oncoming vehicles 115 and taillights 111 of leading vehicles 110 within the glare zone 108 associated with the controlled vehicle.

Figure 2:
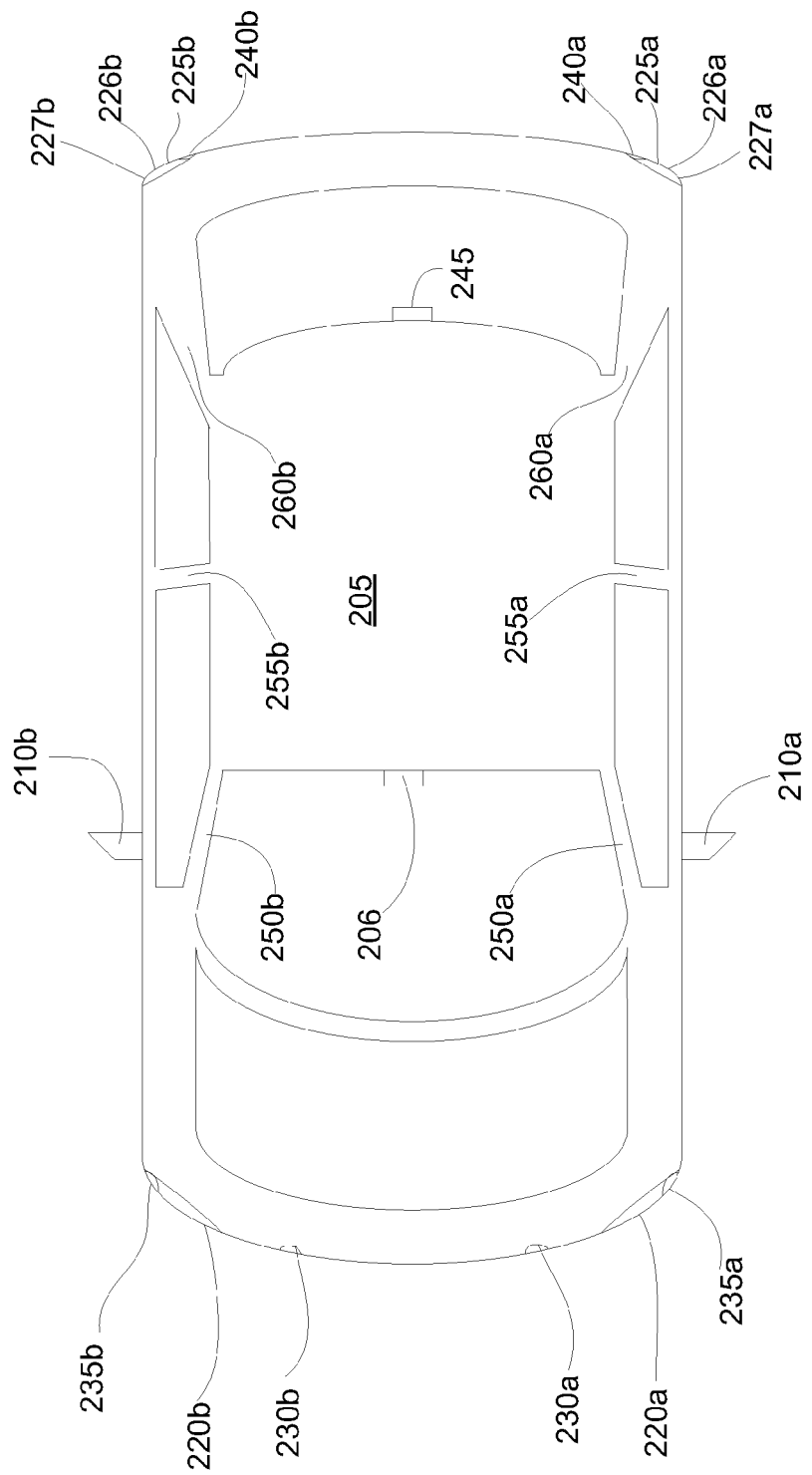
FIG. 2 depicts a plan view of a controlled vehicle having various systems.

FIG. 2 depicts a controlled vehicle 205 comprising an interior rearview mirror assembly 206 incorporating an automatic vehicle exterior light control system. The processing and control system functions to send configuration data to the imager, receive image data from the imager, process the images and generate exterior light control signals. Detailed descriptions of such automatic vehicle exterior light control systems are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, and 6,631,316 and U.S. patent application Ser. Nos. 10/208,142, now U.S. Pat. No. 6,774,988; 09/799,310, now U.S. Pat. No. 6,613,316; 60/404,879; 60/394,583; 10/235,476, now U.S. Pat. No. 6,861,809; 10/783,431, now U.S. Pat. No. 6,895,684; 10/777,468, now U.S. Pat. No. 8,045,760; and 09/800,460, now U.S. Pat. No. 6,587,573; the disclosures of which are incorporated herein in their entireties by reference. The controlled vehicle is also depicted to include a driver's side outside rearview mirror assembly 210*a*; a passenger's side outside rearview mirror assembly 210*b*; a center high mounted stop light (CHMSL) 245; A-pillars 250*a*, 250*b*; B-pillars 255*a*, 255*b* and C-pillars 260*a*, 260*b* It should be understood that any of these locations may provide alternate locations for an image sensor, image sensors or related processing and, or, control components. It should be understood that any, or all, of the rearview mirrors may be automatic dimming electro-optic mirrors. The controlled vehicle is depicted to include a host of exterior lights including headlights 220*a*, 220*b*; foil weather lights 230*a*, 230*b*; front turn indicator/hazard lights 235*a*, 235*b*; tail lights 225*a*, 225*b*; rear turn indicator lights 226*a*, 226*b*; rear hazard lights 227*a*, 227*b* and backup lights 240*a*, 240*b*. It should be understood that additional exterior lights may be provided, such as, separate low beam and high beam headlights, integrated lights that comprise multipurpose lighting, etc. It should also be understood that any of the exterior lights may be provided with positioners (not shown) to adjust the associated primary optical axis of the given exterior light. It should be understood that the controlled vehicle of FIG. 2 is generally for illustrative purposes and that suitable automatic vehicle exterior light control systems, such as those disclosed in the patents and patent applications incorporated herein by reference, may be employed along with other features described herein and within disclosures incorporated herein by reference.

In at least one embodiment, a plurality of imaging devices are incorporated in a vehicle vision system along with at least one display configured to provide the driver with a "bird's eye" view of the area surrounding the controlled vehicle. For example, a first imaging device is integrated into an interior rearview mirror assembly viewing generally forward of the controlled vehicle, a second imaging device is integrated into a CHMSL assembly viewing generally rearward of the controlled vehicle, a third imaging device is mounted proximate the driver's side of the controlled vehicle and a fourth imaging device is mounted proximate the passenger's side of the controlled vehicle. In at least one related embodiment, a digital image processing algorithm is implemented to synthetically "stitch" the individual images into one contiguous image for display to the driver. Any given imaging device, combination of imaging devices or sub-combination of imaging devices may then be employed for additional automatic control/warning tasks, such as; automatic high-beam assist, lane departure, accident reconstruction, collision avoidance, tunnel detection, pedestrian detection, sign recognition, fog light control, etc.

Figure 3A:
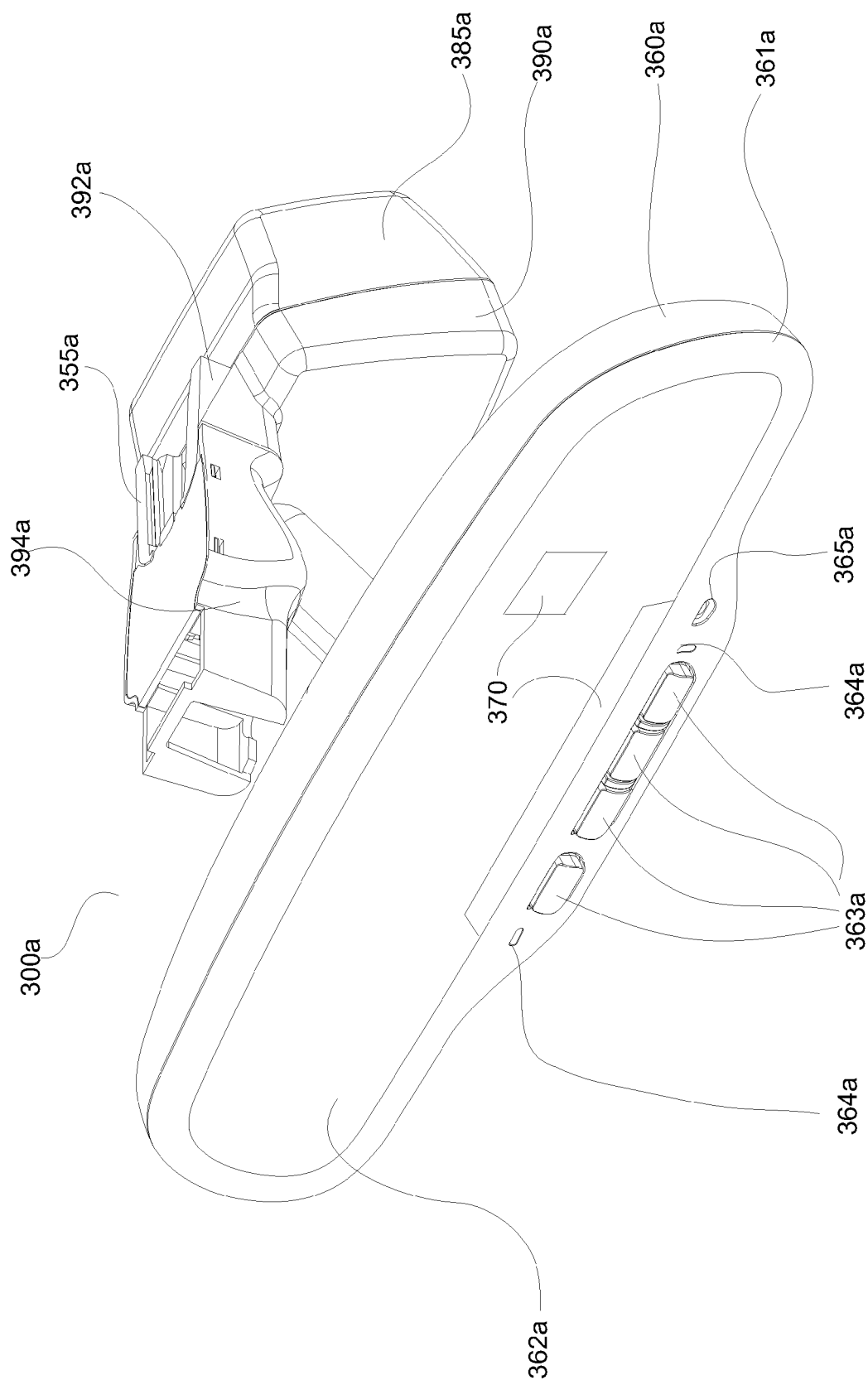
FIGS. 3a and 3b depict perspective views of a rearview assembly for a controlled vehicle.
Figure 3B:
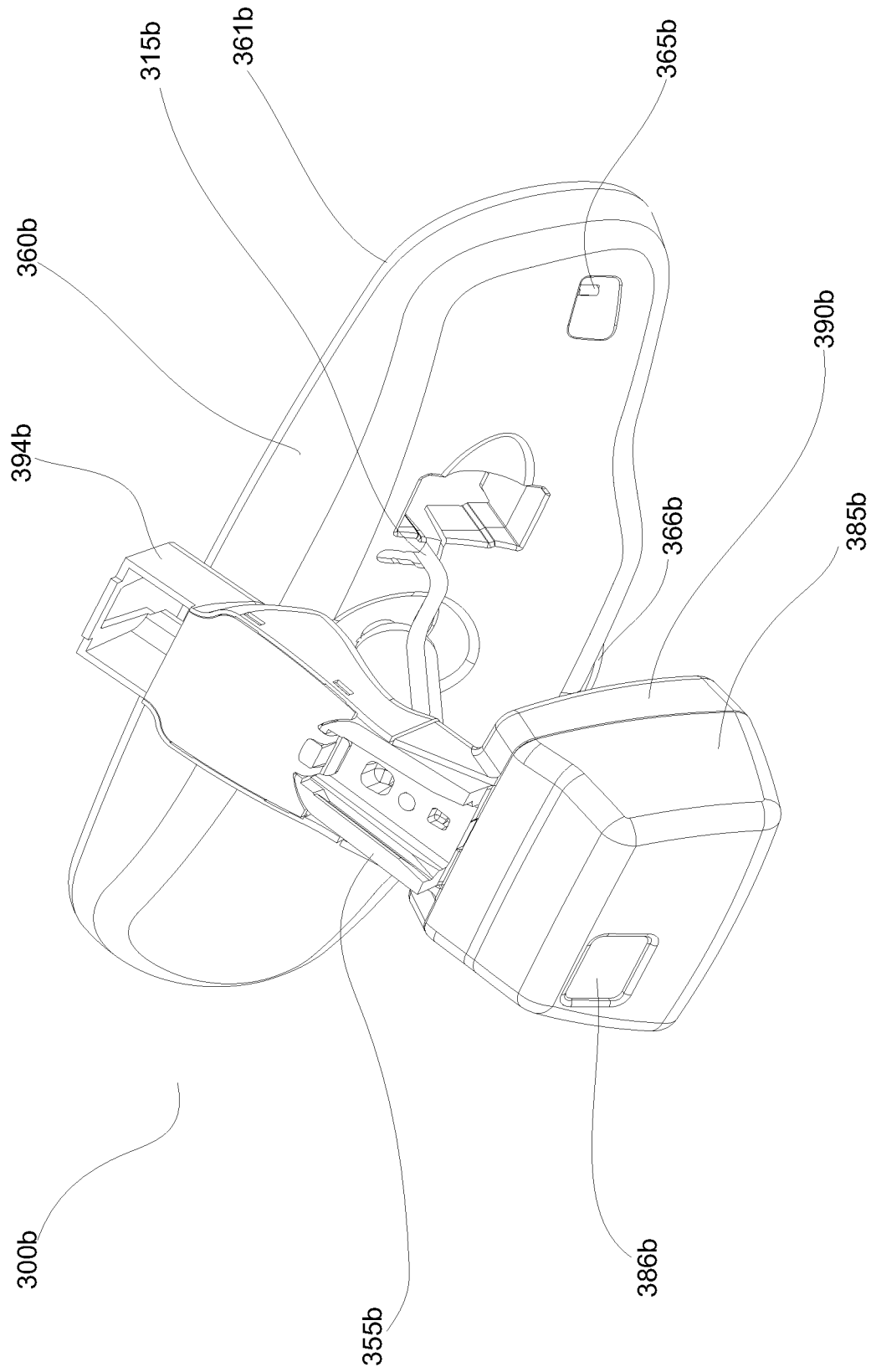

Turning now to FIGS. 3*a* and 3*b*, an embodiment of an interior rearview mirror assembly 300*a*, 300*b* is shown. The mirror assembly includes a stationary accessory assembly enclosed within a front housing 385*a*, 385*b* and a rear housing 390*a*, 390*b*. The front housing comprises an aperture 386*b* defining an image sensor visual opening. The stationary accessory assembly along with a rearview mirror is carried by an attachment member 355*a*, 355*b*. The rearview mirror comprises a mirror housing 360*a*, 360*b*, a bezel 361*a*, 361*b* and a mirror element 362*a*. A wire cover 394*a*, 394*b* is included to conceal related wiring 315*b*. The rearview mirror assembly 300*a*, 300*b* also incorporates an ambient light sensor 365*b*, at least one microphone 366*b*, a glare light sensor 365*a*, operator interfaces 363*a*, indicators 364*a* and at least one information display 370.

Figure 4:
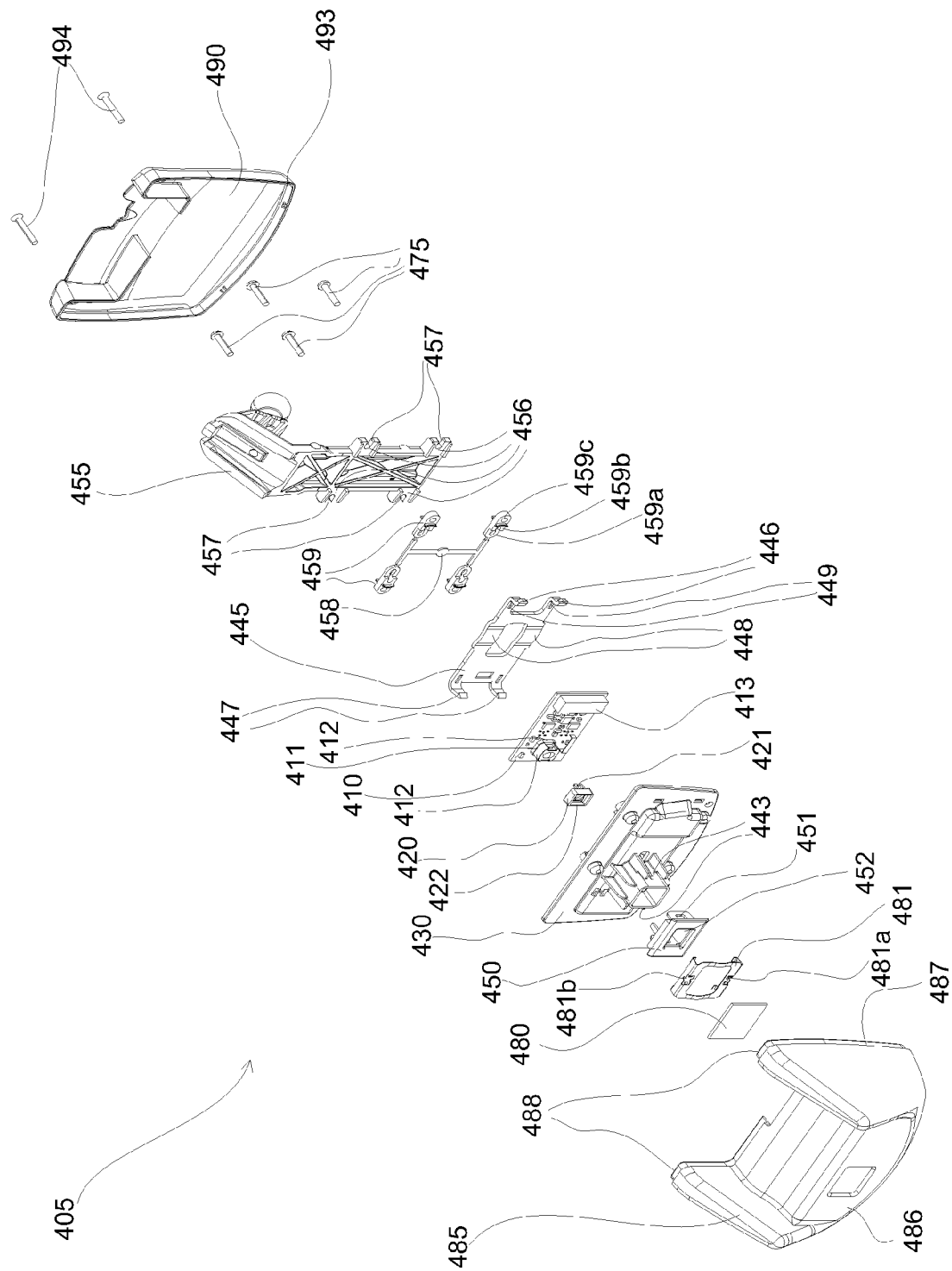
FIG. 4 depicts an exploded, perspective, view of a controlled vehicle accessory module.

Turning now to FIG. 4, there is shown an exploded, perspective, view of an accessory and rearview mirror mount assembly 405. In a preferred embodiment, the accessory and rearview mirror mount assembly provides a rigid structure for mounting a repositionably mounted interior rearview mirror along with a precisely aligned image sensor either stationarily mounted as described in more detail within commonly assigned U.S. patent application Ser. No. 10/783,273, published Aug. 26, 2004, as Publication No. 2004/0164228A1 or automatically repositioning as described in commonly assigned U.S. patent application Ser. No. 10/645,801, now U.S. Pat. No. 7,565,006, both of which are hereby incorporated in their entireties herein by reference. A preferred accessory and rearview mirror mount assembly facilitates ease of assembly as well as provides for repeatable, reliable and precise alignment of the related components. In at least one embodiment, the associated imager is used for automatic exterior vehicle light control for which precision alignment of the image sensor is preferred. It should be understood that the present invention has broad application to light sensing optics generally, in addition to, automotive and consumer electronics applications.

Imager board 410 is provided with an image sensor with lens 411. In a preferred embodiment, the imager board will also include an image sensor control logic and timing circuit, communication line drivers and wire harness receptacle 413. Optionally, the imager board may comprise a processor for receiving and, at least partially, processing images obtained from the image sensor. In a preferred embodiment, the image sensor and at least one other device selected from the group comprising: 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. In at least one embodiment, the image sensor with lens 911 includes lens cover snap portions 412 for engaging a lens cover 420 and snap clips 421. The lens cover has an aperture 422 for alignment with the optical axis of the image sensor and lens. Various suitable optical systems, such as those depicted and described in commonly assigned U.S. Pat. Nos. 5,990,469; 6,008,486; 6,130,421; 6,130,448; 6,049,171; and 6,403,942 and U.S. Patent Application No. 60/495,906; the disclosures of which are incorporated herein in their entireties by reference; may be employed. It should be understood that optics in accordance with the present invention may obviate the need for a lens cover 420 as described in detail herein. It should be understood that the lens cover snap portions, the lens optical cover and snap clips may be eliminated with use of optical elements in accordance with the present invention. In at least one embodiment, the "lens cover" is formed on a molded organic material optics element using a laser as described in detail herein.

An imager board wiring harness (not shown) is preferably provided with plugs on either end thereof. The imager board is preferably provided with a male receptacle 413 for receiving one of the plugs of the imager board wiring harness (not shown).

Figure 5:
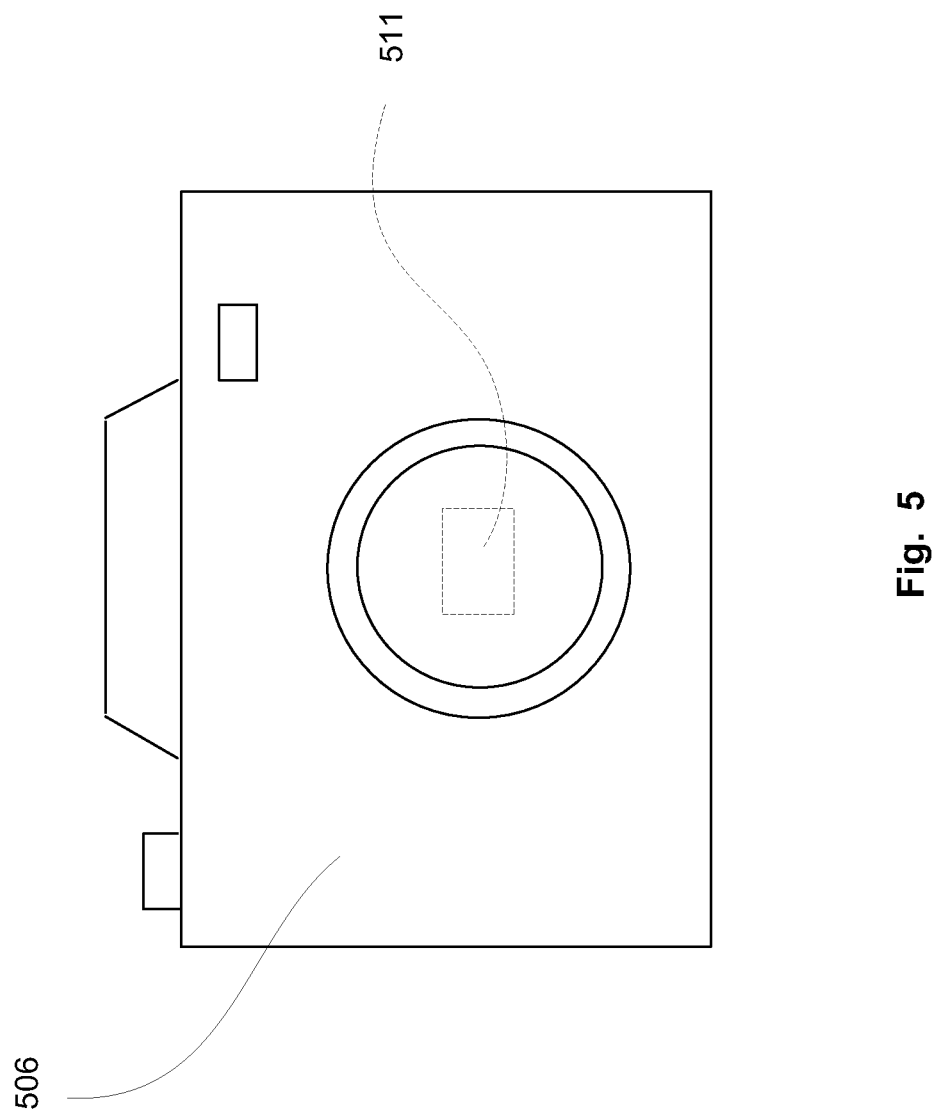
FIG. 5 depicts a profile view of a digital camera.

FIG. 5 depicts a profile view of a digital camera 506 in accordance with the present invention having an imager with lens 511. It should be understood that optics in accordance with the present invention may be incorporated into a host of assemblies included, but not limited to, light sensing, image acquisition, moisture sensing, rear-vision systems, lane departure detection systems, adaptive cruise control systems, occupancy detection systems, security systems, vision systems, color measurement systems, head lamp control systems, variable reflectance rearview mirror control systems, digital video recorders and digital cameras.

Each pixel, irrespective of any associated spectral characteristics, occupies a given spatial area within a two dimensional array of pixels. Often it is desirable to impart color information in addition to grayscale luminance for any given specially located pixel. Typically, when spectral filtering is incorporated, each pixel within an imaging device will have an associated spectral filter. Red, green and blue spectral filtering, more specifically a "Bayer" pattern represented by two green, one red and one blue spectral filtered pixels, has become prevalent.

In a typical application of the present invention, missing color values are determined for pixels in an image from an imager that provides one of three color values for each pixel location. Values for the missing pixel color components are determined using techniques that are suitable for but not limited to images having high dynamic range data. Examples are provided herein for a Bayer pattern with red, green, and blue filters. Many of the features of this invention extend naturally to arrays that employ filters of other colors including those with complementary cyan, magenta, and yellow filters, or to filter arrays including clear or substantially unfiltered pixels, and the invention is intend to extend to these applications.

Prior art includes techniques to improve the fidelity of missing color values that are supplied based on known patterns of spatial correlation between separate colors in the image. Examples are U.S. Pat. No. 7,502,505 B2, to Malvar et al., and U.S. Pat. No. 5,805,217A1, to Lu et al. Other prior art techniques provide further improvements based on detecting the presence and orientation of edges in the image. Many techniques to detect edges in the image are based on a determination of one or more first or second derivatives calculated using pixel samples, usually of the same color and from the same row or column for calculation of a given derivative value. An example is US2005/0200733A1 to Malvar, now U.S. Pat. No. 7,643,676. Such techniques may employ one or more threshold values that are applied globally to determine when the value of a calculated derivative is large enough to be classified as an edge. Since most color filter arrays do not include adjacent pixels with the same color, adjacent rows or columns are not sampled in many of the derivative based calculations used in prior art thereby making them ineffective or inconsistent at best in detecting stripes that are one pixel wide. For high dynamic range data, pixel luminance values at edges may differ by thousands or even by a million to one in a scene making response of derivatives to an edge in a dimly lighted area much different than response to an edge in a brightly lighted area so comparison of the derivative values to preselected threshold values to determine the presence or absence of a significant edge does not work well with high dynamic range images. In one related embodiment, the present invention relies on a pattern based approach to detect both the presence and the orientation of edges in the image.

U.S. Pat. No. 4,630,307, to Cok, classifies patterns of pixels as geometrical image features and selects from a plurality of image routines based on these features. In examples in the '307 specification, features are classified as edges, stripes, or corners without specifically classifying orientation. In a preferred configuration described in the specification, a set of 4 pixels neighboring the pixel site for which missing color values are being supplied is acquired and used to classify the image at the pixel site as an edge, stripe or corner and this classification is used to select from a plurality of interpolation routines to supply the missing pixel data. In the patent specification in '307 it is stated that the horizontal or vertical orientation of a one pixel wide stripe may not be determined by the four pixel sample and additional samples from an extended set of pixels are acquired in this case as part of the stripe based interpolation routine to interpolate pixel values for stripes and not as part of the pattern recognition routine used to select the interpolation routine for stripes. In the present invention, a sample of more than four, preferably 8 or more, pixels is used in an arrangement for which both the presence and direction of edges including those due to individual one pixel wide stripes may be detected based on the initial sample. Emphasis is on detecting directional orientation and presence or absence of edges based on the sample and making this determination both for discrete edges and for multiple edges that are generally parallel. This classification is preferably used to select an interpolation equation appropriate to the absence of an edge when none is detected and to select an algorithm appropriate to the direction of single or generally parallel multiple edges lying in selected ranges of directional orientation that are detected. A device configured in accordance with this invention performs interpolation using pixel data from pixels that are aligned in directions that are generally parallel to rather than perpendicular to edges in the image in the vicinity of the interpolation site. This results in smoother, sharper edges with greatly reduced zipper artifacts and fewer obviously miss-colored pixels. In a preferred implementation, a key is generated and modifications are made to circuits that perform the interpolation based on decoding of the key either via use of lookup tables and/or decoding circuit outputs. Use of a lookup table or decoder makes it relatively easy to implement a wide variety of options for adjustment to the interpolation circuit. These may optionally include in addition to the usual circuit configurations for nondirectional, and for horizontal and vertical edges, circuit configurations for edges with orientations that are diagonal upward to the right and for edges with orientations that are diagonal downward to the right. Specialized interpolations may also be provided for the border region of the image to use only values that are available and to further provide some degree of optimization in use of available data. As noted above, emphasis is on detection of edges and in their directional orientation without regard to the edge type as multiple (i.e. striped) or single. This does not exclude use of the flexibility of the pattern based image analysis to detect edge orientation and to further detect the type of edges, striped or single and optionally to further detect their specific orientation relative to the pixel for which interpolated values are being supplied (for example, if the pixel interpolation site is inside or outside of a stripe or which side of an edge it is on). Further, specialized interpolation may be provided for certain corner features that include an indication of the orientation of the corner.

An embodiment of the present invention as described in examples herein is configured to be capable of, but not limited, to providing interpolated data at 30 or more frames per second and calculates all values based on the value of the key, the position of the pixel in the image, the color being interpolated, and optionally on data collected from prior processing of pixel data. The circuit that performs the interpolation is configured for a specific interpolation operation based on some or all of the inputs just enumerated and provides the interpolated value based on a sum of products of pixel values from the original image with signed, preferably integer, multiplying factors. The sum of products may be negative or exceed a nominal maximum pixel value. It is preferable to provide a clamping operation as part of the interpolation calculation that replaces any values that would otherwise be negative with zero and as a further option may also replace any values that would otherwise exceed a maximum positive limit with this maximum positive limiting value. The pixel values output are preferably scaled to an integral power of 2, 16 for example, times the input pixel values so that round off errors may be minimized in the calculation but, at or near the end of the calculation, pixel values may be easily rounded or truncated to provide properly scaled output values.

Figure 7:
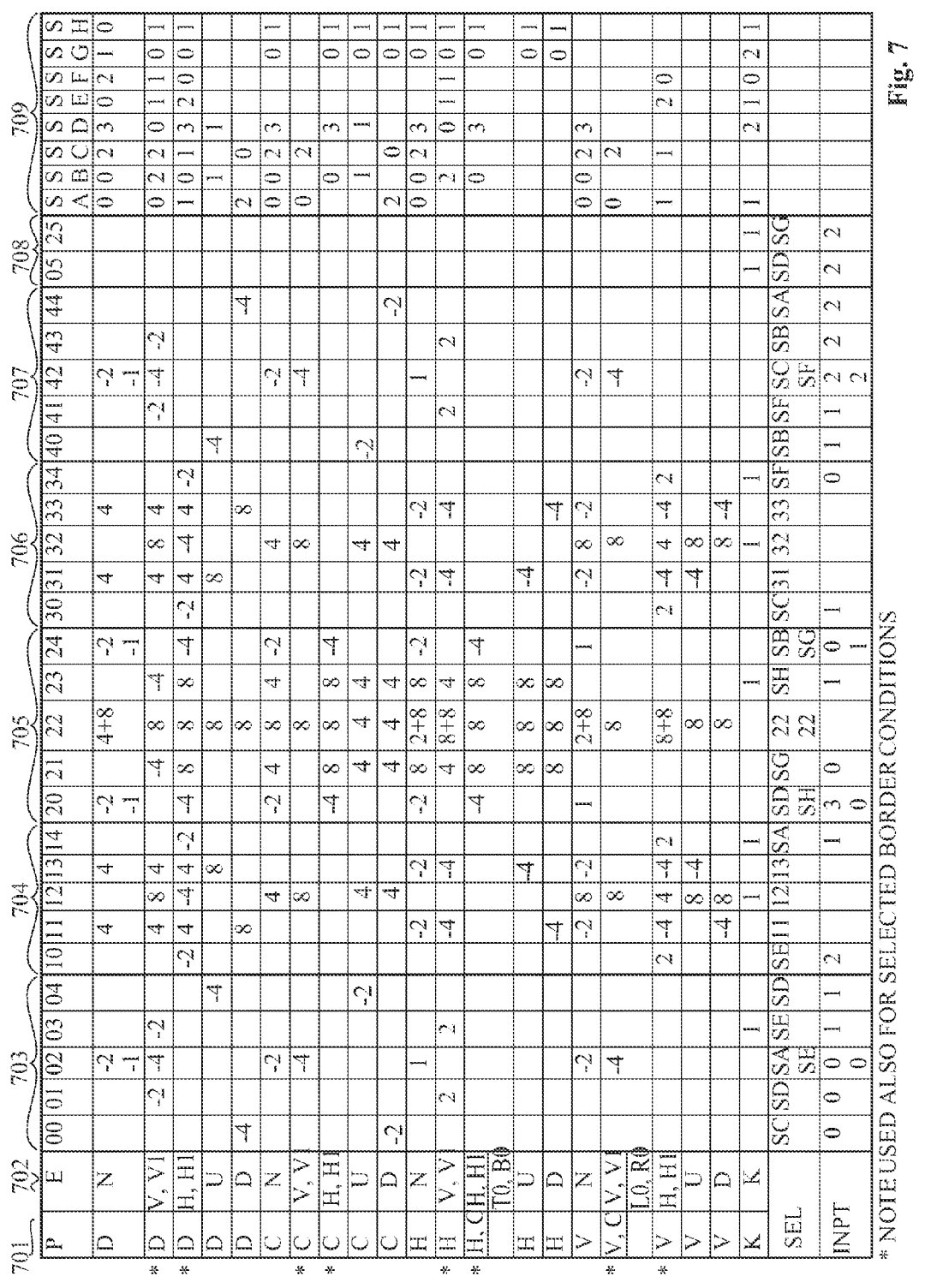
Figure 8:
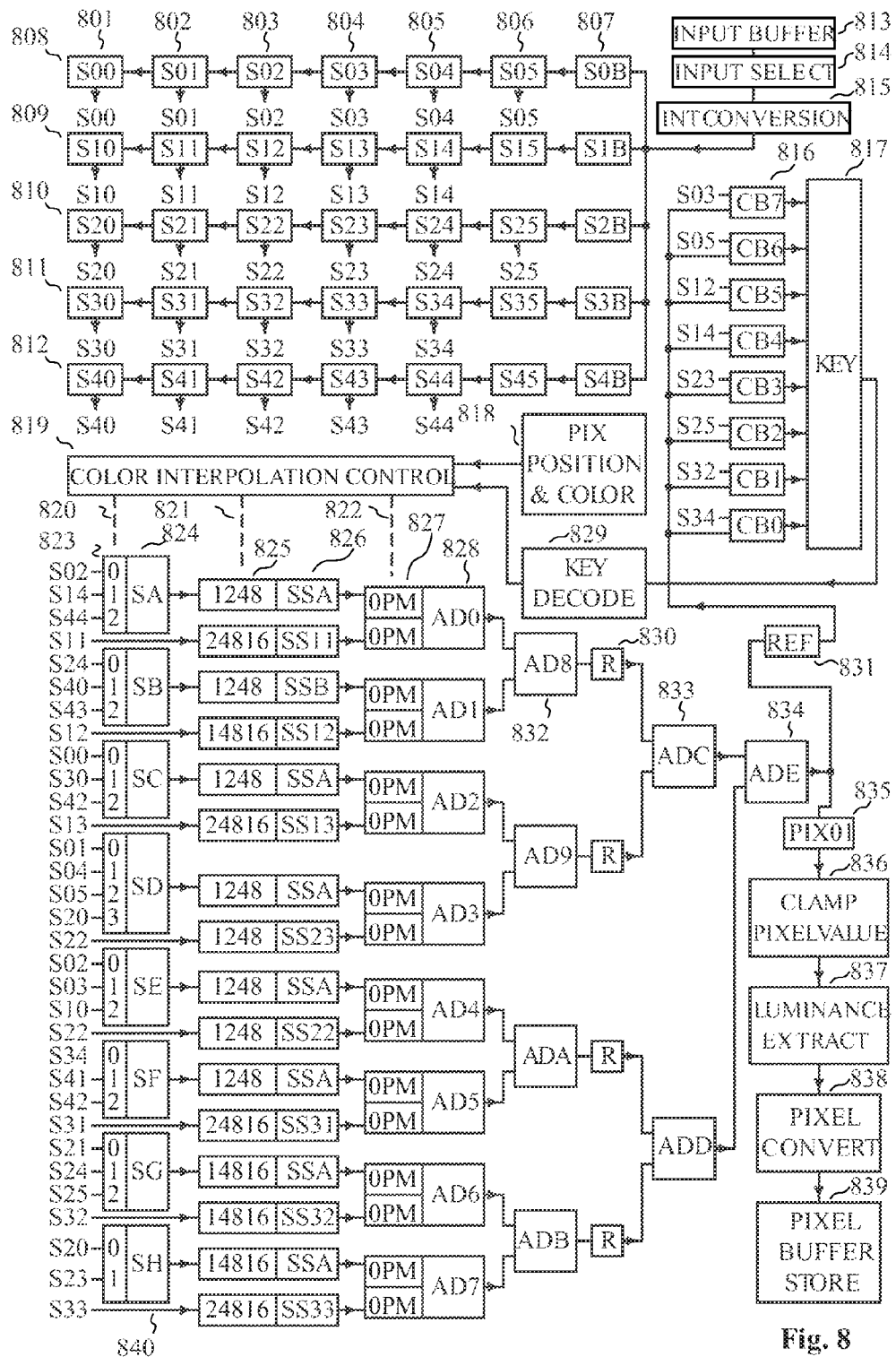
FIGS. 8 and 8A depict simplified schematics of embodiments of the present invention implementing averaging based algorithms.

FIG. 8 depicts a simplified schematic of a preferred embodiment of an apparatus that may be implemented in a number of ways including: a field programmable gate array (FPGA), an application specific integrated circuit (ASIC), the form of algorithm(s) executed by a corresponding processor, a combination thereof, or a sub-combination thereof configured to calculate and provide missing color values to an image that is typically acquired from an imager using a color filter array preferably a Bayer type filter pattern. FIG. 7 is a table of product term multipliers used by selectable interpolation equations to provide the missing color values. FIG. 9 is an extended table of product term multipliers that supplements the table in FIG. 7 with optional product term multipliers for use with pixels close to the border of the image. FIGS. 7 and 9 also provide select register settings to read appropriate terms from the array of imager readings provided in the device in FIG. 8. FIGS. 6A through 6L represent various examples of pixel patterns and their associated keys generated and used by the apparatus of FIG. 8 in determining the interpolation equation to select for a pixel value that is computed and supplied by the apparatus. FIGS. 10A through 10E depict a direction classifier for multiple fine line features of an image. FIG. 11 indicates classification of pixels near the border of the image used to provide interpolation calculations that are adapted to pixel sites that are near to one of the borders of the image so that the full array of supporting values to perform an interpolation is not available for these pixels.

As a specific example of an embodiment of the invention, an apparatus generates a key based on the values of five or more, preferably 8 like colored pixels selected from a neighborhood of one or more pixels for which missing color values are to be provided. The value of the key is used preferably as an index into a lookup table or as the input to a decoding apparatus to provide an indication or partial indication of which apparatus configuration to select from a multiplicity of selectable circuit configurations to provide the interpolated color value. In at least one embodiment of the invention given as an example, a sample of 8 green pixels having two pixels from each row and two pixels from each column including four consecutive rows and four consecutive columns are summed and a key is generated by individually comparing 8 times each of the pixel values used in the sum with the sum and assigning a value of "1" to the result of the comparison when 8 times the pixel value is greater than the sum of the eight pixel values and assigning a value of "0" otherwise. The eight binary digits, one for each pixel value compared, are assembled in a predetermined order to form an eight bit binary number that serves as a unique key or identifier of a two level image of the eight bit pixel array. The comparison of each of a multiplicity of pixel values to the sum is used to generate individual elements of a pattern and the entire pattern is then used in the determination of the apparatus configuration to select to provide interpolated color values for the pixel location. Basing the comparison on the average or sum of pixel values of the pixels used in the comparisons to generate the key has the effect of making the pattern generated strongly, and even primarily dependent on the relative value of pixels in the set used to generate the key and weakly dependent on the overall illumination of the pixels used to generate the key. This is in direct contrast to application of a predetermined or a globally established threshold value used in many gradient or derivative based edge detection arrangements and makes the invention applicable to images generated by high dynamic range imaging devices. In the example, each of the 256 patterns associated with the 256 possible values of the key may be viewed with 0 and 1 bit values coded as dark and light tiles, respectively, arranged geometrically as they appear in the pixel array from which the key is generated. Illustrations of this are provided in FIGS. 6D through 6L. From these patterns, a choice, in configuration of the apparatus or in the interpolation equation to choose for each pattern may be made using any of a variety of techniques including but not limited to inspection of the patterns associated with the keys as indicated in the examples to determine the presence or absence of edges along with their directions. The choice of interpolation equations to associate with various values of the key may also be established through use of a metric such as a least square error comparison between actual and reconstructed images verses choice of the interpolation equation chosen for each value of the key. Once the choice of interpolation equation for each value of the key is established, these are the relations that are preferably encoded as a lookup table or as a decoding apparatus. In a preferred configuration, one eight bit sample and its associated key is used to select interpolation equations for each of two pixels. Preferably the key may be decoded differently in selecting the interpolation equation for each of the pixels for which it is used to provide flexibility to select the interpolation apparatus based on the specific position of the pixel site in the array of eight pixels that are sampled. The position of the pixel site at which the interpolation is performed relative to eight pixels used to generate the key is illustrated in FIGS. 6B and 6C. As provided in the example, it is preferable that rows and columns containing pixels in the sample used to generate the key include those containing each pixel site where interpolation is performed and further include the row immediately above and the row immediately below each said pixel site where interpolation is performed and further include the column immediately to the left and the column immediately to the right of each said pixel site where interpolation is performed. The position of pixel 611 illustrates the location of the first pixel for which the key is used in FIG. 6B and the position of pixel 613 illustrates the location of the second pixel for which the key is used in FIG. 6C. Red and blue filtered pixels are not included in the group of 8 pixels used to generate the key, but two of the pixels used to generate the key lie in the same row as each pixel for which the key is used and two of the pixels used to generate the key lie in the same column as each pixel for which the key is used.

Figure 6A:
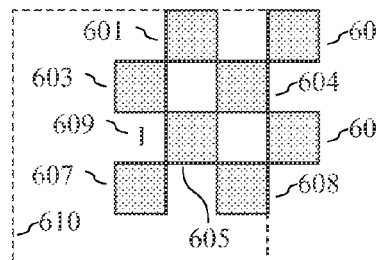
FIGS. 6A-H and J-L represent various examples of pixel patters and their associated keys generated and used by the apparatus of FIG. 8.
Figure 6B:
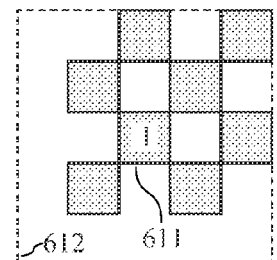
Figure 6C:
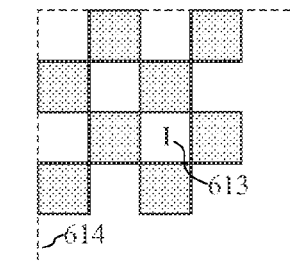

FIG. 6A depicts the eight green pixels 601 through 608 used to generate the key as indicated above. Note that the patterns of the array of 8 green pixels as selected to generate the key is depicted in consecutive locations in FIGS. 6A through 6C. In most of the interpolation operations, the same equations are applied to supply interpolated red pixel values as to supply interpolated blue pixel values and the essential distinction is to keep track of whether a red or a blue value is being supplied and to output it to the storage location for the proper color. Also, values for green pixels are typically handled in the same way whether the pixels cite for which the green value is being supplied is a red or blue filtered value. Because of the checkerboard pattern of the green filtered pixels and the presence of blue filtered pixels in alternate rows with red filtered pixels in intervening rows, the position in the array and the color pattern of the five by five pixel array may be determined by an alternating odd/even row number for a given pixel in the Bayer pattern in combination with the accompanying, alternating odd/even column number for the pixel location. The combined odd/even classification for the row and the column provides four discrete combinations to identify the set of interpolation routines from which to select the "red or blue blind" interpolation equation for each pixel location and these selections will be offset by one column for odd and for even rows. Since the 8 pixel array used to generate the key is preferably correlated with this alternating pattern, the columns at which the key is acquired and used as indicated in FIGS. 6A through 6C will also alternate by one column for interpolation operations provided for successive rows of pixels in the imaging array. As will be explained in the apparatus description associated with FIG. 8, pixels included in an interpolation operation are entered a column of 5 at a time into a six pixel wide by five pixel high shift register array containing a six stage shift register for each row. Each shift register cell is wide enough to contain the Bayer filtered color component read for the pixel, preferably in integer form. For example, for a high dynamic range sensor, this may require integer sizes and associated register widths of 24 bits or even more. Values are input on the right side and the six pixels in each of the five rows are shifted one pixel position to the left in preparation for supplying missing pixel color component values for the next pixel to the right. The oldest column of five pixels is lost from the array during the shift operation but supporting values are still present in the row buffer for image pixel values until row processing for a portion of the current row is complete and this portion of the oldest of the rows of buffered image data is no longer needed freeing this memory to be used in acquisition of the next row of image data. The dashed line square 610 depicts the 25 pixel five by five array of pixel values used to calculate interpolated pixel values for the pixel I at the center pixel location 609 of the five by five array. The previously generated key is used to select the apparatus arrangement to provide the interpolated values for pixel 609 and the additional column that contains pixel values 602 and 606 one column to the right of the 25 pixel array containing support values for the interpolation is provided to permit generation of the key while the previously generated key is used for pixel 609 so that the key generated for the pixels depicted in FIG. 6A is ready to apply for the next two pixels 611 in FIG. 6B and 613 in FIG. 6C. The 25 pixel array providing the basis for the calculation is depicted as 610, 612, and 614, respectively, in FIGS. 6A, 6B, and 6C that depict successive locations of pixels 601 through 608 used to generate the key as they are shifted left to perform interpolation operations for successive pixel locations in the row. The key generated from the 8 pixels 601 through 608 is normally used to select the apparatus configuration for pixel 611 and is located as indicated by the 8 shaded pixels of FIG. 6B during interpolation operations for the first of the two pixel locations 611 to which it is applied and is located as indicated by the 8 shaded pixels of FIG. 6C during interpolation operations for the second of the two pixel locations 613 to which it is applied. During performance of the interpolation sequence in FIG. 6C, the next key is preferably generated just as the current one was generated one pixel time early as depicted in FIG. 6A while a previously generated key was used in selection of an apparatus configuration to perform the interpolation operations for pixel location 609. As indicated above, interpolation locations 611 and 613 are each in rows and in columns containing pixels used to generate the key and the rows immediately above and immediately below and the columns immediately to either side of each of the interpolation locations for which the key is used also contain pixels used to generate the key.

Figure 6D:
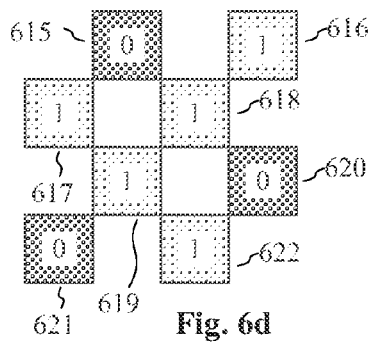
Figure 6E:
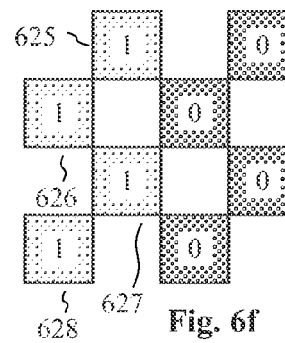
Figure 6F:
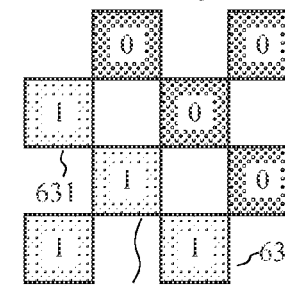
Figure 6G:
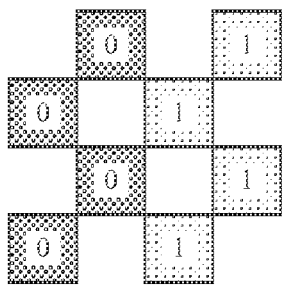
Figure 6H:
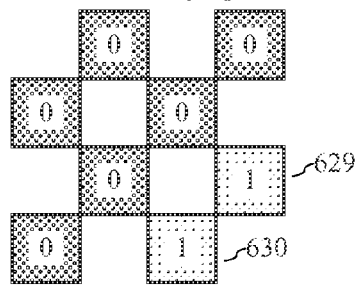
Figure 6J:
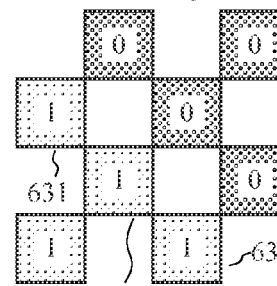

FIGS. 6D through 6L illustrate 8 of the 256 or so possible patterns used in selection of particular interpolation equations or apparatus configurations to use for interpolation. Many variants of the steps to generate the key may be used to practice the invention. In the example used in a preferred embodiment, eight pixels are used because the sample is large enough to determine the orientation of individual one pixel wide stripes and also multiplication by 8 may be performed by providing an offset that is equivalent to shifting individual pixels three bit positions to the left relative to bit positions in the sum against which they are compared. The multiplication by 8 is performed to effectively compare each of the individual pixel values with the average of the 8 pixels used to generate the key. The sum of eight values is preferably performed using preferably parallel add operations preferably sharing adder and pixel value selection circuits used to calculate the sum of terms for the interpolated color values that are supplied. By sharing this circuitry, relatively modest increases in circuit complexity are sufficient to compute the key. In FIG. 6D, the eight pixel values for green filtered pixels 615 through 622 are summed and the value of pixel 615 shifted 3 bit positions to the left to multiply it by 8 is compared to the sum of the 8 pixels and 0 is placed in the most significant, left most bit position 7 of the key since 8 times the value of pixel 615 is not greater than (is less than or equal to) the sum of the 8 pixel values. A circuit compares the value of pixel 616 left shifted by 3 bit positions against the same sum and 1 is placed in bit position 6 of the key indicating that 8 times the value of pixel 616 is greater than the sum of the 8 pixel values. This same operation is performed on the remaining 6 pixels, preferably in parallel for all of the 8 compare operations, and bits indicating the results of the compare operations are assembled in a prescribed order. The exact order or specific method of generating the key is not important if it is consistent and if lookup table entries and/or decoder circuits are correctly correlated with the relation of values of the key to the actual pattern of the two value image associated with the sampled pixels. Such modifications are considered to be within the scope of the invention. In the examples, the pixel compare results are assembled in order from the most significant to the least significant bit of the key going first from left to right and then from top to bottom in the array of associated pixels so that the results of the compare operations for pixels 615 through 622 are mapped in order to bits 7 through 0 of the key. As an option, it may be observed that in many applications it may make little difference whether the pattern is a bright feature in a darker field or a complementary dark feature in a bright field. In other words, if complementary patterns are to be treated in the same way, one of the 8 bits in the initial key value may be selected and the entire key may be conditionally complemented to create a resulting key for which one bit is always a one or always a zero. This halves the size of the lookup table or the decoding combinations needed to translate the key to select the appropriate circuit configurations to supply a particular interpolated pixel value. This is an option whose use is contingent on whether complementary patterns are to be treated in the same way and then on whether the saving in decoding resources outweighs the cost in time to perform the conditional complementing operation. The time to provide the conditional complement can be very small so use of the option is preferred but not required if the complementary patterns are deemed to be equivalent. Since the circuit has the information as to whether or not the key is complemented, this information may be used with the abbreviated result from the lookup table or decoding circuit used with the complementing option to still provide distinction in actions taken for complementary values of the initial key. For example, for the complementary patterns depicted in FIGS. 6K and 6L and 10A through 10D, it is preferred to take distinctly different actions depending on the complementary state of the original key before conditional complementing. In this case, if the conditional complementing as just described is used, the distinction in actions needed may be effected by use of the signal that indicates whether the key was complemented in the conditional complementing operation along with the indication of the presence of one of the two patterns given by the key for to which the complementing option is applied. The ability to assign any interpretation to each of the patterns provides great flexibility in the assignment so examples given herein are only examples and the invention may be practiced assigning other interpretations for the patterns. There is not a discernible linear edge or stripe in pattern of FIG. 6D so its key is preferably decoded to select interpolation circuits configured for non-directional characteristics in the interpolation. The pattern in FIG. 6E contains a horizontal stripe consisting of lighter pixels 623 and 624 so its key is preferably decoded to select interpolation circuits configured for horizontal edge features in the interpolation process. FIG. 6F and 6G depict complementary vertical edges so their keys are preferably decoded to select interpolation circuits configured for vertical edge features in the interpolation. If for example, key values with a one in bit position 7 were complemented, the key for FIG. 6F would be merged with the key for FIG. 6G illustrating one instance of the option to halve the size of the lookup table or halve the number of decoding circuit combinations. The interpolation circuit options in the examples depicted in FIGS. 7 and 8 include one to improve performance for edges that are directed diagonally up to the right and another one to improve performance for edges that are directed diagonally down to the right. The keys for patterns depicted in FIGS. 6H and 6J illustrate edge patterns that have edges that are directed diagonally up to the right and diagonally down to the right, respectively, so their keys are preferably decoded to select interpolation circuits configured for edge features that are direct diagonally up to the right and diagonally down to the right, respectively, in the interpolation.

Figure 6K:
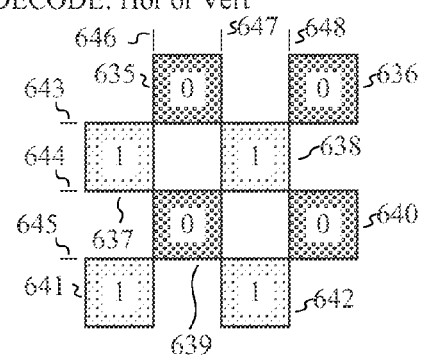

FIG. 6K has an alternating pattern of darker pixels 635, 636, 639, and 640 and lighter pixels 637, 638, 641, and 642. This pattern indicates the presence of three edges but it is ambiguous whether they are three vertical edges at 646, 647 and 648 or three horizontal edges at 643, 644 and 645. The complementary pattern of FIG. 6L has the same ambiguity. These are the only two of the 256 patterns that indicate this exact ambiguity and this will be useful since, hereinafter, a circuit that acts in response to each of these two patterns (or the key or keys associated with them) is provided to make a determination or partial determination of the orientation, vertical or horizontal, of the alternating darker and lighter stripes indicated by these patterns. As indicated above and applicable here, the pattern indicates the presence of two or more stripes that are next to each other, one lighter than the other as sensed by the green pixels used to generate the key. The stripe that is lighter than the other is bounded by a darker stripe that adjoins the lighter stripe on one side and a darker area that may but need not be a stripe on its other side and the darker stripe is bounded by the lighter stripe on its one side and by a lighter area that may but need not be a stripe on its other side. All of the indications of darker and lighter refer to levels measured by the pixels in the array used to generate the key. Such patterns may be present where there are two stripes that are each approximately one pixel wide that are adjacent with a dark stripe or area of undetermined width on one side and with a light stripe or area of undetermined width on other side. Images of picket fences or slatted shutters or blinds are likely sources of images that contain adjacent stripes that are approximately one pixel wide and these are often oriented vertically or horizontally. In addition to the ambiguity in direction, the other thing that makes such patterns especially difficult is that within an area of contiguous alternating dark and light stripes that are one pixel wide, all of the red filtered pixels will sense light from the dark stripes and all of the blue filtered pixels will sense the light from the light stripes or vice versa. Normally, the pixel width will not exactly match the width of alternating stripes in the image so there will be an interference pattern as the pixel alignment shifts incrementally a fraction of a pixel width with each successive stripe until alignment changes by one stripe. As the alignment shifts by one stripe the red filtered and blue filtered pixels will change roles from the one that was sampling the lighter stripes shifts to the one sensing the darker stripes and the alternate blue filtered or red filtered pixels changes in a complementary way from sensing the darker stripes to sensing the lighter stripes. This will be significant in the circuit provided to determine the vertical or horizontal orientation groups of contiguous stripes that are approximately one pixel wide in the image.

Calculations for bilinear interpolation utilize pixel values from a 3×3 set of pixels that are immediate neighbors of the interpolation site, but provide poor results. Improved interpolation algorithms including other versions presented herein incorporate calculations that utilize values from a larger set of pixels that often include pixel values selected from a 5×5 array of pixels that is centered on the interpolation site. Performance of some of these prior art interpolation algorithms is very good for most pixels. However, in areas of the image where contrast is high, there are inevitably pixels for which the interpolation equations are not appropriate and the color and intensity of these inappropriately interpolated pixels is often so much in error that they tend to stand out visually from surrounding pixels. The result is that an image often contains a sprinkling of such pixels that detracts from its overall appearance. These issues are exacerbated in images acquired with a high dynamic range camera that provides images with regions of very high contrast. As an example, in very high contrast areas of images acquired using a high dynamic range imager, the values read from the imager of the eight immediate neighbors of the pixel at the interpolation site were seldom more than 35 times larger or 35 times smaller than the value of the pixel at the interpolation site. However, values of pixels that were not immediate neighbors of the interpolation site but that had a pixel between them and the interpolation site were sometimes hundreds of times or even more than 1000 times larger or smaller than the value of the pixel at the interpolation site. These pixels are within the five by five array of supporting pixel values used by a number of interpolation algorithms and they are a prevalent source of undesirable interpolation artifacts. The much larger range of deviation of these non-neighbor pixel values of from the pixel value of the pixel at the interpolation site prompted development of a set of interpolation equations with calculated values based primarily on pixel values at the interpolation site and/or pixel values from pixel sites that are immediate neighbors at the sides or corners of the pixel interpolation site. These interpolation equations led to a substantial reduction in the number of pixels that stood out visually as interpolation errors in the final images. The images were not quite as sharp as those produced by some of the competing interpolation equations based on values selected from five by five arrays of surrounding pixel values. In other respects, the appearance of images was comparable or better and they generally had very cleanly interpolated vertical and horizontal edges and many fewer objectionable artifacts in regions of high image contrast. Results were greatly improved over bilinear interpolation that also uses the pixel values from immediately neighboring pixels for interpolation. In a preferred embodiment, the previously described multi-pattern based algorithm is used in selecting the interpolation equation to use from a set of available equations. The multi-pattern edge and feature detection algorithm is preferably based on an array of pixel values that extends beyond those that are immediate neighbors of the pixel at the interpolation site. Thus, the interpolated pixel values are preferably calculated using values of pixels selected from a set of pixels generally restricted to the pixel at the interpolation site and its immediate neighbors, but selection of the specific interpolation equation is preferably based in part on pixel values from a larger array of pixels. In a preferred embodiment, the algorithm depends on the horizontal 'H' edge detection and vertical 'V' edge detection for good performance and detection of these edge features is preferably based on values of pixels some of which are included as the pixel at the interpolation site and/or its immediate neighbors and also on values of one or more pixels outside of this area. The remaining six diagonal and cluster patterns provide less benefit than provided by the horizontal and vertical edge detection and their use is optional. In the example, selection of interpolation equations for the diagonal and cluster patterns are based on pattern images related to the four or five green pixels that are part of the interpolation site and/or its immediate neighbors. Optionally, the invention could be practiced using other edge detection algorithms. Such algorithms may be based on calculated gradients or derivatives that, like the pattern based edge detection, normally use pixel values from pixels that are outside of the immediate neighborhood of the interpolation site. Interpolated values are preferably limited to the value of the pixel at the interpolation site and its immediate neighbors, but the invention may be practiced without limiting selection of values used in calculating interpolated values exclusively to these values.

FIG. 7B is a revision of FIG. 7 and provides interpolation selection and multiplying coefficients using the improved interpolation equations of the present invention. It includes interpolation equations for border pixel locations as well as equations for image features detected in the image at the interpolation site. The border pixel locations are preferably given first priority when selecting an interpolation equation.

Like FIG. 7, the interpolation pattern is indicated in column 701B and the classification of the interpolation site as a border pixel or as a pattern of a particular orientation for which the particular interpolation equation is applicable is indicated in column 702B. FIG. 11A depicts locations of border pixels that are referenced in column 702B of FIG. 7B. TL0, TR0, BR0, and BL0 are border pixel designations for the top left, top right, bottom right and bottom left corner pixels in the image. L0, T0, R0, and B0 are border pixel designations for border pixels that are not in a corner location but are in the outside left, top, right and bottom border rows or columns of pixels in the image. N1 are pixels that are one pixel away from an edge of the frame. Even though pixels are present in the image to provide pixel data for any of the interpolation equations for pixel locations that are not on the border of the image, feature detection performed using a larger pixel base may not be available for pixels that are only one pixel away from the border so, as an option, interpolation equations with an N1 designation may be used for pixels that are one pixel away from the nearest border. The same row and column designators, based on the 5×5 kernel, have been retained here to keep the documentation compatible with the prior version of the invention that used the 5×5 array. The multiplying coefficients for the interpolation equation are listed in columns 704B, 705B, and 706B that list pixel locations in the 3×3 subgroup of the 5×5 pixel kernel array. The coefficients include a 16× multiplication of the interpolated value that is preferably accounted for by a final scaling operation in block 838 of FIGS. 8 or FIG. 8a. Since the smallest nonzero multiplier has a magnitude of 4, a simplified circuit for use with the multiplying coefficients listed in columns 704B, 705B, and 706B of FIG. 7B would preferably be based on a 4× rather that a 16× multiplier in the calculation stage. Note here that all of the pixel values are selected from three rows of three pixels each and that the pixels are either at location 22 that is the interpolation site or at one of the eight sites that are immediate neighbors of the interpolation site in a horizontal, vertical, or diagonal direction. Columns 709 and the bottom two rows of FIG. 7 with the 'SEL' and 'INPT' row headings provide detailed data that may be used to configure the color interpolation control block 819 of FIG. 8 or 819A of FIG. 8a to implement the interpolation equations for other versions of the interpolation equations. The equations of FIG. 7B may be implemented in a similar way using the circuit depicted in either FIG. 8 or FIG. 8a and details are left to one skilled in the art. Since coefficient locations in FIG. 7B are a subset of nine of the 21 locations accessed in the other designs and all of the coefficients are integral powers of 2, the circuits of FIG. 8 or 8a may, as an option, be simplified substantially when using the interpolation equations of FIG. 7B.

Interpolation equations that give the pixel values without the implicit 16× multiplier are shown in column 706B. The subscripts represent the pixel row-column location and G indicates the pixel value of a pixel with a green filter or of a green interpolated pixel value. N indicates a pixel value for a pixel with a non-green (red or blue in a preferred embodiment) filter or a corresponding non-green interpolated pixel value. The equations with N's are used for each of the non-green colors and the red '$R_{xx}$' is substituted for every occurrence of $N_{xx}$ when the equation is used to calculate the value of an interpolated red color component and '$B_{xx}$' is substituted for every occurrence of $N_{xx}$ when the equation is used to calculate the value of an interpolated blue color component. In a traditional Bayer color filter array, there are twice as many pixels with green filters as with blue or red filters and every other pixel of each row and column has a green filter. For the red and blue filtered pixels, alternate rows and alternate columns have blue filtered pixels and no red filtered pixels and the complementary set of alternate rows and columns have red filtered pixels and no blue filtered pixels. This leads to a dilemma that appropriately aligned pixel values may not be available when interpolating a red pixel value into a row or column that has no red pixels or interpolating a blue pixel value into a row or column that has no blue pixels. Here, since intensity in an image tends to have higher spacial frequency components than color or chromaticity, local spacial changes in the different color components tend to be correlated because of this lower spacial frequency, creating more uniform spacial variation of color or chrominance than of brightness, so there is benefit in including pixel values of other colors in the calculation in order to increase spacial color uniformity between interpolated color components. This has been done in prior art interpolation techniques and most have included the value of the pixel (This is of a color other than the one being calculated.) at the interpolation site and/or have included values of pixels other than the pixel at the interpolation site that are not immediate neighbors to the pixel at the interpolation site. Additionally, many prior art interpolation techniques that include terms to improve uniformity between interpolated color components have included these terms in substantially all of the interpolation operations.

In the present invention, terms to improve spacial color uniformity are used selectively but preferably for cases that include those where there is special need as indicated above. These cases may, for example, include interpolation of red and blue filtered color values into rows or columns where pixels with the corresponding filter color are missing and, optionally, also where color uniformity may be improved using pixels that are at the interpolation site and/or are immediate neighbors of the interpolation site. The selective use preferably includes interpolation along vertical edge to supply an interpolated value for a red color component in a column that has no red filtered pixels and to supply an interpolated value for a blue color component in a column that has no blue filtered pixels and for interpolation along a horizontal edge to supply an interpolated value for a red color component in a row that has no red filtered pixels and to supply an interpolated value for a blue color component in a row that has no blue filtered pixels. For each of these cases, there is an absence of pixels having a color filter of the same color as the interpolated color being calculated that are also aligned with the interpolation site along the direction of the edge. This increases the need for the inclusion of terms to improve spacial color uniformity between interpolated color components. For each of these cases, there are two conditions, one in which the color is being interpolated into a pixel location having a green filter and the other in which the color is being interpolated into a pixel location having a non-green filter of the other non-green color, i.e. a red color component interpolated into a pixel location having a blue filter or a blue color component interpolated into a pixel location having a red filter. For interpolation of a non-green color component for a pixel location having a green filtered pixel, in addition to the green filtered pixel at the interpolation site, there the four additional green filtered pixels that are immediate neighbors to the green filtered pixel at the interpolation site. These five green pixel values are used in expression 717B to improve color uniformity for a vertical edge feature 716B with a horizontal interpolation pattern. Here the pixel value is interpolated from neighboring pixels to the right and to the left of the interpolation site. Similarly, the five green pixels including the one at the interpolation site and its four nearest immediately neighboring green pixels are used in expression 719B to improve spacial color uniformity along an edge for a horizontal edge feature 718B with a vertical interpolation pattern. Here the pixel value is interpolated from neighboring pixels above and below the interpolation site. Because of the directional symmetry of color uniformity enhancement portions 717B and 719B of the calculation that utilize the green filtered pixel values, the expressions may optionally be used for non-directional interpolation or for general interpolation where the selection of the interpolation equation in not necessarily based on the respective vertical or horizontal edge feature. For interpolation involving a horizontal interpolation pattern with a horizontal edge feature 720B or a vertical interpolation pattern with a vertical edge feature 721B, there are pixels with color filters that are of the same color as the color component being interpolated that are aligned with the interpolation site in the direction of the edge feature. In each of these cases there is decreased need to include pixel components to improve uniformity between interpolated color components in the calculation. Additionally, for such calculations, if terms to improve spacial color uniformity between interpolated color components were to be included, it would be advantageous to use the green pixel at the interpolation site along with the next nearest green pixels in the direction of the edge feature and this spans five pixels instead of three. So with the decreased benefit in including the terms to improve uniformity between interpolated color components where the interpolated result is aligned with pixel values used for the interpolation, the preference is to omit the terms to improve spacial color uniformity for these cases and stay with the interpolation site and its immediate neighbors to provide pixel values to use to calculate interpolated color components.

For the following description, pixel color will be used to denote the color of the filter in the color filter array used for the pixel and interpolation color will refer to the color component supplied by the interpolation operation that is being described. The color uniformity enhancement color will refer to the color or colors of pixels used in the calculation of an interpolated value to improve spacial color uniformity between interpolated color components.

At a pixel location with a non-green filter for which a non-green interpolated value is being calculated, the four nearest or immediate neighbors in the diagonal direction are pixels with filters that match the color being interpolated and a diagonal interpolation pattern is preferably used as indicated at 722B for a diagonal interpolation pattern with a vertical edge feature or at 723B for a diagonal interpolation pattern with a horizontal edge feature. An average of the values of the immediate diagonally positioned neighbors is preferably included in the interpolation equation. This will be referred to as the interpolation component of the calculation. For this interpolation, there are no immediate neighbors of the pixel at the interpolation site with a filter of the same color as the pixel at the interpolation site so it is not possible to calculate a second order gradient based on the pixel at the interpolation site and like colored surrounding pixels without including pixels that are not immediate neighbors of the interpolation site. However, there are four pixels with green filters that are immediate neighbors of the interpolation site, one above, one below, and one to either side of the interpolation site and there are no pixels with color filters matching the color being interpolated in the row or column of the interpolation site. These green pixel values that are immediate neighbors of the interpolation site are used along with an indication of the presence and orientation of edge features in the image to compute a term based on the immediately neighboring green pixels to provide improved spatial uniformity of the color when interpolating a non-green color component into a non-green pixel location. This term in addition to not using the pixel value at the interpolation site and not using pixel values beyond the nearest neighbors is not based on a gradient calculation (first or second order) that is used in some prior art implementations. For an interpolation for a pixel that lies on a horizontal edge feature in the image 714B, the green pixels that are immediate neighbors to the left and the right of the interpolation site are aligned in the direction of the edge feature with the interpolation site and the green pixels that are immediate neighbors above and below the interpolation site are each aligned in the direction of the edge feature with one or more of the pixels whose color match the interpolation color. For an interpolation for a pixel that lies on a vertical edge feature in the image 712B, the green pixels that are immediate neighbors above and below the interpolation site are aligned in the direction of the edge feature with the interpolation site and the green pixels that are immediate neighbors to the left and the right of the interpolation site are each aligned in the direction of the edge feature with one or more of the pixels whose color match the interpolation color. In a preferred embodiment, a color uniformity enhancement term is included in each of the calculation above. In each case green pixels that are aligned in the direction of the edge feature with the interpolation site are included with positive multiplying factors and green pixels that are aligned in the direction of the edge feature with pixels used to calculate the interpolation component of the interpolation value are included with negative multiplying factors as provided by term 715B for a horizontal edge feature and by term 713B for a vertical edge feature. It is preferable that the signed multiplying coefficients of the pixels of the color uniformity enhancement color sum to zero and that the pixels used in the calculation of the color uniformity enhancement term are all immediate neighbors of the interpolation site. Prior art devices have used terms to improve color spacial color uniformity that conform to the alignment and zero sum criteria above but have normally included the pixel value at the interpolation site in the color enhancement term and/or have included pixel values of pixels that are not immediate neighbors of the interpolation site and have normally been calculated as a gradient term. This is not to indicate that it is always desirable to avoid use of the pixel at the interpolation site in the calculation to improve color uniformity. In fact, the pixel value $G_{22}$ that is at the interpolation site is used at 717B and at 719B under conditions where it is possible to do so and still limit the calculation to use of values of pixels that are for the pixel at the interpolation site or its immediate neighbors. The present invention provides a calculation algorithm that uses the values of green pixels that are immediate neighbors of the interpolation site along with an indication that there is a horizontally oriented edge feature or alternatively that there is a vertically orientated edge feature at the interpolation site to provide a term in the interpolation algorithm that improves spacial color uniformity between the color components while restricting variables in the term to improve spacial color uniformity to use of the values of pixels that are immediate neighbors of the interpolation site. Visually objectionable interpolation artifacts were significantly reduced through use of these algorithms. Green because of its strong link to luminance is a good choice for the color uniformity enhancement color. However, green is used in the example primarily because with the Bayer color filter pattern selected for the example, there are twice as many green pixels as red or blue pixels so that enough green pixels are available to provide the color uniformity enhancement terms that use pixel values from pixel locations that are restricted to the interpolation site and its nearest neighbors. The invention may be practiced using other color filter arrays such as ones with cyan, magenta, and yellow or red and clear filters and it is not restricted to use with the particular colors used in the example. The invention is not restricted to exclusive use of pixel values that are at the interpolation site or its immediate neighbors.

Figure 6L:
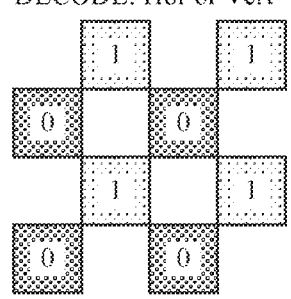
Figure 10A:
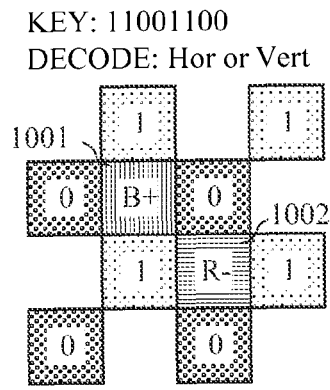
FIGS. 10A-E depict a direction classifier for multiple fine line features of a digital image.
Figure 10B:
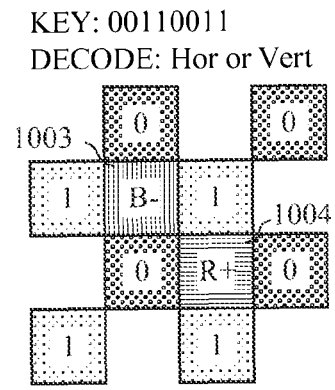
Figure 10C:
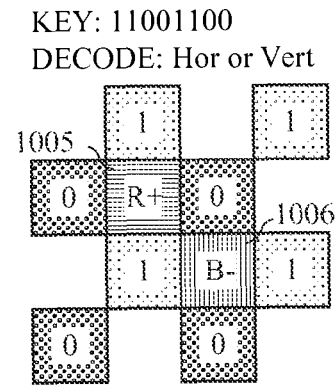
Figure 10D:
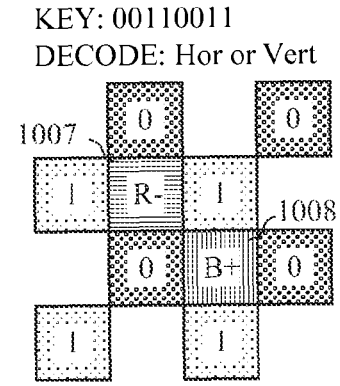

FIGS. 10A through 10D are similar to the patterns depicted in FIGS. 6K and 6L each depict a cluster of pixels used to generate the key. FIGS. 10A and 10C have the same key and have light pixels in their top rows alternating with darker pixels in the next, lighter pixels in the next and darker pixels in the bottom row. FIGS. 10B and 10D have the complementary pattern and a top row of darker pixels, a next row of lighter pixels etc. The darker pixels assigned zero in the key are depicted with a heavier, darker, dot pattern than the lighter pixels. FIGS. 10A and 10B depict red filtered pixels at 1002 and 1004 in locations where they appear when interpolation is being performed for a row of pixels containing red filtered pixels and for this case blue filtered pixels appear in the row above including locations depicted at 1001 and 1003. FIGS. 10C and 10D depict blue filtered pixels at 1006 and 1008 in locations where they appear when interpolation is being performed for a row of pixels containing blue filtered pixels and for this case red filtered pixels appear in the row above including locations depicted at 1005 and 1007. In FIG. 10A, if vertical stripes are present, blue filtered pixel 1001 will be on a lighter stripe aligning with the lighter pixels used to generate the key above and below it in a lighter column and red filtered pixel 1002 will be on a darker stripe aligning with the darker pixels used to generate the key above and below it in a darker column. Likewise in FIG. 10A, if horizontal stripes are present, blue filtered pixel 1001 will be on a darker stripe aligning with the darker pixels used to generate the key on either side of it in a darker row and red filtered pixel 1002 will be on a lighter stripe aligning with the lighter pixels used to generate the key on either side it in a lighter row. Note that darker and lighter have changed depending on whether the pattern is vertical or horizontal. A '+' suffix has been appended to the 'B' indicating the blue filtered pixel at 1001 to indicate that when stripes have a vertical orientation, pixel 1001 is in a lighter column and a '−' suffix has been appended to the 'R' indicating the red filtered pixel at 1002 to indicate that when stripes have a vertical orientation, pixel 1002 is in a darker column. From the description just given, roles will be reversed when the stripes are horizontal and 'B+' at 1001 will be in the darker row and 'R−' at 1002 will be in the lighter row.

For FIG. 10B the complementary pattern as indicated by a different key or distinguished by use or non-use of complementing when the complementing option is used. For vertical stripes, the blue pixel at 1003 is in the darker column as indicated by the appended '−' and the pixel 1004 is in the lighter column as indicated by the appended '+'. For FIGS. 10C and 10D that cover the same complementary patterns for interpolations in the row containing blue filtered pixels, the pattern of results are the same as for interpolations in the row containing the red pixels as just described except that red filtered pixels now occupy locations in the array occupied by blue filtered pixels in the arrays depicted in FIGS. 10A and 10B and blue filtered pixels now occupy locations in the array occupied by red filtered pixels in the arrays depicted in FIGS. 10A and 10B. Thus, the results follow the location in the array rather than the specific location of red and blue filtered pixels in the array and the reversed locations of the pixel in the lighter and darker column again follows the key (before possible conditional complementing) and the complementary or non-complementary pattern that it represents.

Figure 10E:
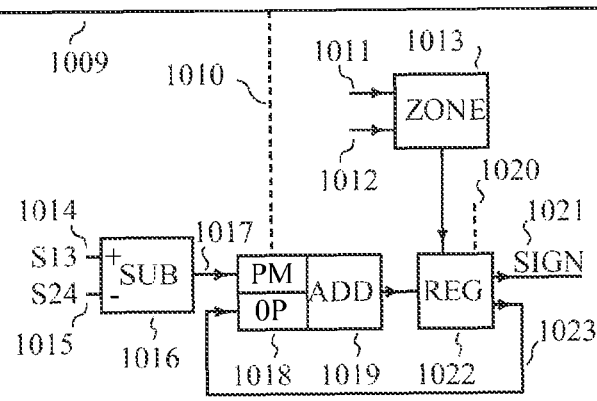

FIG. 10E depicts a circuit used to perform a computation used to select the interpolation circuit or algorithm for vertical edges or horizontal edges when the key for the pixels exhibits one of the two patterns of rows that alternate between all 1 and all 0 as depicted and described in FIGS. 6K, 6L, 10A, 10B, 10C, and 10D. In addition to using the accumulated result of the computation to select the vertical or horizontal interpolation routines, the computation is performed as will be described in response to the occurrence of a pattern of alternating all zero and all one rows as just described. The image is preferably partitioned into one or more preferably rectangular zones that are preferably established by using the row count value 1011 and column count value 1012 in circuit 1013 to partition the image into ranges of preferably contiguous columns preferably within contiguous rows that define rectangular regions in the image and providing preferably separate accumulating registers for each of these zones. Zone select circuit 1013 provides the accumulating register associated with the zone for which interpolated values are currently being provided to the register circuit 1022 in the computation circuit. The accumulating register values are preferably initialized to zero with each new image. Subtraction circuit 1016 inputs red or blue filtered pixel value S13 1014 corresponding to pixel locations 1001, 1003, 1005, and 1007 in FIGS. 10A through 10D and alternate blue or red filtered pixel value S24 1015 corresponding to pixel locations 1002, 1004, 1006, and 1008 in FIGS. 10A through 10D. Subtraction circuit 1016 provides the difference S13-S24 at 1017. This difference is added to the accumulating register for the zone 1022 when the pattern used to generate the key begins with a row of ones in the top row as in FIGS. 10A and 10C and subtracted from the accumulating register 1022 when the pattern used to generate the key is the complementary one that begins with a row of zeros in the top row as in FIGS. 10B and 10D. Inspection of the combinations in 10A through 10D will confirm that with this choice, for vertical stripes, the values sampled from the lighter stripes are added to the accumulating register value and the values sampled from the darker stripes are subtracted from the accumulating register value tending to make the resulting register value positive for the case that the stripes are vertical. Similarly, inspection of the combinations in 10A through 10D will confirm that with this choice, for horizontal stripes, the values sampled from the lighter stripes are subtracted from the accumulating register value and the values sampled from the darker stripes are added to the accumulating register value tending to make the resulting register value negative for the case that the stripes are horizontal. Then for pixels in the associated zone, when the key indicates one of the patterns of alternating rows of all zeros and all ones, the interpolation circuits for vertical edge features are selected when the accumulated value 1022 for the zone is positive and the interpolation circuits for horizontal edge features are selected when the accumulated value 1022 for the zone is negative. Block 1009 includes the circuit that responds to the key indicating the patterns of rows that alternate between all ones and all zeros and issues control signals 1010 to respond with the addition or subtraction of the difference in the two values as just described. As an option, the circuit may keep track of the first occurrence of the above mentioned keys for the image for a particular zone and respond by initializing the accumulated value to the initial value. As another option, the register values may be set, preferably to zero, when interpolation for a new image begins. As a further option for successive video frames, since images tend to be repetitive, initialization may not be performed between successive frames. When the option to bypass initialization between successive frames is selected and also as an option when initialization is performed, it is preferable to limit the extent of the positive or negative excursion of the accumulating register. One way to implement this is to clamp the value to a desired range and another way is to inhibit addition of positive values to the accumulated value when register 1022 already exceeds a specified positive threshold value and to inhibit addition of negative values to the accumulated value when register 1022 already falls below a specified negative threshold value.

The algorithm just described does not always give the desired sign since difference in pixel values due to color may exceed the difference between luminance of the lighter and darker stripes. The preferred configuration that accumulates the difference in pixel values helps somewhat. For zones that include areas where blue/red pixels are aligned with lighter/darker stripes and also includes areas where the alignment has shifted so red/blue pixels are aligned with lighter/darker stripe, the shift in dark and light stripe alignment tends to reverse the bias created by color differences and move toward an average for which the sign of the accumulated value properly indicates the direction of the stripes. These factors make it preferable to establish a balance where the magnitude of the accumulated value, if limited, is permitted to be large enough to permit averaging over areas where the red and blue pixels transition several times between sampling lighter and darker stripes. This consideration also makes it prudent to make zones wide enough to sample along an appreciable expanse of an area such as a picket fence. For example, a trial with zones 32 pixels high by 256 pixels wide gave good results for an image size approximately equivalent to wide VGA.

In summary, an indicator is associated with a portion of an image. This indicator is modified in response to specific patterns of alternating ones and zeros in the pattern image that may result from either close spaced vertical or close spaced horizontal edges in the associated images. The indicator provides an indication of whether horizontal or vertical edges are represented by these specific patterns and their indication is used at least in part to determine selection of interpolation equations for vertical or horizontal edge feature in response to detection of the specific patterns. In the example, the circuit responds to the same patterns to initiate modification of the value of the indicator and to initiate use of the value of the indicator to at least in part establish the choice of the demosaicing circuit. Since, for images that are processed from top to bottom, once a horizontal zone boundary is crossed, a new set of zones is entered and the set of zones just left will not be revisited. This crossing of the horizontal zone boundary may be used as a trigger to initialize the accumulating register associated with each zone in the row of zones being entered and only enough accumulating registers need to be provided to provide one for each of the zones in the row of horizontally aligned zones. The initialization does not need to be complete but may be a set to reduce the magnitude of the indicator value, for example by a set ratio, to retain carry over from zone to zone while reducing the indicator value to prevent results from one zone from dominating and thereby masking weaker features of another zone. For the wide VGA image in the example above, there are approximately 15 vertically aligned zones and only three horizontally aligned zones so three accumulating registers may provide enough storage for the circuit to provide an accumulating register to associate with each of the active zones.

FIG. 8 depicts a simplified schematic of an apparatus configured to provide interpolated values to supply missing color components for an image acquired using a color filter array such as a Bayer pattern to acquire the image. To provide interpolated values, the interpolation circuit sums product terms based on pixel values selected from a 5 by 5 supporting array of pixels with the pixel location for which interpolated values are supplied centered in the 5 by 5 array. Input buffer 813 provides storage for portions of five consecutive rows of image data need to provide image data to supply interpolated values for a row of pixels. For the calculation stage, 5 seven stage shift registers 808 through 812 provide convenient access to pixel values needed to supply interpolated values for individual pixel locations including generation of a key on which detection of edges along with their directional orientation are based. Each of the shift register stages provides storage for a pixel value, preferably in integer form. For conventional image data, this typically requires integer widths of 8 to 14 bits, but for example, for a particular high dynamic range application, 24 bits are needed for each pixel location. With each new pixel site for which interpolation is performed, 5 pixel values are read from the input buffer 813 by selection circuit 814 and if not already provided in the desired form, they are preferably converted to the desired form. For example, to conserve space, pixel data from a high dynamic range imager may be communicated in a more compact floating point format (This may be a specialized floating point format preferably related to selectable integration periods of certain high dynamic range image acquisition devices.) and it may be preferable to leave the data in this format to conserve row buffer memory space, converting it to integer form in block 1035 just before placing each of the pixel values from the row buffers forming the column of five pixel values in one of the five input buffer registers in column 807 that forms the input buffer stage for the shift register based array of storage locations for data accessed to provide the interpolated values. In typical operation, pixel values are presented in buffering column 807 and each of the five rows 808 through 812 are shifted left by one pixel location as interpolated values are supplied for each successive pixel location. Pixel row 810 corresponds to a row of pixels for which interpolated values are supplied with pixel location S22 corresponding to the pixel location for which interpolated values are being supplied.

The pixel values from the array of locations S00 through S45 are accessed by eight selection circuits of which SA 824 is one and by an additional eight dedicated connections of which the connection to S33 840 is one. The eight selection circuit outputs and the eight dedicated connections are each routed to a selectable shift position circuit to provide multiplier selections that represent multiplying factors that are integral powers of 2 (optionally including $2^0$). Shift selection block SSA 826 is one such circuit that provides a selection of multiplying factors of 1, 2, 4, or 8 at 825. Other inputs provide selectable multiplying factors of 2, 4, 8, or 16 or of 1, 4, 8, or 16. The output of each of the 16 selectable multiplication circuits is routed to the input of a 16 input parallel adder circuit one of which is one of the two inputs of adder AD0 828. Each added input is provided with the option to effectively turn off the input by providing 0 or to add or subtract the input. Subtraction is preferably implemented by complementing individual bits and also providing a carry in signal to effectively provide a two's complement when the subtract 'M' option is selected. Four two input add circuits AD8 through ADB accept the outputs from the eight adders AD0 through AD7. The outputs of these four circuits are buffered by pipeline delay registers R 830 and input to two adders ADC 833 and ADD and their outputs are input to add circuit ADE 834 that provides the sum of up to 16 input terms. The parallel add circuit is used both to provide the sum of preferably 8 selected green pixel values that is temporarily registered in REF 831 and to provide the sum of selected terms for the interpolated color values that are temporarily registered in PIX01 835. If the high dynamic range pixel values are 24 bit integers and these may be shifted up to 4 bit positions to provide a multiply by 16 and a sign bit is provided, 30 or more bits may be needed for the adders and registers REF 831 and PIX01 835. If PIX01 is negative, it is preferably replaced by 0 by the clamp pixel value circuit 836 as part of the calculation for the interpolation and optionally 836 may also replace pixel values that exceed a specified value by a specified maximum value. A luminance value is calculated at 837, for example by providing a weighted sum of green, red, and blue values that may, for example, be in a ratio of 60/40/2 for green/red/blue. The calculated luminance and the original green, red, and blue values are optionally scaled and converted in pixel convert block 838 and stored for output or for further processing such as tone mapping at 839. For tone mapping, the logarithm of the luminance is preferably calculated; preferably using conversion to fully normalized binary floating point followed by use of a lookup table or other conversion circuit to convert to a logarithmic value over a one octave range. It is preferable to convert the color components to a logarithmic form also. Then multiplying factors to adjust color balance may be applied as additive constants in the logarithmic domain and the log of the luminance may be subtracted from each of the logarithmically encoded color component values for the corresponding pixel to provide the logarithm of the ratio of the color component to the luminance. This value has a smaller range of values than the original high dynamic range color value and may, for example be reasonably encoded as a 12 bit value so that the three color components may be stored in 36 bit memory words provided in FPGAs such as those available from Xilinx. Since the logarithm of the luminance of each pixel is used in the tone mapping calculation, it is available to be added back to the scaled color components as one of the final steps in an optional tone mapping operation that preferably follows the demosaicing for applications that handle high dynamic range input data. Most cameras of reasonable quality, even ones not classified as wide dynamic range, provide image data with more than 8 bits of resolution making them useful candidates for the combined demosaicing and tone mapping circuits of this invention. Additionally, the tone mapping, with appropriate choice of compression ratio, may be applied to expand rather than compress the dynamic range making it useful in fog or in viewing X-ray images and in certain images of limited dynamic range that may be present under conditions of limited illumination, so these also are desirable candidates for application of these circuits.

As an example, to generate the key, green pixel values at S03, S05, S12, S14, S23, S25, S32, and S34 are selected by asserting the proper select settings 823 for select circuits SA through SH 824, selecting unity gain for each at 821 and selecting P for the addition for the eight inputs listed above and 0 for the remaining eight unused inputs at 822 and registering the sum in REF at 831. Compare circuits CB0 through CB7 816 compare eight times S34, S32, S25, S23, S14, S12, S05, and S03, respectively with the sum in REF. Each of CB0 through CB7 outputs a 1 if eight times its respective pixel input value is greater than the sum of the eight from REF. These eight one bit values are assembled as bits 0 through 7, respectively, of an eight bit key used to identify the pattern of individual bit values relative to the effective average. (Here eight times each value is compared against the sum to avoid a division step. The multiplication by 8 is performed by displacing specified bit connections by three bit positions relative to the sum. This is the technique used to effectively compare each of the eight bit values against the average of the eight bit values to generate the key that is indicative of the pattern.) The value of the key 817 is routed to the key decode circuit 829 where the value may optionally be compressed, as for example with the complementing circuit described earlier, and then a lookup table or other decoding circuit may be used to classify the image represented by the key preferably providing information on existence and direction of edges as well as on specialized multiple edge patterns such as indicated in FIGS. 6K, 6L, and 10A to 10E. Block 818 provides information on the color of the filter and position in the color filter array for the pixel for which interpolated results are being supplied. Block 818 optionally provides additional information about position in the array relative to the border as indicated in FIG. 11 to provide information to choose specialized interpolation routines for pixel locations next to or close to the image border where the full 5 by 5 array of supporting pixel data is not available. Color interpolation control circuit 819 takes inputs decoded from the key in decoder circuit 829 and of the position in the pixel array from position indicating circuit 818 and generates outputs to provide the input sum for the key and interpolated filter outputs as indicated by the signal selection indications and the signed multiplying coefficients in FIGS. 7 and 9. The color interpolation control circuit responds to the inputs and generates selection control signals at 820 to select the proper input pixel value for each of the select circuits SA through SH that have an active input. Circuit 819 generates shift selection signals 821 to provide the proper multiplier for each of the 16 inputs that are active. Circuit 819 also generates gating and sign selection signals for each of the 16 inputs. '0' is selected for inputs that are unused for a particular sum, 'P', plus, is selected for terms that are added and 'M', minus, is selected for terms that are negative (or to be subtracted). As indicated earlier, the summed terms are registered in REF 831 for the sum used to generate the key and in PIX01 835 for the sum used as the first stage in providing the interpolated color value.

FIG. 7 is a table indicating preferred interpolation term selection and multiplying coefficients used to generate the key and also to generate various interpolated color components as a function of the location in the color array and the existence and orientation of an edge as indicated by decoding of the key with optional inclusion of augmented edge direction indications such as provided by the circuit of FIG. 10E. The various selections of terms and of multiplying coefficients indicated in FIG. 7 are preferably implemented as part of the color interpolation control circuit of block 819 in FIG. 8. In FIG. 7, column 701 indicates the interpolation pattern as indicated by the pixel position and color indicating circuit 818 of FIG. 8 and the interpolated color value or key being calculated. 'D' indicates a diagonal interpolation pattern used to supply a red or blue interpolated value at a blue or red filtered pixel location, respectively. 'C' indicates a crossed interpolation pattern used to supply a green interpolated value at a blue or red filtered pixel location. 'H' indicates a horizontal interpolation pattern used to supply a red interpolated value at a green filtered pixel location in a row containing red and green filtered pixels or to supply a blue interpolated value at a green filtered pixel location in a row containing blue and green filtered pixels. 'V' indicates a vertical interpolation pattern used to supply a red interpolated value at a green filtered pixel location in a column containing red and green filtered pixels or to supply a blue interpolated value at a green filtered pixel location in a column containing blue and green filtered pixels. 'K' is for calculation of the sum for the KEY. Column 702 indicates the existence and/or orientation of an edge in the pattern. 'N' is for nondirectional, no edge. 'V' is for a vertical edge or edges. 'H' is for a horizontal edge or edges. 'U' is for an edge or edges that are diagonal upward to the right. 'D' is for an edge or edges that are diagonal downward to the right. Columns 703 are for pixel locations 0 through 4 of row 0. Columns 704 are for pixel locations 0 through 4 of row 1. Columns 705 are for pixel locations 0 through 4 of row 2 and pixel 22 of this row is the site for which interpolated values are supplied. Columns 706 are for pixel locations 0 through 4 of row 3. Columns 707 are for pixel locations 0 through 4 of row 4. Columns 708 are for pixel 05 from row 0 and pixel 25 from row 2 used to calculate the sum of green pixels during the interpolation operation for the pixel preceding the ones for which the sum will be used. Together the 25 elements in the 5 by 5 pixel portions of the five rows and the two additional pixel locations indicate the 27 pixel values accessible at any one time for calculation of the key and of interpolated values. The column headings for columns associated with individual pixels contain two digit numbers the first indicating the row number and the second indicating the column number of each pixel value in the shift register array of FIG. 8. In FIG. 8, the same numbering is used but an 'S' is used as a prefix for the pixel locations. Summed values for pixel 22 and pairs of values for the first row of values for pixels 02, 20, 24, and 42 indicate provision to access these five pixel locations simultaneously for two sum terms. The dual sums may be used to provide multiplying factors that are not integral powers of 2. Minus signs indicate that terms are subtracted and blank entries indicate that no sums or zero terms are present for these entries. The first row gives the interpolation circuit settings for a pixel value to be supplied using interpolation pattern 'D' and edge classification 'N' that are used in combination for diagonal pattern and a non-directional interpolation, the next row 'D' 'V, V1' for diagonal pattern and a vertical interpolation, etc. and the last row 'K' 'K' is used to provide the sum of eight green values for calculation of the key. The next to the last row labeled SEL indicates select circuit SA, SB, SC, SD, SE, SF, SG, or SH or the direct input 11, 12, 13, 21, 22, 31, 32, or 33 used to access pixel values from the shift register array for summations in FIG. 8. Dual entries indicate dual access to these pixel values and the capability to provide two sum terms using the values. The select circuits SA through SH can each provide only one input at a time and are arranged so that all of the nonzero terms may be summed staying within this restriction. The select inputs provide capability to access the 27 pixel values and provide dual access for five of these using the sixteen summing inputs. The bottom row labeled INPT indicates the select setting asserted on control lines 820 by control circuit 819 of FIG. 8 to access the specified element. Dual entries refer to the separate settings for the dual select elements indicated in the preceding row. Columns 709 indicate the select settings just noted for each configuration of the circuit as indicated in the associated row of the table.

For interpolation sites that are zero or one row or column away from a nearest border of the image, not all of the 25 pixel values are available from the supporting matrix. There are many options that may be used to practice this invention and handle the border conditions. A preferred one is to add capability to the logic circuit to detect the border conditions and to provide interpolation routines that operate using available pixel values. With these provisions alternative options such as, special initialization steps or reduction in the size of the interpolated image may be avoided. With display size often matched to imager size, the option to maintain the original image size is a desirable one. FIG. 11 depicts an array having seven rows and eight columns that provide an example of a classification that may be assigned to pixels that are zero or one pixel locations away from a nearest border. TL, TR, BL, and BR refer respectively to pixels that are in the top left, top right, bottom left, or bottom right portions of the image as indicated in FIG. 11. T0, L0, R0, and B0 indicate pixels that are not in one of the corner zones and are, respectively, next to (zero pixels away from) the top, left, right, or bottom border of the image. H1 and V1 refer, respectively, to horizontal and vertical edge classifications for pixels that are not in one of the corner zones and are one pixel away from a nearest border as indicated by an 'H1' or 'V1' in column 702 of FIG. 7. Any of the border classifications preferably takes preference over use of the key, but the interpolation pattern as indicated in column 701 of FIG. 7 and column 901 of FIG. 9 are still used. In the example, interpolation at border pixel locations has been simplified since relatively few of the pixels in the image fall within this classification. As an option, additional better optimized interpolation circuits may be provided and some of these may use values from the key. FIG. 9 is structured in a way similar to FIG. 7 and includes an indication of pixel value selections and multiplying factors that may be used to provide interpolated values for pixels with the TL, TR, BL, BR, T0, L0, R0, or B0 border classifications as indicated in column 902.

To implement provision of interpolation routines for pixel locations that are near to a border, logic block 818 of FIG. 8 may be expanded to provide border location classifications as indicated in FIG. 11 and color interpolation control 819 may be expanded to recognize and respond to these indications along with the others and to respond issuing appropriate control signals for pixel selection at 820, multiplying factor selection at 821, and 0, add, or subtract selection at 822 to implement the set of interpolation equations from FIG. 9 and for V1, H1, T0, B0, L0 and R0 from FIG. 7 in addition to the ones already implemented from FIG. 7 as described above.

Figure 7A:
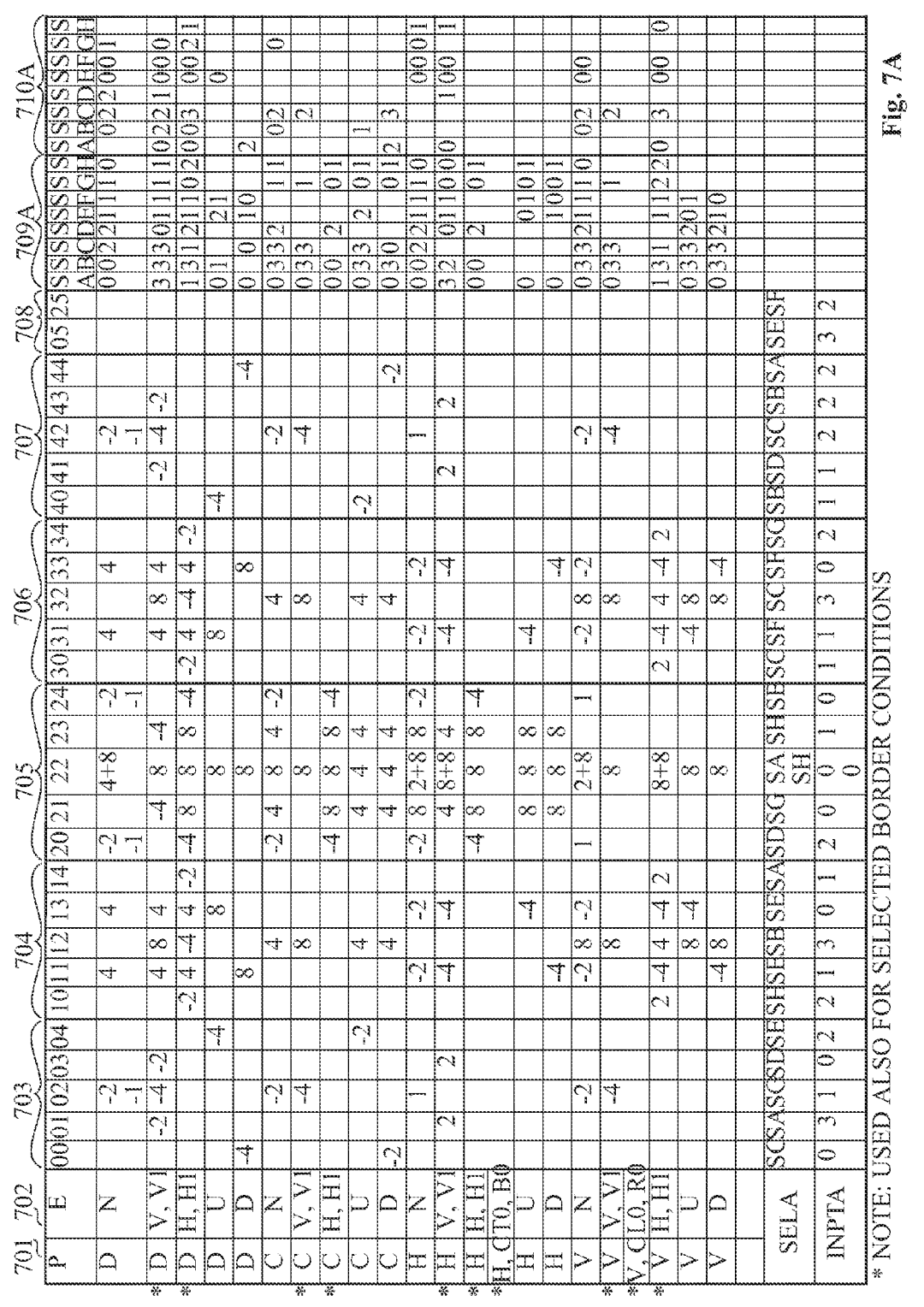
Figure 8A:
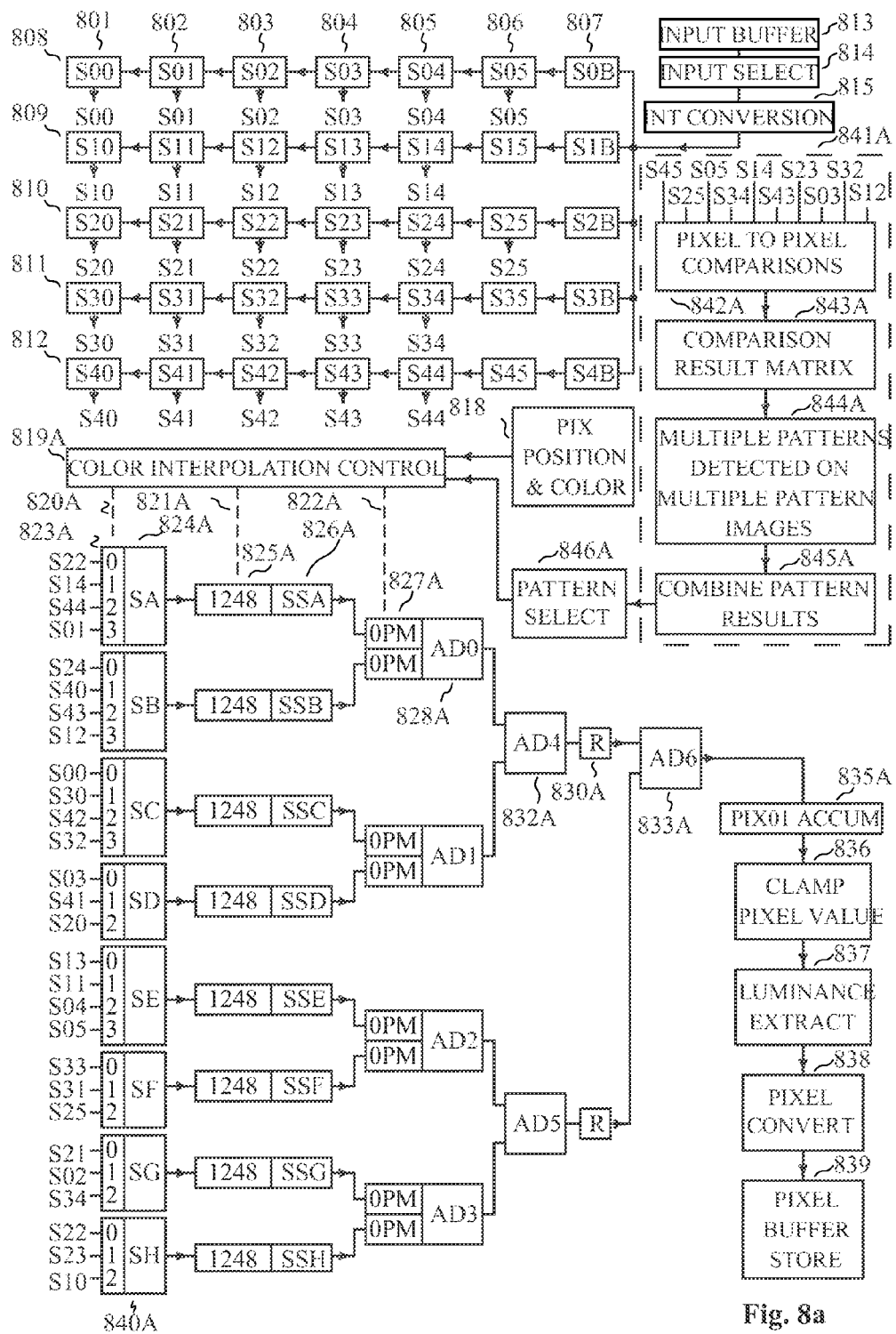
Figure 9A:
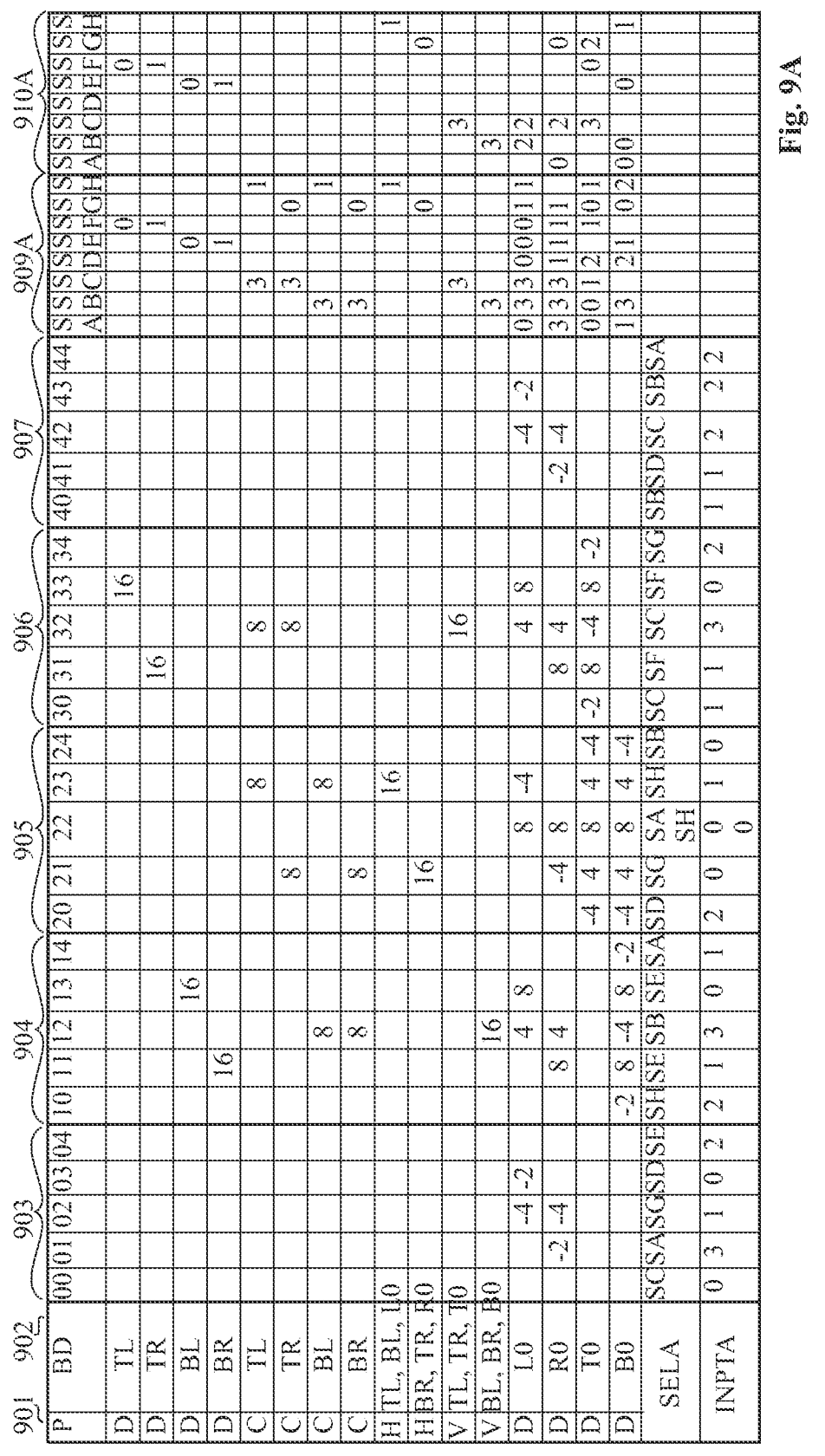

FIGS. 7A, 8A, and 9A are similar to FIGS. 7, 8, and 9, respectively, but implement two options one to replace the 16 term parallel adding circuit with an 8 term parallel add circuit that may be used to add separately chosen terms on each of two add cycles and these terms may be added to yield a result that is similar to if not identical to that achieved with the 16 term serial adder circuit. Optionally, when terms fit into a single set of 8, the second add does not need to be provided and when two adds are provided, a term from the array may be included in each sum with signs and multiplying coefficients that are not necessarily the same for each of the two additions. The other option is based on the generation of multiple pattern images using features that are presented along with the terminology used to describe it as part of FIG. 14 and the related description. The generation of the pattern image based on use of the average of the values of pixels in the pattern (or other threshold value) as a reference is replaced with generation of a set preferably of more than one pattern image where each of the pattern images is preferably based on the use of one of the pixel values in the pattern array as a reference. Additionally, for n pixels in the pattern array, it is preferable to generate n pattern images using the value of each of the n pixel values in the pattern array as a reference pixel value. Then, preferably, each of the n pattern images is analyzed to detect a pattern and the results are combined and prioritized to generate an indication of the presence or absence of a pattern detected in the values of the pixels in the pattern array and to further indicate characteristics such the existence of edges along with an indication of their orientation. The existence of specialized patterns such as the multiple edge patterns for which vertical or horizontal orientation of the edges is ambiguous based on the pattern image alone are also preferably detected and their presence and distinguishing characteristics are preferably indicated.

The circuit implementations share many similar, if not identical, features and the description will center on these differences. In FIG. 8, eight of the 16 terms that are selectively added with selectable signs and multiplying coefficients are provided by select registers SA 824 through SH and eight additional terms S11 through S33 840 are routed directly to the remaining eight adder inputs. Color interpolation control circuit 819 responds to inputs from 818 that indicate the pixel position relative to the border, the color of the color filter for the pixel and the color of the interpolated color component that is being provided. It also responds to information about the presence of patterns such as edges along with their orientation that are detected in the pattern image. These inputs are used to classify the interpolation equation to be applied according to the type of interpolation as indicated in columns 701 and 901 in the tables of FIGS. 7 and 9 and according to the position relative to the image border or the presence of patterns including edge orientation as indicated in columns 702 and 902. Remaining entries in a row indicate pixels and coefficients used to provide the interpolated value. The next to the last rows of tables in FIGS. 7 and 9 each having 'SEL' as a row heading indicates the select register or directly connected input or inputs that may be used to select pixel values for pixels indicated by the pixel designation indicated in the column headings in the first row of the tables. The last rows of the tables each having 'INPT' as a row heading indicates the number of the select register input used to select the pixel designated in the associated column heading. Aside from rows at the top and bottom of the tables, as just described, other rows indicate signed multiplying coefficients for terms to include in the sum to generate a particular interpolated value or to generate the average of the values of pixels in the reference image array. Columns grouped under 709 and 909 indicate selection setting for the eight select registers SA through SH used in FIG. 8 to select values from specified from the pixel that are specified in the row in the table for the interpolation equation. The color interpolation control circuit is configured, based on data from the tables in FIGS. 7 and 9, to respond to inputs from blocks 818 and 829 to select the applicable row from either the table in FIG. 7 or in FIG. 9 and to generate signals on control signal paths 820, 821, and 822 that result in selection in the correct terms and coefficients to generate the appropriate sum of terms as indicated by the entries in row selected from one of the tables to provide the interpolated color value for the interpolation equation. For the circuit of FIG. 8A, like referenced entries are all similar in function to counterparts in FIG. 8 but are typically used to perform two add operations for interpolated color values that are generated and are configured to select different input pixels. Pixel value holding register PIX01 835 of FIG. 8 is modified to PIX01 ACCUM 835A of FIG. 8A and provided with the capability to add the first sum to the second and also to holding the resulting value. The differences in the circuit configurations are intended primarily to repartition the work using fewer resources repetitively with the eight parallel add circuits to accomplish substantially similar overall results. The average based and multi pattern image based pattern recognition may be used somewhat interchangeably, but additional clock cycles naturally utilized by repetitive use of the eight input add circuit does fit well with added compare cycles used to assemble the compare result matrix for the multi pattern based pattern recognition. Tables in FIGS. 7A and 9A are similar to FIGS. 7 and 9, respectively, but the next to the last rows each have the 'SELA' heading and the row replaces the row with the corresponding row with the 'SEL' heading and the last rows each have an 'INPTA' heading and the row replaces the corresponding row with the 'INPT' heading. Entries in the 'SELA' rows indicate the one of the select registers SA 823A through SH of FIG. 8A connected to the pixel indicated in the column heading and the entry just below it in the 'INPTA' row indicates the select register input to which the pixel is attached. Several of the pixels have double entries indicating that the pixel may be accessed by more than one select register. Columns 708A and 710A of FIG. 7A replace column 709 of FIG. 7 and provide select register settings for select registers SA through SH for the first and second of the eight input parallel add cycles. Column 909A and 910A perform a similar function in FIG. 10D.

The multi pattern image construction preferably providing pattern detection for each of the pattern images is implemented in circuits depicted in dashed line box 841A and described in more detail in connection with FIG. 14.

Figure 12:
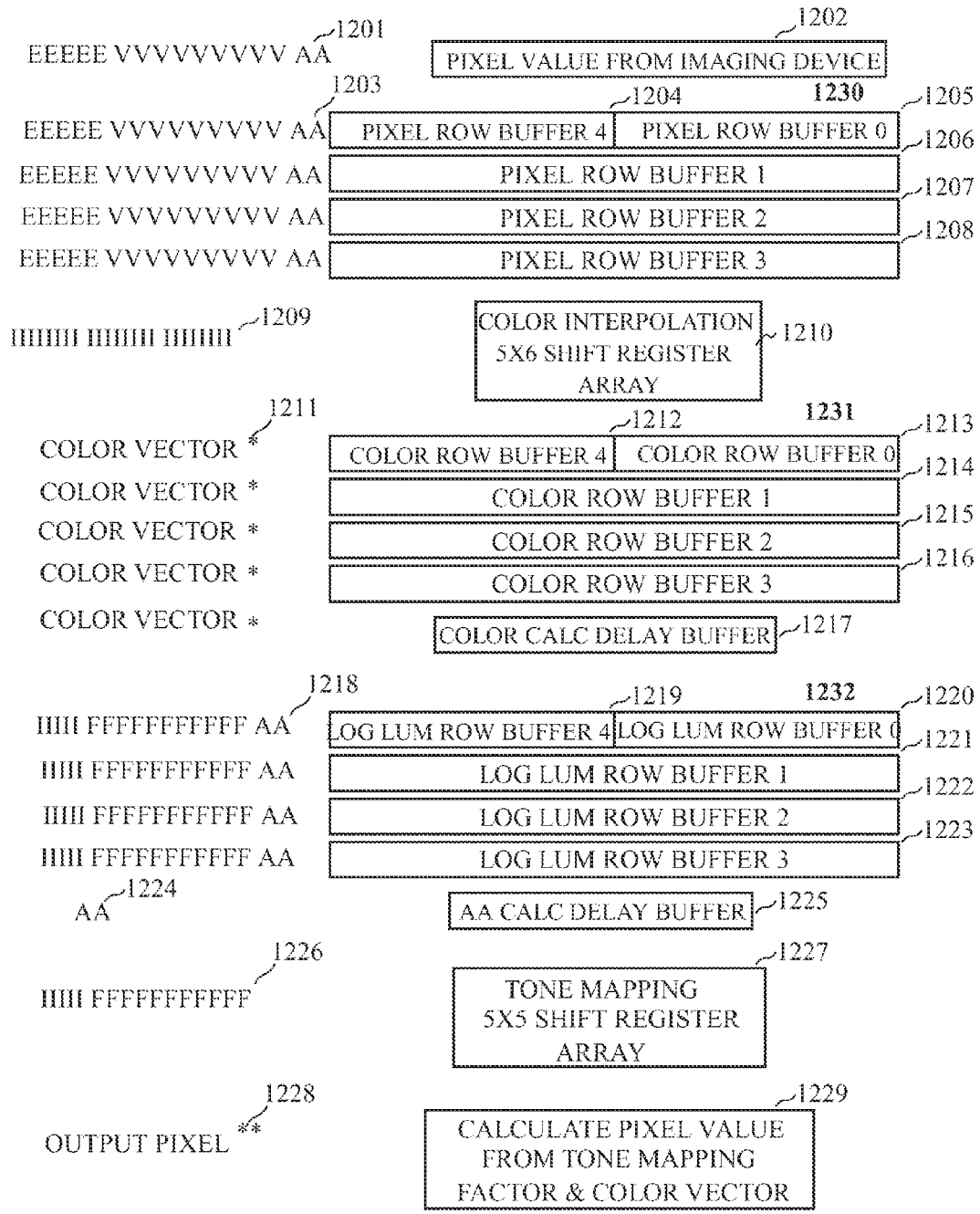
FIG. 12 depicts an example data storage for a system in accordance with the present invention.

FIG. 12 depicts an example of data storage for a system that receives pixel values 1202 from an imaging device and buffers them for color interpolation preferably using the color interpolation circuit presented as part of this invention. The results of the color interpolation are then buffered for tone mapping preferably using the tone mapping circuit presented as part of this invention. For a 752×480 wide VGA image, the memory may, for example, be included in the block ram provided in a Spartan-6 SC6SLX9 FPGA, a product announced by Xilinx.

The logic to perform the color interpolation and the tone mapping is preferably included in the same silicon device as the memory blocks described herein. Examples of preferred data formats are depicted for each of the memory blocks in FIG. 12. 1202 represents a memory location that is preferably configured with a FIFO (First in first out) storage register to provide a preferably small buffer for pixels received from an imager or other image pixel data source that is typically streamed from the imaging device at a relatively consistent rate as it is acquired and processing of the pixel data is preferably begun with relatively little delay. The pixel order is preferably in sequence pixel by pixel for successive pixels in a row and row by row for successive rows in an image. The color interpolation and the bilateral filter operation in the tone mapping each operate on their own individualized supporting array of pixel data. Pixel data from the camera or other image source is used to supply data for the color interpolation, and the logarithm of the pixel luminance value is calculated using the color interpolated output of the color interpolation circuit. For color images acquired using an imager having a color filter array, color pixel values are used along with interpolated RGB (Red, Green, Blue) color pixel values as the data input for the tone mapping. In the examples, a 5 row by 6 column array of imager pixel data is used for the color interpolation and a 5 row by five column array of the calculated, logarithmically encoded pixel luminance values is used for the bilateral filter calculation in the first stage of the tone mapping. The sizes of the supporting arrays are given as examples and the invention is not limited to supporting arrays of this size. Furthermore, the sizes of the supporting arrays for the color interpolation and for the tone mapping do not need to be the same. To acquire n rows by m columns of supporting data for the a calculation, approximately n minus one times the number of pixels per row in the image plus m pixels of image data need to be buffered to provide pixel data over the full supporting array to perform the calculations for a given pixel. As explained and provided for elsewhere, at pixel locations that are near to one of the image boarders, pixel data may not be available for the full supporting array. Examples are given of ways to perform the calculation using pixel data that is available and calculations may be performed after the image data available for the supporting array is acquired bypassing buffering operations for data that is not available. The portion of the tone mapping calculation that utilizes the supporting array preferably operates on values in the array that are based on the logarithm of the luminance calculated for each interpolated pixel value so the calculated log luminance values, or at least the interpolated pixel color values needed to support this calculation need to be buffered for the n minus one full rows plus the m pixels to acquire the n rows by m columns of supporting pixel data. After the supporting array based bilateral filter portion of the tone mapping operation, the result of the bilateral filter calculation is used in additional calculations and is combined with the original pixel color component values to obtain the tone mapped pixel output values so the pixel color component values need to be saved in buffer memory while log luminance data calculated from the color pixel values is acquired and used for the supporting array for the tone mapping operation. For $n_c$ rows and $m_c$ columns of data in the supporting array of pixel values for the color interpolation and $n_t$ rows and $m_t$ columns of data in the supporting array of pixel values for the tone mapping operation $(n_c+n_t-2)$ times the image row length in pixels plus $(m_c+m_t)$ pixels need to be acquired, excepting abbreviated requirements for pixel locations that are close to a boarder of the image, to provide data to perform the combined color interpolation and tone mapping operations. A few additional pixel times may be needed to provide for pipelining delays in the calculations. For five rows of supporting data for the color interpolation and five rows of supporting data for the tone mapping operation, this requires only a little more than eight row times of delay and a little more than eight rows (four rows for each operation) of buffered data in comparison to 480 rows in the image used in the example. This represents only about 1.7 percent of the total image and minimizes the need for buffer memory and the added delay between acquisition and display or processing of an image for control applications.

In FIG. 12, pixel values acquired from an imager are acquired and optionally temporarily buffered in input register or buffering array 1202. After optional conversion in pixel format, values from buffering register/s 1202 are stored in imager data row buffer array 1230. Buffer arrays 1230, 1231, and 1232 are preferably organized in similar arrangements, so the most detail will be provided for 1230. The buffer is preferably configured for cyclical access so the newest pixel is entered at the last pixel location at the end of buffer area 1204 that provides storage for the portion of the newest row of pixel data being entered overwriting the corresponding portion of the oldest pixel data stored in the pixel area 1205. For n rows of supporting data, n−1 rows of storage are provided by partial rows 1204 and 1205, and full rows 1206, 1207, and 1208. Optionally, full rows of buffering space may be provided for each of the five rows of buffered data relaxing the need to carefully sequence access to data. A small number of temporarily storage locations for pixel data may be provided where needed to assure that pixel data needed for calculations may be acquired from the buffer 1230 before it is overwritten. Since the size of the memory blocks needed to provide row buffer space for imager pixel row buffer 1230, color vector row buffer 1231, and logarithmically encoded luminance value row buffer 1232 together consume a significant silicon area and the amount of memory needed to meet these storage requirements may be the limiting factor that determines the size and cost of an FPGA needed to implement the design for an FPGA based implementation, the preferred option to provide a shared space for the partial row storage needed for portions of the first and last rows of buffered image data is presented here. As indicated elsewhere, a column of pixel data is acquired simultaneously or in a preferably short time interval from buffer 1230 and after an optional format conversion is stored in the color interpolation register 1210 where it is used with adjacent columns of data previously saved in buffer area 1210 to provide ready access to the supporting kernel of pixel data for the color interpolation calculation. In a preferred sequence, to provide the new column of pixel values, one for each of the five rows of data in the kernel in the example, the pixel value about to be overwritten by the pixel from imager data from register 1202 is read from the beginning of pixel row buffer 0, and this value, the value about to be written to row buffer 4, and pixel values from corresponding pixel column locations in pixel row buffer 1 1206, pixel row buffer 2 1207, and pixel row buffer 3 1208, constitute the column of pixel values that are written to the working register array 1210 after optional format conversion. In a preferred implementation, the pixel value acquired from input register 1202 is then written to buffer register 1204 overwriting the value just read from pixel row buffer 0.

As just indicated, buffer area with partial color row buffer 4 1212 and color row buffer 0 1213 in a shared area and color row buffer areas for rows 1, 2, and 3 at 1214, 1215, and 1216 are preferably handled in a similar way so one should refer to 1230 for the more detailed description. As noted earlier, the number of rows of storage provided for buffer 1230 is preferably equal to the $n_c-1$ and the number of rows of storage provided for buffers 1231 and 1232 are preferably equal to $n_r-1$. $n_c$ and $n_r$ are both five in the example but either or both may be other values and $n_c$ does not need to equal $n_r$ to practice the invention. Color vector values in buffers 1231 and logarithmically encoded luminance values in 1232 are preferably entered at nearly the same time and since the logarithmically encoded luminance values are calculated based on the corresponding color vector value, the two separate buffers may be administered as a combined, shared structure or as a further option, the logarithmically encoded luminance value may not be buffered but calculated as needed. The complicating factor for implementing this option is that when the logarithmically encoded luminance values are not buffered their values need to be calculated once for each row in which they are used in the kernel or supporting array ($n_r$ or five times in the example) so the somewhat involved logarithmically encoded luminance computation may need to be repeated $n_r-1$ times after the first. Color vector values in 1231 generally need to be accessed for only one set of calculations to compute the final tone mapped pixel value and this may lead to some simplification in some applications so that buffer 1231 and color calculation delay buffer 1237 may optionally and even preferably for some applications be provided as a single first in first out or other block storage style of memory device. The only access needed in the preferred implementation is to read values from the first location of color row buffer 0 1213 before overwriting this location with the value input at the last location of color row buffer 4 1212. When the row correlated buffer as shown is used, color calculation delay buffer 1217 provides storage to cover the pixel processing time increments for the time that values are in the array 1227 during calculation and also additional pixel processing times to allow calculation pipeline delay times and scheduling times from the time that the value is read from color row buffer 1213 before it would otherwise be overwritten and the time that it is used in the calculation to provide the tone mapped pixel value.

The pixel acquisition information AA that is optionally included with the input pixel value is preferably buffered and kept correlated with the pixel for which it was generated and passed from the image pixel value input to the demosaiced, tone mapped pixel value output. The values AA are stored with the logarithmically encoded luminance value along with 16 bit logarithmically encoded luminance values to utilize the 18 bit storage locations provided in the Xilinx FPGA but may be buffered separately or may be grouped with the color vector values.

Examples of pixel data formats are given for an imager that provides high dynamic range pixel data encoded in a binary or other floating point data format. The data from the imager as indicated at 1201 may, as an example, be zero for zero values and may be fully normalized for nonzero values with the leading 1 in the binary value suppressed. The five bit binary exponent is EEEEE and the 9 bit binary value is VVVVVVVVV. AA is optional data associated with the pixel value that may, for example, indicate if the pixel value is the result of a saturated reading or of an under-utilized A/D range. Such indications may indicate that the illumination of the pixel varied over the integration time, perhaps due to a varying light source or the presence of a high contrast edge in a part of the scene that is in motion during the exposure. Other reasons for anomalies may be due to the choice of imaging device settings for the image acquisition. In all of these cases, the information provided by AA may be helpful in responding appropriately to the acquired image data. The indication, if provided may optionally be fewer or more than two bits long. Pixel data in buffer 1231 may optionally be stored in the same format as 1201 or optionally in integer form or in a modified floating point form. Data is preferably converted to binary integer form (24 bits in the example) for the color interpolation calculation.

In the preferred design, interpolated, high dynamic range, RGB color pixel values are provided by the color interpolation calculation and the luminance value is preferably calculated for each pixel value and preferably converted to a logarithm to the base 2 value having a binary encoding. This value may take the form of values 1218 of a five bit integral part IIIII and an eleven bit fractional part FFFFFFFFFFF. The value AA is grouped and stored with the 16 bit logarithmically encoded luminance value primarily to utilize the 18 bit width provided for memory blocks in the Xilinx FPGA. The red, blue, and green components of the pixel color components may each need 24 bits or more to represent them in binary integer format without losing resolution. As a preferred option, to preserve needed resolution and represent the color values more compactly, each color component is converted to a floating point or preferably to a logarithmically encoded format, preferably like, or at least compatible with the format of the logarithmically encoded luminance value calculated for the pixel and the logarithmically encoded luminance valued is preferably subtracted from each of the red, green, and blue logarithmically encoded color component values for the pixel to create the color vector values to store in the buffer area. The subtraction in the logarithmic space corresponds to division to provide the ratio of each color component to the luminance value in linear space. This logarithmically encoded ratio typically covers a smaller range than the original pixel color component value enabling a more compact representation of the pixel data. The color components, when expressed as a ratio of color component value to luminance so that the resulting ratio is a dimensionless value becomes transparent to tone mapping algorithms, such as those provided in the provisional patent applications relied upon for priority in the present application and as incorporated in their entireties herein by reference, so that the value is already in the same form that it assumes after tone mapping and its value is unchanged by the tone mapping. In other words, the ratio becomes transparent to the tone mapping operation. Because the dimensionless ratio of the original color component to the luminance of the pixel is in a form that is not changed by the tone mapping operation, it is not subject to luminance compression factors that may deviate greatly from unity in the tone mapping operations. Thus, values representing the pixel color in dimensionless form may be encoded and stored in a resolution that supports its final use for rendering of the tone mapped image thereby reducing the buffer storage space and data link transmission bandwidth requirements. In many cases, the resolution needed for final rendering of the image may be supported by eight or fewer bits per color component. The preceding applies to RGB encoding but necessitates the redundant storage of three color components in addition to the logarithm of the luminance. It is preferable to use and convert to a color space that expresses luminance either directly or indirectly as one of its components. For example if the popular YUV (the digital counterpart of the YUV color standard is Y Cb Cr but the YUV terminology will be used here to refer to either nomenclature) pixel encoding is used where Y is luminance and U and V are color components, U/Y and V/Y are dimensionless as indicated and may be calculated before tone mapping and optionally expressed in logarithmic form. For use of logarithmically encoded values, there are several additional mathematical considerations. One is that for real numbers the log of zero or of a negative number is not defined. The values of U and V may be zero or negative. Here, for example, U and V may first be decomposed into a sign and magnitude and the sign for each value may be stored as a bit in the output format. Then the log of the magnitude of each value may be used with the log of zero replaced by the logarithm of the smallest value that may be represented in the encoding system. The logarithms of values having small magnitudes are negative so there are two sign values for the logarithmically encoded values of U and V or of U/Y and V/Y, one for the original sign of the value and the second for the logarithmic representation of values having a small magnitude. These signs both need to be indicated in the numerically encoded values. Division of the magnitudes of U and of V by Y is preferably done by taking log(|U|)-log(Y) and log(|V|)-log(Y). Values that are out of range are preferably clamped to fit the available encoding space. Values too large/small to represent are replaced by the largest/smallest value that can be represented in the space allocated for storing or transmitting the value. In calculation of the ratio, to avoid division by zero, a convention such as supplying a black equivalent for U/Y and V/Y (or R/Y, G/Y, and B/Y) may be used for this special case. The values just indicated may be used for the COLOR VECTOR values 1211. If the YUV or other color space having luminance as one of its components is used, since luminance Y is one of the three components, there are only two color dependent components rather than the three color dependent components present in the RGB color space. Then only the luminance term is affected by the tone mapping and only the U/Y and V/Y terms need to be stored in buffer 1231 during the tone mapping operation. If the RGB color space is used, only the separate luminance term is affected by the tone mapping operation and as with U/Y and V/Y, the R/Y, G/Y, and B/Y terms are transparent to tone mapping, but there are three terms instead of two. Since the logarithmically encoded luminance value is stored with the color vector value, the tone mapped pixel values in the form where they are not divided by the pixel luminance may be recovered by multiplying the color components expressed as dimensionless ratios by the tone mapped pixel luminance value to provide the tone mapped color pixel value. For logarithmically encoded values, addition of the logarithmically encoded pixel luminance to the logarithmically encoded color component in ratio form is the equivalent of taking the product of corresponding linearly encoded terms. If the pre tone mapped value is needed instead, then the color components that are in ratio form may be multiplied by the pixel luminance value that is not tone mapped. The advantage is that in the format just indicated, the pixel color information may be represented with reasonable resolution using fewer bits, (8 or 12 or fewer bits per color component in the examples as opposed to using as many as 24 bits or more in linearly encoded integer form) for each of the color components. This is conservative. In an experiment, U was encoded as a sign bit plus five bits for a signed value for the logarithm of the magnitude of U/Y and V was encoded as a sign bit plus five bits for a signed value for the logarithm of the magnitude of V/Y. Very pleasing color results were obtained using only six bits to encode each of the two color components as just indicated. Using encoding techniques outlined above, a high quality, high dynamic range color pixel value containing all of the color components may be fit into 32 bits or less for storage or for transmission. The values generated as just described may, as an example, be encoded as a binary encoded logarithm to the base 2 with a four bit integral (signed or offset binary form) part IIII and an eight bit fractional part FFFFFFFF. Values that would otherwise be less than or greater than the range provided in the memory locations are preferably clamped to the corresponding minimum and maximum values for the range that is provided. In this way, values that might otherwise be badly in error if randomly clipped are set to their nearest equivalent value for the range provided.

Values 1203 stored in row buffer 1230 may optionally be left in the same floating point format as indicated for values 1201 as received or optionally converted to an alternate format such as integer form at the input stage. Values 1211 are converted to 24 bit binary encoded integer format as indicated at 1209, preferably as part of the operation to read them from buffer 1230 for use as source data for the color interpolation calculation in register 1210. The color vector 1211 is preferably encoded compactly as a ratio using one of the options described above and may, for example be encoded as a pair of 8 bit values that need only 16 bits of storage space. Alternatively, the color information may be encoded as a 36 bit value made up of three 12 bit logarithmically encoded values generated as indicated above, with the three values for the respective red, green, and blue pixel color components as depicted in the alternate version for the first note of FIG. 12. The logarithmically encoded luminance values with the optionally included pixel acquisition information AA are preferably encoded as described previously and the five bit binary value IIIII and 11 bit fractional value FFFFFFFFFFF along with AA represent the data format 1218 preferably stored in log luminance row buffer 1232. The log luminance values 1226 read from buffer 1232 are preferably read without inclusion of the pixel acquisition information AA and used, preferably in the format in which they are stored, as the data base for the bilateral filter calculation that uses values from tone mapping register array 1227 as the source of pixel kernel values for the bilateral filter calculation. The buffer 1225 provides buffer storage for pixel acquisition information AA during the time starting when this data would be overwritten if left in buffer 1232 and ending when it is included with the output pixel value 1228. The output pixel value preferably includes values that are successively subjected to color interpolation and then to the tone mapping operations. The values are preferably output in a form that is ready for additional image processing such as stitching or dewarping and/or feature recognition or display. This form may, for example, be an eight or more bit integer representation for each color component as indicated in the second note in FIG. 12 and may include the pixel acquisition information AA. Other bit lengths may be provided for pixel data depending on the application. The features indicated in FIG. 12 may be applied for configurations of the device that may, for example, include tone mapping but not color interpolation or color interpolation but not tone mapping. In these applications, data items not needed for the configurations may be omitted.

As pixel row buffer 4 expands to complete row 1205 and become a full row, pixel row buffer 0 shrinks to zero size. Calculations for pixels in the current row are completed for the border columns of pixels where pixels may be shifted to their appropriate positions in the array to perform calculations for pixels near the border prior to performing calculations for the next row of pixels. Options for finishing one row and beginning another include, shifting the pixels in the array 1210 to assume their correct positions for calculations for pixel locations near the right border of the array without introducing new columns of pixels that would be outside of the border, or entering new columns of pixels that are offset by one row and shifting them into the array as calculations are completed for pixels near the border of the previous row. In this case, columns of pixel values shifted in to initialize portions of the array 1210 for calculations for pixel locations in the next row are not accessed until calculations for pixel locations in the current row are complete and calculations for pixel locations in the next row for which they are properly aligned are begun. Then when calculations for pixel locations in the next row begin, pixels in columns at the start of the row will already be in the array 1210 and calculations for pixel locations in this new row may be initiated and pixels remaining in the array from calculations for pixel locations in the previous row should not be accessed for calculations for pixels near the border in the new row. When pixel row buffer 4 expands to fill all of row 1205 and pixel row buffer 0 shrinks to zero and ceases to exist, the row buffer numbering as depicted is all decremented by one at the start of the new row and pixel row buffer 4 in row 1205 becomes the new pixel row buffer 3 and pixel row buffer 1 in row 1206 now becomes the new pixel row buffer 0 and pixels are added to a newly formed pixel row buffer 4 at the start of row 1206. Thus, the row buffer locations associated with given rows in array 1210 advance cyclically by one row in row buffer array 1230 and this advance results from the incremental advance in rows in the image used for calculations related to pixels in successive rows of the image and data in row buffer 1230 is not moved but the row to which new pixel values are written overwriting the oldest pixel value advances cyclically through the array. For processing successive rows of image data, the row with the dual partial buffer interface progresses to the last row 1208 of the buffer array 1230 and then cycles back to row 1205 of the cyclic array.

The description here for buffer array 1230 and its associated calculation supporting array 1210 may be applied to row buffer array 1232 and the associated tone bilateral filter calculation supporting array 1227. In this case, the same kind of control to restrict access to values in the array 1227 that are outside of the image border or replace these values with zero or with another value appropriate to the calculation may be implemented to provide the same options in transitioning from one row to the next as are provided for the color interpolation calculations associated with buffer array 1230.

Figure 13:
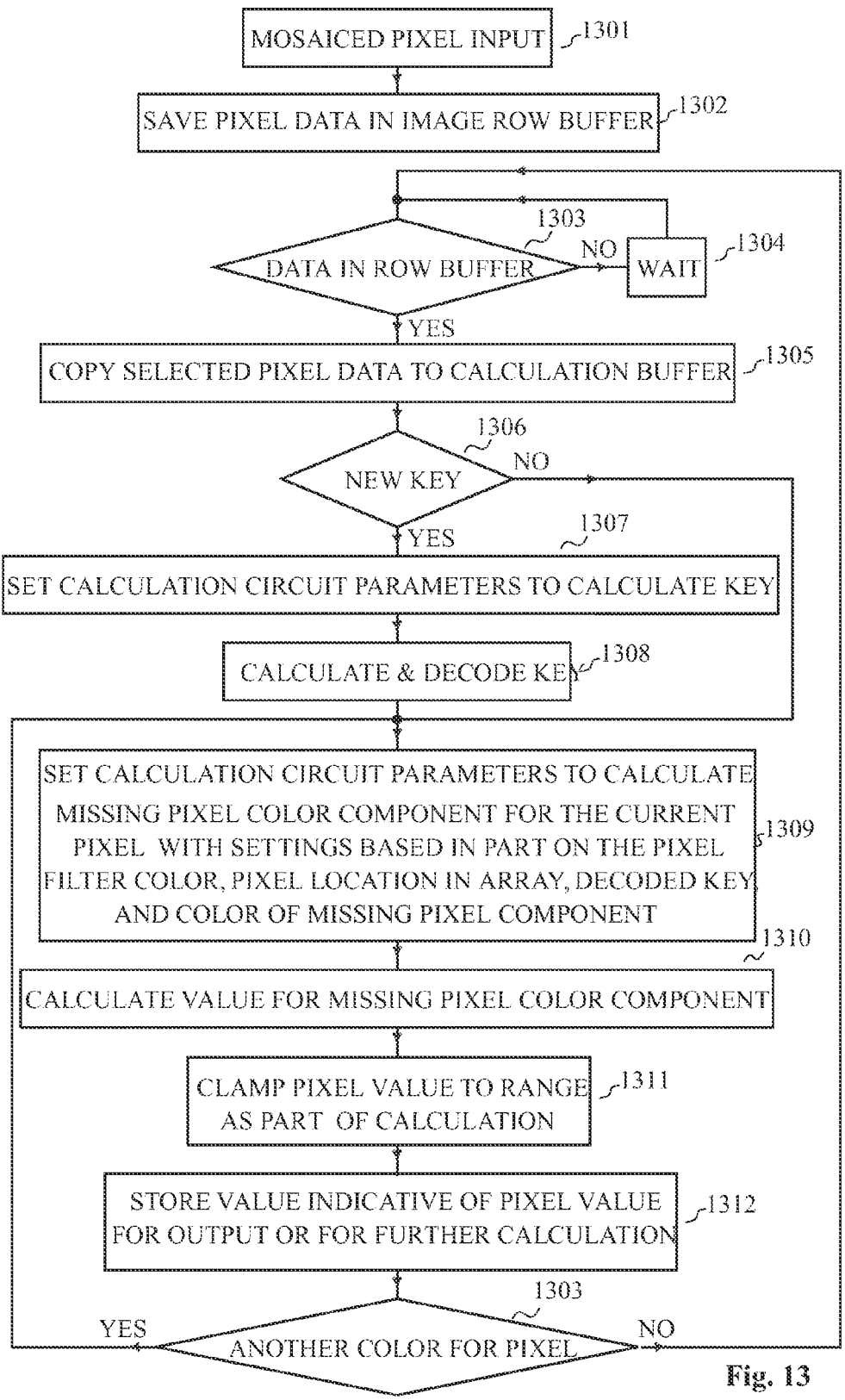
FIG. 13 depicts a simplified flow diagram of the operation of a device configured to accept data associated with a digital image having missing color data for each pixel.

FIG. 13 is a simplified flow diagram of the operation of a device configured to accept an image with missing color components and provide the missing color components. For example, when Bayer filter patterns are used, only one of the three color components is normally supplied at each pixel location and the device preferably supplies pixel values for each of the two missing components for each pixel in the image. Pixels are input at 1301 from an image source such as an imager having a Bayer filter array to provide one color component for each pixel location. In a preferred embodiment, missing pixel values are provided for each of the two missing color components based on calculations that use pixel data from a five row by five column supporting array of input pixel values with calculations made for the pixel that is centered in this supporting array. Pixel data is stored in a buffer at 1302 after optional format conversion and conditioning that may include but is not limited to color correction. The decision circuit 1303 and delay circuit 1304 operate together to delay transfer of data to the calculation buffer 1305 until it is available in the row buffer 1302. When the data is available, it is copied, preferably a column of values at a time, to the calculation buffer at 1305 and when data is available in buffer 1305 to support the calculation for another pixel, control is passed to decision block 1306 where a check is made to see if a new key should be calculated. If a new key is needed, it is calculated and otherwise its calculation is bypassed. As indicated in the more detailed description of a preferred circuit, a value for the key is calculated based on pixels in a neighborhood of the pixel or pixels for which missing color components are being supplied. The calculation circuit is configured to calculate the key at 1307 and the key is decoded at 1308 to provide an indication of the presence of edges along with their orientation and this information is used in selecting an appropriate conversion algorithm or conversion circuit configuration to provide missing color components for each of the pixels for which a particular key is used. Optionally, the pattern indicated by the key may be interpreted differently for the individual pixel locations for which it is applied and/or may be used to detect the presence and orientation of features other than or in addition to edges. The calculation circuit is configured to calculate the value of a missing color component for the pixel for the pixel location currently centered in the supporting array of pixel values at 1309. The calculation algorithm chosen and executed in a dedicated circuit as indicated here or optionally as a routine in a software program is based on a number of factors that may include but are not limited to, the color of the missing color component being calculated, the color of the Bayer filter for the current pixel for which the calculation is being performed, the location of the filter color for the current pixel relative to other filter colors in the color filter pattern, the proximity of the current pixel to a boundary of the image, the decoded value of the key for the current pixel. After configuring the calculation circuit or optionally selecting an appropriate calculation routine based at least in part on factors indicated above, a calculation is performed to provide an intermediate value for the missing color component. The intermediate value may be negative or may exceed a range provided for the pixel value. In block 1311, the intermediate value is clamped to the accepted pixel output range to provide the value for the missing color component that is stored in a buffer for output or for further processing that may include color correction at 1312. There are normally two color components to provide for each pixel and in decision block 1303 a determination is made as to whether there is another color component to provide for the pixel in which case control is passed to block 1309 and if all of the color components have been provided for the current pixel, control is passed to 1303 to service the next pixel.

In the circuit depicted in FIGS. 8 and 8A, selection of the circuit configuration to calculate one or more missing color components for a given pixel or pixels is based in substantial part on pattern detection performed for a preselected array of pixels that preferably have green filters in the color filter array. The preselected array of pixels is used as the base for a pattern image and is referred to as the pattern array. Values that are preferably binary (either one or zero) are calculated for individual pixels in the pattern array preferably based on comparisons of values of the individual pixels in the pattern array to a threshold value. The single bit binary values of the compare outputs are referred to as pattern values and the image formed by pixels that are given the pattern values and arranged to generally match the geometric layout of the pattern array will be referred to as the pattern image. Pattern values in the pattern image are sampled and analyzed to detect patterns in the pattern image that correspond to patterns such as edges and edge orientations in the original pixel values recorded in the image. In the circuit of FIG. 8, the circuit that is selectively configured to calculate the various interpolated values is shared to calculate the average of the values of the pixels in the preselected pattern array. Then a pattern image is formed by, for example, assigning a pattern value of one to pixels in the pattern image that correspond to pixels in the array whose values are approximately greater than the average and assigning a pattern value of zero to pixels in the pattern image that correspond to pixels in the array whose values are approximately less than the average. In the circuit of FIG. 8, a key is generated from the binary pattern values and used as an index into a table or as an input to a logic circuit to select or to generate a value that is indicative of the circuit configuration that is appropriate for the interpolation operation. In the circuit of FIG. 8, register 831 holds the average value that is compared in compare circuits 816 against pixel values from pixels in the preselected pattern array and the binary outputs of the compare circuits provide the binary values for the pattern image that is generated. In block 817, these binary compare values are arranged in a predetermined sequence to provide a key that is indicative of the pattern image pixel values and in block 829 the key is decoded to provide an indication of the circuit configuration appropriate for the pattern image. In preferred configurations, the patterns that are detected in the pattern image include those that indicate the presence and the orientation of approximately horizontal and approximately vertical edges in the pattern image. Optionally, diagonal edge features or other features the pattern image may also be detected. As an example, these other features may include detection both of edges that span greater distances and ones that span shorter distances and the shorter and longer edges may be treated either as a common or as discrete patterns.

The circuit of FIG. 8 that uses the average as the compare threshold for the pattern performs well and the threshold provided by the average adapts well to both very brightly and very dimly lighted areas in an image as well as to midrange lighting conditions so that use of the average is one of the preferred ways to provide the threshold level used to generate the pattern image. One limitation of the average as the base for the one/zero classification of pixels in the pattern image is that when the pixels in the pattern array includes both very dim and very bright pixels, the average may be skewed in a way that provides too few or too many ones or zeros in the pattern image to make it as useful as it might otherwise be to provide an indication of patterns that are present. More generally, compare threshold levels that provide other balances in the relative number of ones and zeros in the pattern image than that provided by using the average may reveal patterns in the image that are missed in the single pattern image provided by the circuit using the average value of the pixels in the pattern array as just described. Carrying this one step further, it is preferable to select compare thresholds to generate a set of different pattern images that include ones with differing numbers of ones or of zeroes, for pixels in the pattern image (at least for those not containing pixels of equal value).

Figure 14:
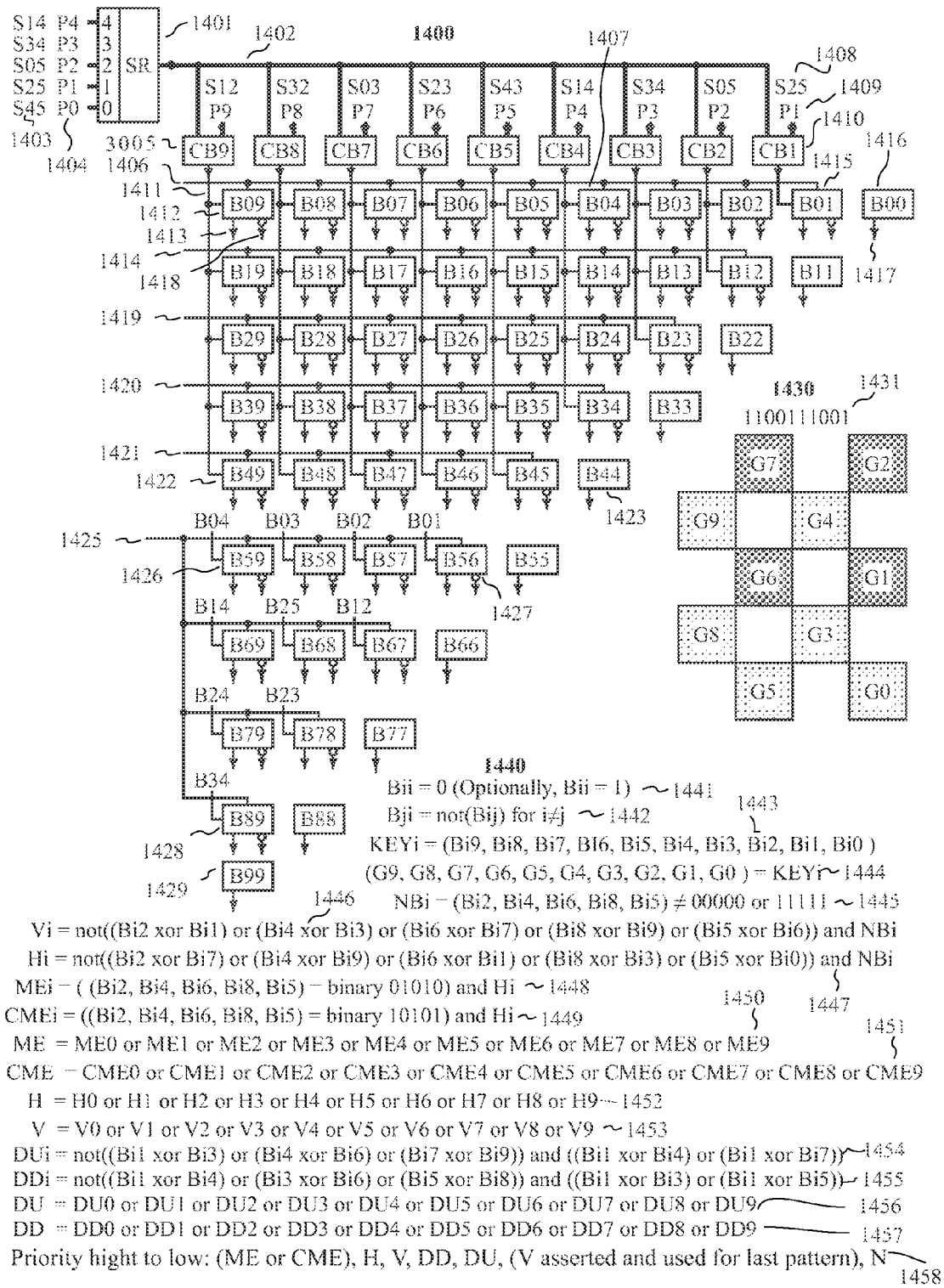
FIG. 14 depicts a simplified schematic of a preferred embodiment of the present invention implementing a multi-pattern based algorithm.

In an alternate embodiment depicted in FIGS. 7A, 8A, 9A and 14 and preferred for color interpolation for very high dynamic range images, most of the circuit of FIG. 8 is retained but instead of providing the average 831, compare circuits 816 are reconfigured and preferably used multiple times to provide a structured indication of results of compares of brightness of pixels in the pattern array relative to one another. The compare circuits shown as CB1 1410 through CB9 1405 in FIG. 14 are depicted as 842A in FIG. 8A. Blocks 842A, 843A, 844A, 845A, and 846A denoted in dashed line box 841A in FIG. 8A correspond generally to the more detailed representation in FIG. 14. Compare result storage elements B01 1415 through B89 1428 provide the comparison result matrix 843A. Pixel array 1431 in combination with values stored in 1400 and pattern detection logic provided by logic expressions in block 1440 provide the base for the multiple patterns detected on the multiple pattern images in block 844A of FIG. 8A. Logic equations for ME, CME, H, V, DD and the prioritizing indication 1458 provide the detail for combining and prioritizing the pattern results to provide information to make a pattern selection in blocks 845A and 846A. The compare indications from CB1 through CB9 that indicate the results of comparisons, one to another, of pixel values in the pattern array are used directly, preferably without additional compares, to generate multiple pattern images for the pattern array and these pattern images or their associated key values are preferably used to at least in part select or configure the calculation circuit to provide the interpolated color values. In a preferred embodiment, the pixel value selected as a reference pixel in the pattern array is used in a manner similar to but in place of the average used in FIG. 8 and compared against other pixel values in the pattern array to generate a set of binary values that indicate how the brightness of the selected pixel compares with the brightnesses of other pixels in the pattern array. For comparison of pixel 'a' against pixel 'b', the compare value for comparison of pixel 'b' against pixel 'a' may be inferred as the logical complement of the result of a comparison made when the comparison order is reversed. In paragraphs that follow, the term reference pixel will be used to convey meaning of the pixel in the pattern array whose value is used as the reference value for comparison for a particular subset of results preferably obtained as a direct or as an inferred comparison. The results of the compares are preferably encoded so that a pixel in the pattern image is assigned a pattern value of one if its intensity is approximately greater than the selected reference pixel and a pattern value of zero otherwise. Similar compares are preferably performed using other (preferably all other) pixels in the pattern array as the reference pixel and these other pixels are preferably selected one by one in sequence as the reference pixel so that a set of results for comparisons of pairs of pixel values for pixels in the pattern array is generated. The array of comparison values constructed as just indicated is preferably arranged to provide data that corresponds to separate pattern images with each pattern image associated with the pixel in the pattern array that was used as the reference pixel to generate the pattern image. It is preferable to limit the number of comparisons that are made by assuming that the result of comparing pixel "a" against pixel "b" is the logical complement of comparing pixel "b" against pixel "a" as indicated above. When all of the pixels in the pattern array are included as reference pixels either through direct or implicit comparisons so that compare results for all pairs of pixels in the pattern array are included, these results provide information needed to generate a pattern image and its key for each pixel in the pattern array as it is used as the reference pixel with ones assigned to pixels that are approximately greater in brightness than the associated reference pixel and zeros assigned to pixels whose brightness is approximately less than that of the associated reference pixel. The reference pattern image value associated with the reference pixel may be assigned a pattern value of either a zero or one, but it is preferable to establish a uniform convention and to use one or the other assignment consistently. If the reference pixel is assigned an associated pattern value of zero there will be no pattern images that are all ones and if the reference pixel is assigned an associated pattern value of one there will be no pattern images that are all zeros. But, in either case, for n pixels in the reference array there will a pattern image that contains exactly one one, another that contains exactly two ones, etc. through a pattern image that contains exactly n−1 ones. Another way of stating this is that the set of reference images generated will be constructed so that for a reference image having n pixels, each of the n pixels is used as a reference pixel to generate an associated pattern image. Then in this set of n pattern images, when none of the pixel values in the pattern array are equal, there is one that has exactly r pixels that have a pattern value of one for every integral value of r between and including 1 and n−1. Thus, all of the pattern images generated by segregating the reference image into non-empty groups of larger and smaller pixel values and assigning a pattern image value of one to the pixels with the larger values and a pattern image value of zero to the pixels with the smaller values are provided. In the circuit description, some of the statements are logically correct only when all pixels in the pattern array have discrete values, that is, when none of the pixels in the pattern array have equal values. In the circuit implementation, the circuit would be considerably complicated if the cases of equal pixel values were detected and treated as special cases. Furthermore, when pixel values are equal or nearly equal, the choice of the circuit used for the interpolation does not normally change results that much. Additionally, slight noise would easily alter the equality status anyhow making it prudent to sidestep the complicating issues presented when equal values are treated as special cases. The circuit is preferably configured so that approximations introduced to avoid handling equal pixel values as special cases do not lead to circuit malfunction or to highly objectionable results. Provision of a consistent bias in treatment of comparison results for equal pixel values is one way to reduce the number of logical flaws that might otherwise propagate into objectionable circuit behavior. In the example, a compare value of one is assigned when the value of the pixel compared against a selected reference pixel is greater than the selected reference pixel and a compare value of zero is assigned otherwise. This is consistent with presuming a bias that when a pixel of equal value is compared against the selected reference pixel, it will be assigned a value of zero. In the pattern images that are generated, there is an implied self comparison of the selected pixel against itself and this is preferably also assigned a value of zero when the compare criterion just indicated is used. If the compare criterion to which a one is assigned is changed from greater than to greater than or equal to (i.e. not less than); then, the implied self comparison values are preferably assigned a value of one to be self consistent. In certain alternate designs, the assigned compare values of one and zero may be reversed since the configuration of the interpolation circuit may in most cases be the same for a pattern images and its negative or complementary pattern image. When such a reversal is used, care should be taken to properly handle special cases that do depend on high or low intensity or that for various other reasons might not be transparent to the one/zero inversion. One such example, as explained elsewhere, is that of patterns from portions of an image with multiple edges spaced approximately one pixel width apart. In the description of the circuit in FIG. 14, it is presumed that pixels in the pattern array have discrete values and that features such as those just described are provided to prevent or at least limit undesirable performance when equal pixel values are encountered. The statements above are not intended to limit the scope of the invention but to provide a preferred option to simplify the circuit by structuring it to operate satisfactorily without treating all cases when pixel values are equal as special ones.

In FIG. 14, G0 through G9 are used to indicate pixel locations or associated pattern values of pixels that preferably have green filters in the color filter array and which are preferably positioned as indicated by the array 1430. The actual respective values of these pixels are indicated by P0 through P9, respectively. 1431 indicates the key constructed according to equation 1443 associated with the pattern image 1430. The data paths for these values and for the selected pixel value of one of the pixels P0 through P4 1404 at 1402 are preferably wide enough to provide full width data paths for transmission of the pixel values.

The tags S12, S32, S03, S23, S43, S14, S34, S05, S25 and S45 indicate storage registers in FIG. 8A that are preferably connected to the respective inputs P9, P8, P7, P6, P5, P4, P3, P2, P1, and P0 when the circuit 1400 of FIG. 14 is included in the circuit of FIG. 8A. Pixel array 1430 indicates the location of pattern array pixels G0 through G9 in the imaging array. These pixels are preferably ones with green filters in the color filter array and the imaging array is preferably used when interpolated pixel values are calculated for the pixel location at G6 and for the neighboring non-green pixel location between G1 and G6. Select circuit 1401 responds to a select control signal, not shown in the simplified logic diagram, to place the selected one of pixel values P0, P1, P2, P3, or P4 on bus 1402 thereby routing the selected pixel value to the inputs of compare circuits CB1 (1410) through CB9 (1405) where the pixel values of P1 through P9, respectively, are compared against the selected value that is used as the reference pixel value. Each compare circuit preferably outputs a one bit compare value. The output of CB9 1405 is asserted on column line 1411 and may be stored in the storage flip-flop: B09 1412 by asserting storage enable line 1406, B19 by asserting storage enable line 1414, B29 by asserting storage enable line 1419, B39 by asserting storage enable line 1420 or B49 1422 by asserting storage enable line 1421. Values from compare circuits CB8 through CB1 that have storage flip-flops in the same row are saved along with the output from CB9 when a storage enable signal is asserted. Output 1413 is the non-complemented output and 1418 is the complemented output of storage flip-flop (or memory cell) B09. Complemented output 1413 is included because it represents the value of the transpose term B90 that is not provided as a separate storage register because it would be a duplication of the information provided by B09. Particularly for the copy used to obtain the ten compare results beginning with B59 1426 in row 5 and including locations in this row and in succeeding rows through B89 1428 in row 8, these values would need extra logic to acquire the extra transpose terms at the time that the copied over values were acquired. For each of the ten diagonal terms B00 through B99, the first and second numerical digits in the name are equal and these terms each imply a self comparison of the reference pixel against itself and are preferably either all zero or all one as explained above. The complement outputs and the constant diagonal terms are included for completeness in the description and it is presumed that they may be optimized out in an actual logic implementation. Storage of compare results in rows 4 through 0 (terms B4j through B0j for terms in column j of each row 4 through 0) is synchronized with selection of P4 through P0 so that the Bij term represents the result of comparing pattern array pixel value Pj against pattern array reference pixel value Pi for i and j taking on values 0 through 9. The outputs of the complement (Bji) of Bij provide values for term Bji that serve to fill in the missing terms in the triangular matrix to provide values for a full 10 by 10 matrix. The 10 values of B00 through B09 then provide the pattern image pixel values when P0 is the reference pixel and in general for completed 10 element row i Bi0 through Bi9 provide the pattern image pixel values when Pi is the reference pixel. In the example in FIG. 14, columns of pixel values in the array used as the base for calculation of the interpolated values are shifted to the left as interpolated values are provided for each pixel location and the operations indicated in association with FIG. 14 are performed with the pixels in a single location. This is explained in more detail in the description of FIG. 8A. Additionally, it is presumed that the calculation to be described in association with FIG. 14 was previously performed two pixel location increments earlier when the pixel value that is now in G5 was in G0, the pixel value that is now in G6 was in G1, the pixel value that is now in G7 was in G2, the pixel value that is now in G8 was in G3, and the pixel value that is now in G9 was in G4. Because of the serial sequence corresponding values calculated for interpolation at the proceeding pixel or pixels for B01, B02, B03, B04, B12, B13, B14, B23, B24, and B34 are still valid but now apply to corresponding pixels as indicated above so they are copied to B56, B57, B58, B59, B67, B68, B69, B78, B79, and B89, respectively, by asserting a store enable signal at 1425. Following this, while pixel values at P0 through P9 are stable, select circuit 1401 is configured by signals not shown in the simplified circuit to select signals P4, P3, P2, P1, and P0 in sequence and gate the selected pixel value to bus 1402 where it is input to compare circuits CB9 1405 through CB1 1410 and compare values are saved in appropriate rows of the triangular matrix as described above.

Logic expressions 1440 are preferably implemented in logic circuits to provide pattern recognition that is based on patterns detected in one or more of the pattern images constructed from the comparison results saved in memory cells Bij in circuit 1400. Equation 1441 is a statement of the fact that self compare values are 0 (or optionally 1 depending on the compare criteria). Equation 1442 indicates that the comparison of "b" to "a" is the logical complement of the comparison of "a" to "b" and is used to fill out the rows to 10 elements each for the triangular array in circuit 1400. The expression 1443 provides ten sets of values for KEYi for values of i ranging from 0 to 9. KEYi is an ordered list of the values in the $i^{th}$ row of the array of values provided by circuit 1400 and completed using equation 1442. Ten pattern images are provided by setting the ten pattern array values G9 through G0 1430 equal to corresponding values in KEYi as indicated at 1444. NBi 1445 is zero or false when Bi2, Bi4, Bi6, Bi8 and Bi5 are all zero or all one and is used to screen out blank full zero or full one patterns for Vi and Hi. A vertical pattern Vi 1446 for the pattern image associated with the $i^{th}$ row is asserted when the five pairs of values (Bi2, Bi1), (Bi4, Bi3), (Bi6, Bi7), (Bi8, Bi9), and (Bi5, Bi6), each pair having elements from the same column, are all matching pairs as indicated by exclusive or values of zero and the matching pairs are not all zero (or all one) as indicated by a nonzero, true, value of NBi. For the vertical patterns, there are two columns in the pattern array that contain 3 elements. To demonstrate that there are options in defining the patterns, the pairs (Bi6, Bi7) and (Bi5, Bi6) are both matched against each other so that all three elements G5, G6, and G7 must match for the vertical pattern detection Vi to be asserted while G0 is not included at all in the vertical pattern criterion. Many other options for pattern recognition may be used to practice the invention. A horizontal pattern Hi 1447 for the pattern image associated with the $i^{th}$ row is asserted when the five pairs of values (Bi2, Bi7), (Bi4, Bi9), (Bi6, Bi1), (Bi8, Bi3), and (Bi5, Bi0), each pair having elements from the same row, are all matching pairs as indicated by exclusive or values of zero and the matching pairs are not all zero (or all one) as indicated by a nonzero, true, value of NBi. In the example, the elements Bi2, Bi4, Bi6, Bi8 and Bi5 are each elements of different pairs both for the expression Vi used to indicate the vertical pattern match and for the expression Hi used to indicate the horizontal pattern match. Additionally, because the match indicates equality of members of each of the individual pairs, the values of all 10 of the elements may be inferred from the five values Bi2, Bi4, Bi6, Bi8 and Bi5 when a horizontal match Hi is asserted and the values of the nine elements G1 through G9 may be inferred by the five values Bi2, Bi4, Bi6, Bi8 and Bi5 when a vertical match Vi is asserted. Use of the smaller subset of elements Bi2, Bi4, Bi6, Bi8 and Bi5 to detect the full one pattern, the full zero pattern and the multiple edge patterns MEi and complementary multiple edge pattern CMEi using this subset of pixels results in a substantial saving in the logic circuits needed to detect and distinguish patterns of interest. Another way of stating this is that a pattern detection circuit is simplified by preferably choosing single representatives from each subset of elements where the elements in each of the subsets must match to fulfill a primary pattern matching condition. Then, for a pattern matching condition, the values of the representatives provide an indication of the values of the elements in the larger group of combined subsets. Matches of patterns in the group of representatives may then be used to categorize patterns that fulfill the primary pattern matching condition. The technique is preferably extended to more than one primary matching condition by arranging distinct subsets for each primary matching condition so that they share the same representatives for each of the primary matching conditions. Then tests for patterns within the set of representatives may apply to either or both of the primary patterns. This may be further extended to more than two primary patterns and/or may be applied only to portions of primary patterns.

The equations for MEi 1448 and CMEi 1449 employ the technique indicated above to provide simplified logic circuits to detect multiple edge patterns along with classification of these patterns into each of the two complementary forms as explained in association with FIGS. 6K, 6L, 10A, 10B, 10C, and 10D. The technique is also used to provide NBi 1445 that is used to provide simplified logic circuits for both the vertical pattern Vi matching and the horizontal pattern Hi matching to screen out all zero and/or all one pattern.

As a preferred option, logic circuits DUi 1454 and DDi 1455 are provided to detect edges that are oriented diagonally up or down, respectively, in going from left to right.

In a preferred embodiment, logic circuits are provided to determine NBi 1445, Vi 1446, Hi 1447, MEi 1448, CMEi 1449, DUi, and DDi for each value of i (0 through 9 in the example). The MEi terms are "or" ed together to provide an overall multiple edge pattern indication ME 1450. Similarly, CMEi terms are "or" ed together, Hi terms are "or" ed together, Vi terms are "or" ed together, DUi terms are "or" ed together, and DDi terms are "or" ed together, to provide CME 1451, H 1452, V 1453, DU 1456, and DD 1457, respectively.

More than one pattern may be detected and it is preferable to assign a priority as indicated in the listing 1458 or optionally some other screening criteria to choose a result when multiple patterns are detected. In a preferred embodiment, ME (1st), CME, H, V, DD, and DU are given priority in that order so that a match occurring for the pattern with the highest priority is asserted and overrides any lower priority matches that may be asserted. The pattern array 1430 of this example includes pixels from five rows and four columns in the imaging array and there is advantage in including pattern features that extend over the entire or at least a larger part of the pattern array. Vertically oriented features are the most neglected in this respect. Because of the sequential processing of pixels in a row, it is possible to include results of previous, preferably the immediately previous set of pattern images as part of the pattern determination for the current pixel set. If no pattern features are detected in the current pattern set and if a vertical edge pattern was detected in the immediately previous pattern set, then a vertical edge pattern is used for this interpolation set also, but the vertical edge detection is preferably not propagated farther than from the immediately preceding edge detection to the next. Finally, if no edges are detected the nondirectional pattern N is preferably the default indication when no other pattern features are detected. In a preferred embodiment, the logic just indicated is implemented in a Xilinx Spartan 6 series FPGA. With the six inputs, 64 bit lookup table devices used to implement logic functions, the logic just described may be implemented with a reasonable number of programmable logic elements.

The pattern matching circuit just described performs a complex function that is similar to looking at the pixel values in the pattern array and beginning with a very high threshold as a reference value, lowering the threshold until one pixel is assigned a one in the pattern image and looking for a pattern in this pattern image and continuing this sequence, further lowering the threshold until two pixels are assigned a one in the pattern image and looking for a pattern in this pattern image and continuing this sequence until all but one pixels are assigned a one in the pattern image and looking for a pattern in this pattern image. In the preferred embodiment, by using values of pixels in the pattern array as references, calculations to find averages or medians, or use of multiple unnecessary repeated trials are avoided. Additionally, by using all of the pixels in the pattern array as reference pixels, all of the patterns, i.e. those with one one, two ones etc. through n−1 ones are provided. Since the pattern detection circuits effectively detect patterns in pattern images with any number of ones, it is not necessary to classify the patterns as to the number of ones in the pattern but only to look for patterns in all of the pattern images knowing that, for a pattern image with n pixels that have distinct values, patterns with one one through patterns with n−1 ones are all included. The surprising result has been that in implementations tried, it may require less hardware to implement pattern detection than to count ones in an image and to port pattern images with predetermined numbers of ones to an appropriate pattern recognition circuit.

Logic may be provided to detect additional patterns such as diagonal edges. The description has focused on provision of edge and feature detection used to select interpolation equations or calculation circuits or routines to supply missing color values for images acquired using a color filter array. The circuit is not limited to this function and may be adapted to other tasks such as image based feature extraction that might, for example, be used to detect horizontally separated pairs of lights such as distant taillamps or headlamps for a headlamp dimmer control application. One application of such feature extraction beyond simple location of the features in the image would be to respond to probable headlamps and taillamps (detected as close spaced but horizontally separated light sources) to select specialized color interpolation routines to improve the color interpolation, since, particularly for taillamps, color is an important distinguishing feature. One way that this could be used is to cross sample or average color components detected at the pair of lamps and because of their separation improve the accuracy of the interpolated color values that are provided. Locations in the image might also be tabulated to facilitate further image processing.

Patterns that are of interest each have a certain number or numbers of ones and zeros and the patterns will show up only in pattern images with the corresponding number or one of the corresponding numbers of ones and zeros. Pixel values need to be ordered to know how many ones and zeros each will yield when used as a reference pixel to generate a pattern image with a known number of ones and zeros. Several patterns with different numbers of ones and zeros are needed to detect all of the patterns of interest. For a pattern image with n pixels it is preferable to generate patterns with every possible number of ones between 1 and n−1 and analyze each for possible patterns. By including and searching all of the pattern images of interest, one may be assured that all appropriate patterns will be included in the composite results. This assurance may be given without knowing the number of ones and zeros in specific patterns only when all pattern images of interest are included.

Figure 14A:
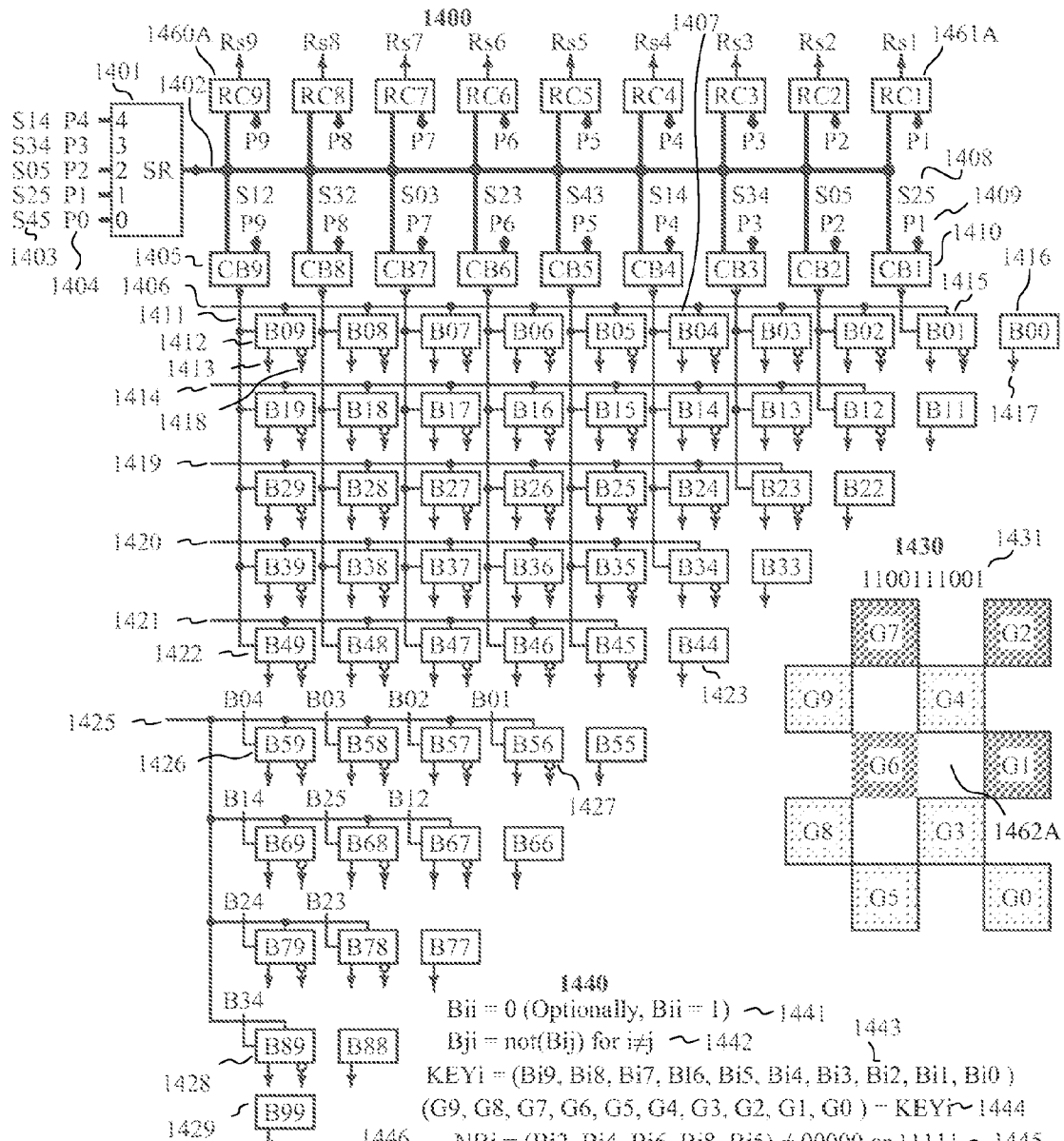

FIGS. 14A through 14C indicate modifications of the multi-pattern image detection circuit of FIG. 14. The circuit 1400 used to generate the pattern images is substantially unchanged from the corresponding circuit of FIG. 14 except for the option to add contrast ratio compare circuits RC1 through RC9. In both FIG. 14 and FIG. 14A, pattern images are generated as illustrated in the pattern array 1430. Other than the removal of term V0 that saves some logic but should make little difference in function, the terms Bii, Bji, KEYi, NBi, Vi, Hi, MEi, CMEi, ME, CME, and H are substantially unchanged from the corresponding terms described in FIG. 14. Diagonal edge patterns DU and DD have been omitted from FIG. 14A but could, as an option be included. FIG. 14B includes prioritization 1409B and 1422B used in the example. Here more than one feature may be detected even in a single pattern image and in a set of related pattern images so a selection order, with highest priority on the left, that is provided here by the prioritization is a significant component of the invention.

In addition to the prioritization, patterns with several different characteristics are included. First, the horizontal, 'H', and vertical, 'V', patterns and the related multiple edge patterns ME and CME in FIG. 14A are preferably used in selection of interpolation algorithms for a pair of adjacent pixels one at a pixel site with a green filter and the other at a pixel site with a non-green filter. In FIG. 14B, four patterns, each based on pattern images over four green pixels that are neighbors of a non-green interpolation site are used to, in part, determine the interpolation algorithm to select to provide an interpolated value for the non-green interpolation site. The sub-pattern images consist of four patterns composed of the pattern values of the corresponding pixels G1, G3, G4, and G6, from pattern images represented by KEY1, KEY3, KEY4, and KEY6 that were generated using each of the pixels in the sub-pattern in turn as the reference pixel. These keys were generated using each of the pixels in the sub-pattern in turn as the reference pixel. The patterns are used in selection of the interpolation algorithms used to calculate interpolated values that correspond to pixel location 1462A of pattern 1430 of FIG. 14A. Similarly, five patterns, each based on pattern images over five green pixels that consist of the green pixel at an interpolation site with a green pixel and its four green neighbors are used to, in part, determine the interpolation algorithm to select to interpolate a color component for an interpolation site with the green filtered pixel. The sub-pattern images consist of five patterns composed of the pattern values of the corresponding pixels G3, G4, G6, G8, and G9, from pattern images represented by KEY3, KEY4, KEY6, KEY8, and KEY9 that were generated using each of the pixels in the sub-pattern in turn as the reference pixel. The patterns are used in selection of the interpolation algorithms to use to calculate interpolated values that correspond to pixel location G6 of pattern 1430 of FIG. 14A. In summary a pattern over n pixels that form a subset of pixels from pattern images generated over m pixels may be detected by selecting the n pattern images from the larger set where the selected pattern images include those for which each of the n pixels in the subset was used as a reference pixel. The pixels in the selected pattern images that correspond to pixels in the sub-pattern are examined to detect the presence of patterns.

The four pattern images RGi, BGi, LGi, and TGi each consist of spatially orientated patterns of three adjacent pixels including the center pixel that all have the same pattern value while the remaining two mutually adjacent pixels both have the opposing pattern value. These patterns form geometrically oriented contrasting zones and the interpolation equations that are chosen in correspondence to a specific one of the patterns are characterized by selection of values that include or are closest to the larger zone of three pixels that have matching pattern values. Six pattern images are used for the four green pixels that are neighbors of an associated non-green interpolation site. Two of the patterns contain pattern images having two diagonally positioned zones of two adjacent pixels each for which pixels of each zone have matching pattern image values but the pixels of the two zones have opposing pattern image values. For the diagonal interpolation equation associated with these patterns, interpolation is performed using the values of the diagonally aligned pair of pixels having the color that matches the interpolation color and that are aligned in the diagonal direction of the zones in the green pixel pattern image. The remaining four patterns each have a geometrically oriented cluster of three pixels with one of the pattern image values and the remaining pixel has the remaining pattern image value. The interpolation equations that are chosen in correspondence to a specific one of the patterns are characterized by selection of values that include or are closest to the larger cluster of three pixels that have the same pattern image value. In FIG. 14B, logic equations that are true when a specified pattern image is detected are indicated at 1401B, 1403B, 1405B, 1407B, 1410B, 1412B, 1414B, 1416B, 1418B, and 1420B and the logic equations for the 'or'ed results that indicate the multiple pattern search result are indicated by logic equations 1402B, 1404B, 1406B, 1408B, 1411B, 1413B, 1415B, 1417B, 1419B, and 1421B. The letter G in the suffix portion of the name indicates an interpolation pattern used at a green pixel location and NG in the suffix portion of the name indicates an interpolation pattern used at a non-green pixel location. Names beginning with R, B, L, or T indicate, respectively, a pattern image oriented toward the right, bottom, left or top of the image and these are the letter designations used to classify the pattern image patterns for both the diagonal and cross interpolation patterns for the non-green filtered pixel locations and the horizontal and vertical interpolation patterns for the green filtered pixel locations in FIGS. 7B, 14C and 15. The names for the diagonal zones apply to interpolation into pixel locations with non-green filters and have names beginning with DR for diagonal down to the right and UR for diagonal up to the right. These two patterns are identified by DR and UR, respectively, in FIGS. 7B, 14C and 15. The vertical, horizontal, multiple edge, and complementary multiple edge pattern image patterns are designated, respectively, by V, H, ME, and CME.

FIG. 14C gives examples of pattern image patterns that correspond, one to each of the 14 different patterns indicated above. Pixels with the "darker" larger dot sizes indicate pixels having one pattern image value and the pattern image pixels with the "lighter" smaller dot sizes indicate pixels having the opposing pattern image value. For the interpolation patterns indicated and for the interpolation equation selection, only the ME and CME multiple edge patterns are sensitive to the specific '1' or '0' pattern value. Here, the best verification of the appropriate association of is to select the correlation that gives the best result. The intention is that the larger diameter dots represent '1's.

Figure 15:
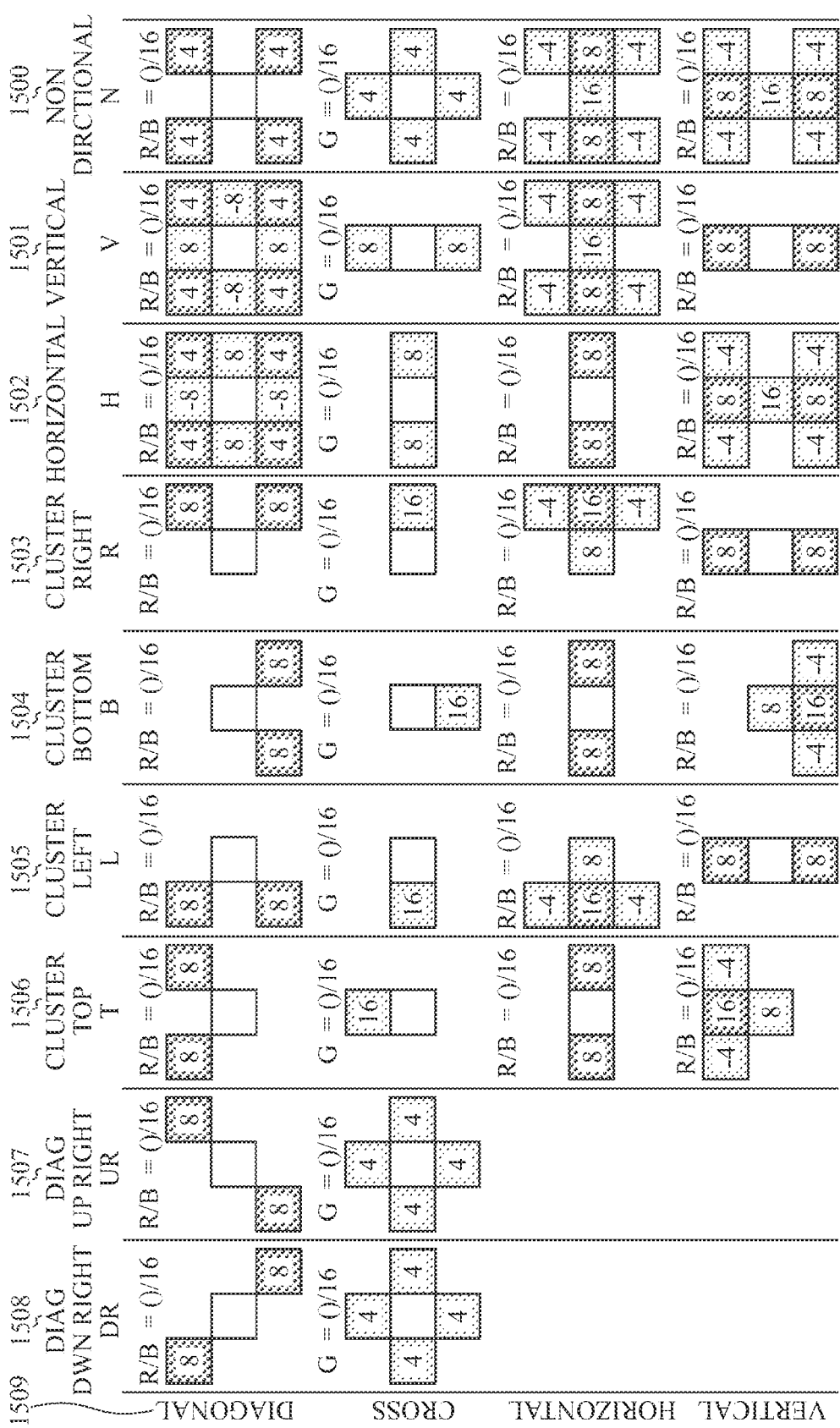
FIG. 15 depicts pixel locations and associated coefficients for an improved set of interpolation equations.

FIG. 15 gives a pictorial representation of the interpolation equations indicated as an array of multiplying coefficients in columns 704B, 705B, and 706B of FIG. 7B and as equations in column 711B of FIG. 7B. The multiplying coefficients of FIG. 15 like those of columns 704B, 705B, and 706B of FIG. 7B reflect a multiplication of 16 that may be removed by dropping the four least significant bits for the final result. Pixels with green filters are represented by the dot pattern with smaller diameter dots and red or blue pixels are represented by dot patterns with larger diameter dots. Multiplying coefficients are represented by the numbers at the pixel locations. The red or blue pixels apply both to red and to blue filtered pixels but to only one at a time. For a given application of the calculation represented by the multiplying coefficients, the calculated color component matches the color of the pixels represented by the larger diameter dots. The diagonal, horizontal, and vertical interpolation patterns for interpolation algorithms depicted in the row are indicated by the row headings in column 1509. The row with the cross interpolation pattern indicated by the row heading in column 1509 is used to provide green interpolation values. The column headings 1500 through 1508 indicate the various pattern image patterns, used in selecting interpolation algorithms depicted in the column. Thus, selection of a particular interpolation algorithm depends first on selection of the row corresponding to the applicable interpolation pattern indicated by the column heading in column 1509 and by the prioritized pattern image pattern selection indicated in row headings 1500 through 1509. Each of the pattern image pattern classifications includes a descriptive indication followed by the identifying tag used as part of the classification equation names in FIGS. 14A, and 14B, and as identifying tags in FIGS. 7A, 14C, and 15.

As indicated above, the chief advantage of the interpolation algorithms of the present design is to overcome shortcomings in performance of prior art interpolation algorithms in regions of the image where contrast is high. As an option for certain applications, the algorithms above may be applied selectively to supply interpolated values for pixels in portions of the image where contrast is high and alternate algorithms may be used in areas of the image where contrast is lower. Specialized compare circuits RC1 through RC9 (1461A through 1460A) provide outputs Rs1 through Rs9 that indicate that the ratio of the selected pixel value that is gated to bus 1402 is at least $2^n$ times greater or $2^n$ times smaller than the respective pixel value P1 through P9. These indications may be 'or'ed together during sampling of pixels P0 through P4 so that the result will indicate that the contrast ratio Rij of one of the pixel pairs exceeds $2^n$ and this indication may be used to make partial determination of the interpolation equation or algorithm to select. Any of a number of options may be used with regard to what pixels to include in the contrast ratio detection.

There is synergy in implementing the high contrast detection circuit alongside the array of comparison circuits used to generate the set of multi-pattern images. The indication of high contrast may, like the peak detection of commonly assigned U.S. Patent Application Ser. No. 61/308,497, be useful to detect headlamps, tail lamps, or other features in the image and may be output or ported to other image processing algorithms in a manner analogous to the detected peak values in the '497 disclosure to serve these functions. FIG. 14D provides detail for the ratio threshold detection circuits used in RC1 through RC9 of FIG. 14A. The invention is not limited to selection of a threshold ratio of $2^n$, but use of such a ratio is advantageous since division or multiplication by $2^n$ may be accomplished by simply offsetting the bit positions between values whose ratio is being compared by n bits. Thus, the test of whether the ratio of A to B or of B to A exceeds $2^n$ may be accomplished by 'or'ing together the two comparisons of A and B offset by n bit positions in each direction as indicated in FIG. 14D.

It should be understood that the above detail description is provided for enabling one of ordinary skill in the art to make and use the invention as recited in the appending claims. In no way should this description be interpreted as limiting the scope of the invention to any given embodiment, therefore, the appending claims are intended to include all equivalent structure and equivalent function within the respective scope.

What is claimed is:

1. An apparatus comprising:
    a processing circuit for calculating a missing color value for a pixel location using an interpolation equation that is selected based on a direction of an edge feature in an image, wherein calculations performed using said interpolation equation are primarily based on values of eight spectrally mosaiced filtered pixels that are immediate neighbors of said pixel location and that include neighboring pixels with a spectral filter color that is different from said missing color value,
    where said interpolation equation is $N_{22}=(N_{11}+N_{13}+N_{31}+N_{33})/4+(G_{12}-G_{21}-G_{23}+G_{32})/2$, wherein $N_{22}$ is a non-green missing color value for said pixel location; $N_{11}$, $N_{13}$, $N_{31}$, and $N_{33}$ are color values of neighboring pixels with a non-green spectral filter color; and $G_{12}$, $G_{21}$, $G_{23}$, and $G_{32}$ are color values of neighboring pixels with a green spectral filter color.

2. An image processing apparatus, comprising:
    a processing circuit for calculating a first missing color value for a pixel location using an interpolation equation that is selected based on a direction of an edge feature in an image, wherein calculations performed using said interpolation equation are primarily based on values of eight spectrally mosaiced filtered pixels that are immediate neighbors of said pixel location and wherein said calculations include the values of neighboring pixels with a spectral filter color that is different from said first missing color value,
    where said interpolation equation is selected from amongst at least one of the following equations:

$N_{22}=(N_{11}+N_{13}+N_{31}+N_{33})/4+(G_{12}-G_{21}-G_{23}+G_{32})/2;$ $N_{22}=(N_{11}+N_{13}+N_{31}+N_{33})/4+(-G_{12}+G_{21}+G_{23}-G_{32})/2;$ $N_{22}=(N_{21}+N_{23})/2+(-G_{11}-G_{13}-G_{31}-G_{33}+4G_{22})/4;$ $N_{22}=N_{23}+(-G_{13}-G_{33}+2G_{22})/4;$ $N_{22}=N_{21}+(-G_{11}-G_{31}+2G_{22})/4;$ $N_{22}=(N_{12}+N_{32})/2+(-G_{11}-G_{13}-G_{31}-G_{33}+4G_{22})/4;$ $N_{22}=N_{32}+(-G_{31}-G_{33}+2G_{22})/4;$ and $N_{22}=N_{21}+(-G_{11}-G_{13}+2G_{22})/4,$ Wherein: $N_{22}$ is a non-green missing color value for said pixel location; $N_{11}$, $N_{13}$, $N_{31}$, and $N_{33}$ are color values of neighboring pixels with a non-green spectral filter color that is the same color as the first missing color; $G_{12}$, $G_{21}$, $G_{23}$, and $G_{32}$ are color values of neighboring pixels with a green spectral filter color; $N_{21}$ and $N_{23}$ are interpolated color values of neighboring pixels with a non-green spectral filter color that is a different color from the first missing color; and $G_{11}$, $G_{13}$, $G_{31}$, and $G_{33}$ are interpolated green color values of neighboring pixels with a non-green spectral filter color that is the same color as the first missing color, and $G_{22}$ is the green color value of the pixel location.

3. An apparatus as in claim 2, wherein said pixel location has a green color filter.

4. An apparatus as in claim 2, wherein said pixel location has a red color filter.

5. An apparatus as in claim 2, wherein said pixel location has a blue color filter.

* * * * *

UNITED STATES PATENT AND TRADEMARK OFFICE
CERTIFICATE OF CORRECTION

| | | Page 1 of 1 |
|---|---|---|
| PATENT NO. | : 8,463,035 B2 | |
| APPLICATION NO. | : 12/788574 | |
| DATED | : June 11, 2013 | |
| INVENTOR(S) | : Jon H. Bechtel | |

It is certified that error appears in the above-identified patent and that said Letters Patent is hereby corrected as shown below:

In the Specification

Col. 1, line 43, after "to issue" insert -- November 6, 2012, as U.S. Patent No. 8,305,471; U.S. Patent Ser. No. --

Col. 2, line 16, "patters" should be -- patterns --

Col. 3, line 21, "6,613,316" should be -- 6,631,316 --

Col. 14, line 48, "FIG." should be -- FIGS. --

Signed and Sealed this
Twenty-sixth Day of August, 2014

Michelle K. Lee
*Deputy Director of the United States Patent and Trademark Office*